(12) United States Patent
Tanimoto et al.

(10) Patent No.: US 10,642,596 B2
(45) Date of Patent: May 5, 2020

(54) EMBEDDED DEVICE AND PROGRAM UPDATING METHOD

(71) Applicant: RENESAS ELECTRONICS CORPORATION, Tokyo (JP)

(72) Inventors: Tadaaki Tanimoto, Tokyo (JP); Kesami Hagiwara, Tokyo (JP); Naoyuki Morita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 236 days.

(21) Appl. No.: 15/445,510

(22) Filed: Feb. 28, 2017

(65) Prior Publication Data

US 2017/0255459 A1 Sep. 7, 2017

(30) Foreign Application Priority Data

Mar. 1, 2016 (JP) .................................. 2016-038574

(51) Int. Cl.
G06F 9/445 (2018.01)
G06F 8/65 (2018.01)
(Continued)

(52) U.S. Cl.
CPC ................ G06F 8/65 (2013.01); G06F 8/654 (2018.02); G06F 8/658 (2018.02);
(Continued)

(58) Field of Classification Search
CPC . G06F 8/65; G06F 8/654; G06F 8/658; G06F 9/44521; G06F 12/0246;
(Continued)

(56) References Cited

U.S. PATENT DOCUMENTS 6,889,306 B1 * 5/2005 Tani ........................ G06F 9/268
711/103
7,082,549 B2 7/2006 Rao et al.
(Continued)

FOREIGN PATENT DOCUMENTS

JP 2001-005658 A 1/2001
JP 2001-125781 A 5/2001
(Continued)

OTHER PUBLICATIONS

Wimmer, Kirk. "Field-programmable patches simplify firmware maintenance", EDN—Electrical Design News (Texas Instrument), Reed Business Information, Highlands Ranch, 26(9):139-144 (Apr. 29, 1981).

(Continued)

Primary Examiner — Lewis A Bullock, Jr.
Assistant Examiner — Tina Huynh
(74) Attorney, Agent, or Firm — McDermott Will & Emery LLP

(57) ABSTRACT

An object of the present invention is to perform a program updating process without reconstructing a program using a pre-update program and an update differential program. An embedded device has a nonvolatile memory having a plurality of planes from/to which data can be read/written independently and an address translator performing address translation by using an address translation table. When an address obtained by decoding an instruction by a CPU is an address corresponding to a change part in a default program, the address translator translates the address to an address in which a differential program is disposed.

11 Claims, 68 Drawing Sheets

(51) Int. Cl.
*G06F 8/658* (2018.01)
*G06F 8/654* (2018.01)
*G06F 12/02* (2006.01)
*H04L 29/08* (2006.01)

(52) U.S. Cl.
CPC ...... *G06F 9/44521* (2013.01); *G06F 12/0246* (2013.01); *G06F 12/0292* (2013.01); *H04L 67/34* (2013.01); *G06F 2212/251* (2013.01); *G06F 2212/7201* (2013.01); *G06F 2212/7208* (2013.01)

(58) Field of Classification Search
CPC ......... G06F 12/0292; G06F 2212/7208; G06F 2212/7201; G06F 2212/251; H04L 67/34
See application file for complete search history.

(56) References Cited

U.S. PATENT DOCUMENTS

| | | | |
|---|---|---|---|
| 8,522,233 | B2 | 8/2013 | Nakamura et al. |
| 9,229,854 | B1* | 1/2016 | Kuzmin ............... G06F 8/654 |
| 2003/0028867 | A1* | 2/2003 | Kryloff ............... G06F 8/658 |
| | | | 717/171 |
| 2004/0098427 | A1* | 5/2004 | Peng ................ G06F 12/0246 |
| 2007/0106873 | A1* | 5/2007 | Lally ................ G06F 12/0292 |
| | | | 711/202 |
| 2009/0106506 | A1* | 4/2009 | Skerlj ................ G06F 12/02 |
| | | | 711/154 |
| 2012/0079232 | A1* | 3/2012 | Hinton ............... G06F 12/0292 |
| | | | 711/207 |
| 2015/0180840 | A1 | 6/2015 | Jung et al. |
| 2015/0364218 | A1* | 12/2015 | Frayer ................ G11C 29/44 |
| | | | 714/6.13 |
| 2016/0034221 | A1* | 2/2016 | Zettsu ................ G06F 3/0625 |
| | | | 711/103 |
| 2016/0306591 | A1* | 10/2016 | Ellis ................ G06F 3/0653 |

FOREIGN PATENT DOCUMENTS

| | | |
|---|---|---|
| JP | 2006-518059 A | 8/2006 |
| JP | 2010-218334 A | 9/2010 |
| JP | 2010-237852 A | 10/2010 |

OTHER PUBLICATIONS

"ATMEL AT91SAM ARM-based Flash MCU", (Feb. 21, 2012), Retrieved from the Internet: http://web.archive.org/web/20140813191656 / http://www.atmel.com/Images/doc6430.pdf [retrieved on Aug. 13, 2014], pp. 1-116.

Extended European Search Report issued in corresponding European Patent Application No. 17158031.9, dated Jul. 26, 2017.

Japanese Notification of Reasons for Refusal issued in corresponding Japanese Patent Application No. 2016-038574, dated Jul. 2, 2019, with English Translation.

* cited by examiner

· SECOND AND SUBSEQUENT ACCESSES

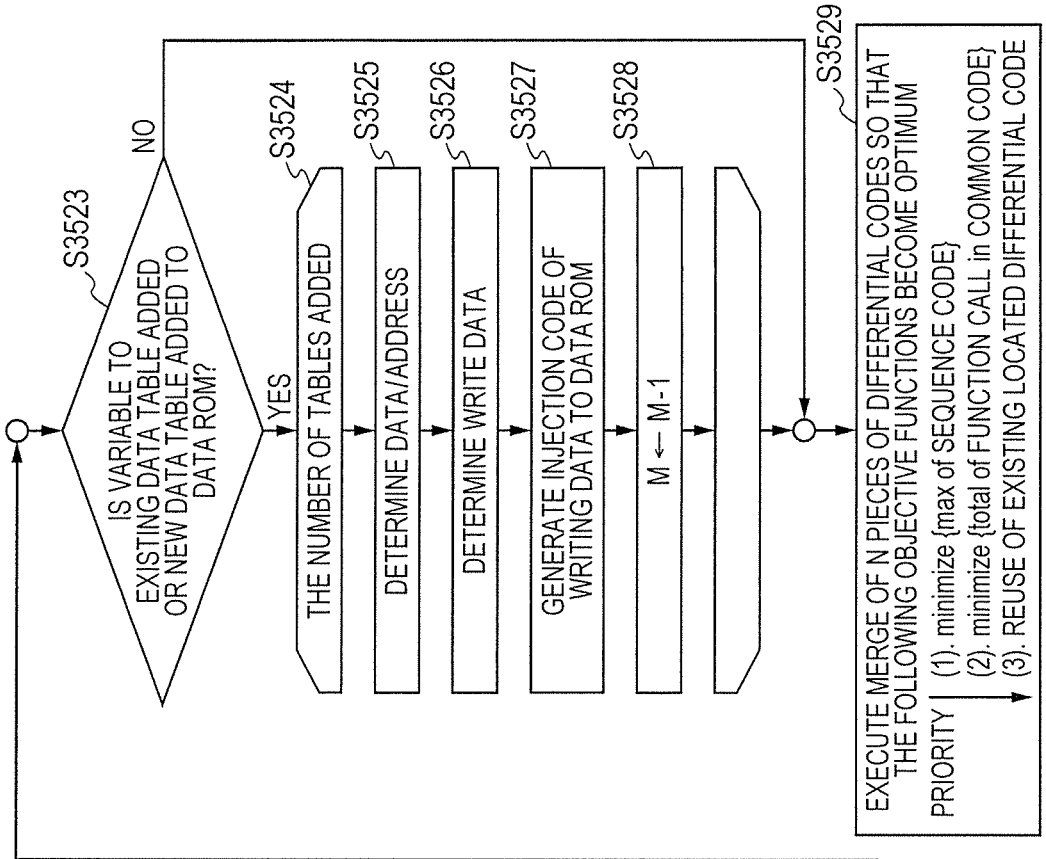
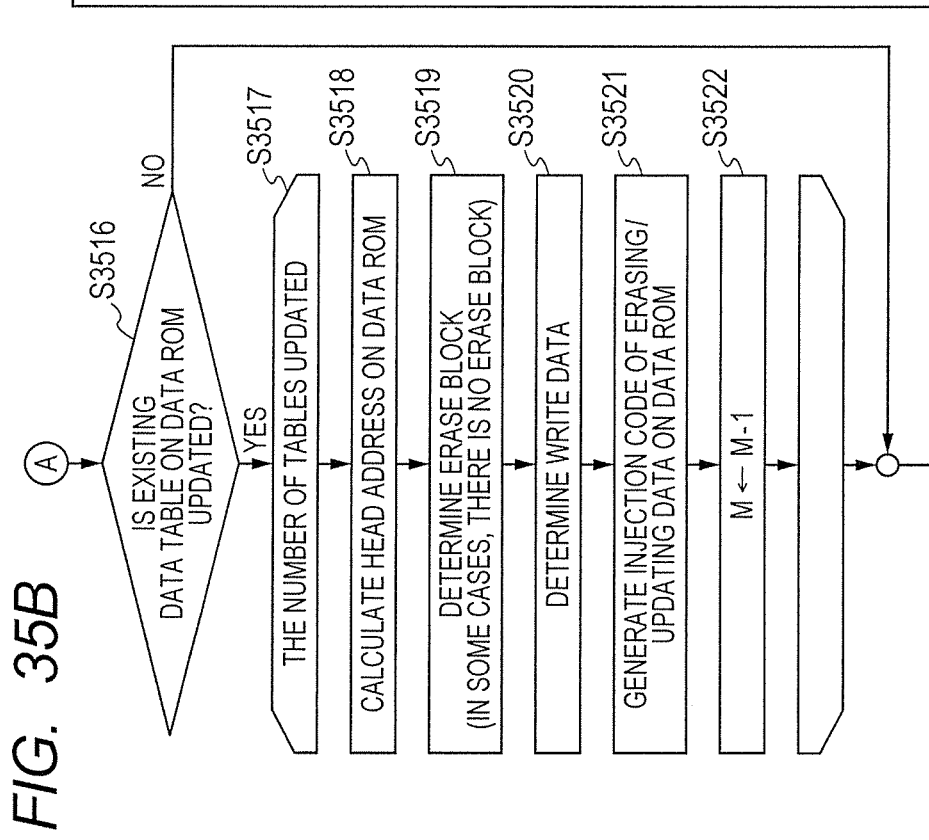
FIG. 35B

FIG. 57

H'xxx00000 → 0
H'xxx08000 → 1
H'xxx10000 → 2
H'xxx18000 → 3
...
H'xxxf8000 → 31
...

EMBEDDED DEVICE AND PROGRAM UPDATING METHOD

CROSS-REFERENCE TO RELATED APPLICATIONS

The disclosure of Japanese Patent Application No. 2016-038574 filed on Mar. 1, 2016 including the specification, drawings and abstract is incorporated herein by reference in its entirety.

BACKGROUND

The present invention relates to an embedded device and a program updating method and, for example, relates to an embedded device and a program updating method performing updating using a differential program.

In recent years, the number of embedded devices each embedded in an in-vehicle device, an industrial device, or the like is being increased. Consequently, a method of updating a program in such an embedded device by so-called OTA (Over The Air) is being in demand. With respect to updating of a program, various techniques have been being proposed. For example, patent literature 1 discloses a technique of dynamically updating a program on a module unit basis without stopping the operation of the program operating on an embedded device by preliminarily assigning a reference address and a relative address to an update program on the module unit basis.

SUMMARY

However, the precondition of the technique described in the patent literature 1 is that dynamic address resolution (that is, dynamic link) of an update program is possible by calculating an actual address from a reference address and a relative address in an embedded device. That is, in the technique described in the patent literature 1, a program has to be reconstructed by performing such address resolution and using a pre-update program and an update differential program as the difference between the pre-update program and a post-update program.

However, to perform such reconstruction, there are problems such that a large-capacity memory is necessary and user service has to be stopped in an MCU (Micro Controller Unit) core since a pre-update program has to be read during reconstruction. Consequently, it is demanded to update a program without performing reconstruction of a program using a pre-update program and an update differential program.

The other problems and novel features will become apparent from the description of the specification and appended drawings.

According to an embodiment, an embedded device has a nonvolatile memory having a plurality of planes from/to which data can be read/written independently and an address translator performing address translation by using an address translation table. When an address obtained by decoding an instruction by a CPU is an address corresponding to a change part in a default program, the address translator translates the address to an address in which a differential program is disposed.

According to the embodiment, without performing reconstruction of a program using a pre-update program and an update differential program, a program updating process can be performed.

BRIEF DESCRIPTION OF THE DRAWINGS

FIG. 35B is a flowchart illustrating an example of a process of merging differential programs.

FIG. 57 is a diagram illustrating an example of a correspondence table stored in a data ROM.

DETAILED DESCRIPTION

Figure 1:
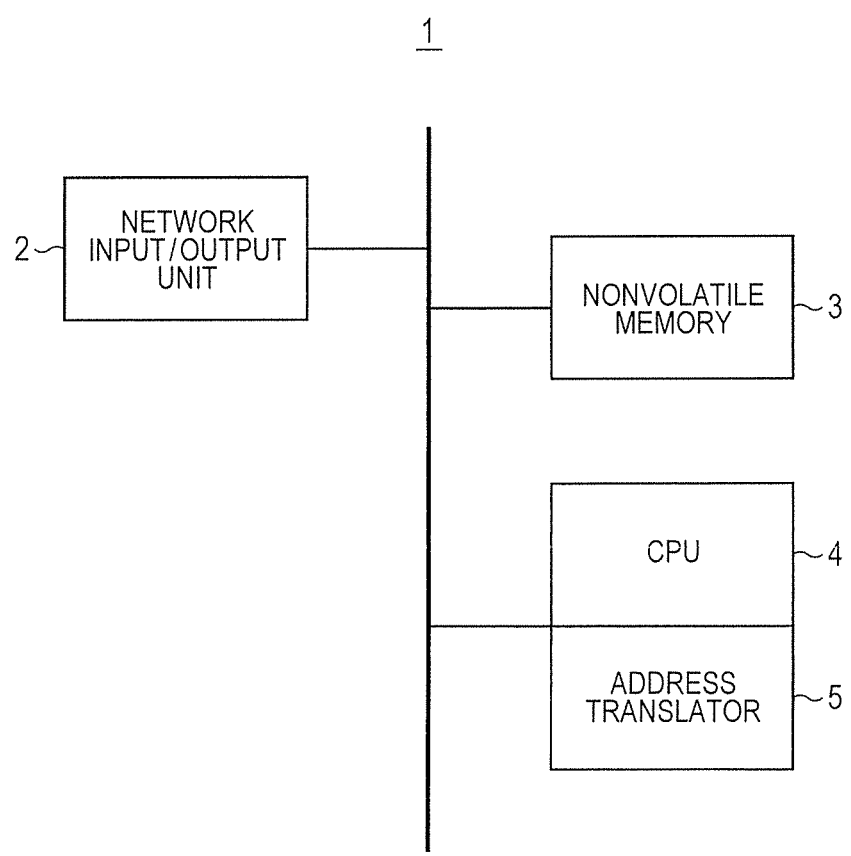
FIG. 1 is a block diagram illustrating the configuration of an embedded device related to outline of an embodiment.

For clarification of description, omission and simplification are properly made in the following description and drawings. Elements illustrated in the drawings as function blocks performing various processes can be constructed by a CPU, a memory, and other circuits as hardware and are realized by a program loaded to a memory and the like as software. Therefore, as is understood by a person skilled in the art, each of the function blocks can be realized in various faults of only hardware, only software, or combination of the hardware and software and is not limited to any of the faults. In the drawings, the same reference numeral is designated to the same element and repetitive description is omitted as necessary.

The above-descried program is stored by using a non-transitory computer readable medium of various types and can be supplied to a computer. The non-transitory computer readable medium includes a tangible storage medium of various types. Examples of the non-transitory computer readable medium include magnetic recording media (for example, flexible disk, magnetic tape, and hard disk drive), magnet-optic recording media (for example, magnet-optic disk), CD-ROM (Read Only Memory), CD-R, CD-R/W, and semiconductor memories (for example, mask ROM, PROM (Programmable ROM), EPROM (Erasable PROM), flash ROM, and RAM (Random Access Memory)). The program may be supplied to a computer by a transitory computer readable medium of various types. Examples of a transitory computer readable medium include an electric signal, an optical signal, and electromagnetic wave. The transitory computer readable medium can supply a program via a wired communication path such as an electric wire or an optical fiber or a wireless communication path.

Outline

First, prior to detailed explanation of embodiments, outline of embodiments will be described. FIG. 1 is a block diagram illustrating the configuration of an embedded device 1 related to outline of an embodiment. The embedded device 1 has, as illustrated in FIG. 1, a network input/output unit 2, a nonvolatile memory 3, a CPU 4, and an address translator 5.

The network input/output unit 2 receives update information via a network. The update information is information for updating a program and data of the embedded device 1. The nonvolatile memory 3 is a ROM having a plurality of planes to/from which data can be written/read independently and is, for example, a flash memory. In the nonvolatile memory 3, a default program (pre-update program) is disposed in the first plane, and a differential program with respect to the default program is disposed in the second plane. The differential program is included in the update information received by the network input/output unit 2. After the network input/output unit 2 receives the update information, the differential program is disposed in the nonvolatile memory 3. The differential program is also called an update differential program. The CPU 4 executes the program disposed in the nonvolatile memory 3. The address translator 5 performs address translation by using an address translation table included in the update info nation received by the network input/output unit 2. When an address obtained by decoding an instruction by the CPU 4 corresponds to an address corresponding to a change part in the default program, the address translator 5 translates the address to the address in which the differential program is disposed. The CPU 4 executes the differential program in accordance with the address translated by the address translator 5. In such a manner, the CPU 4 executes the update program made by the default program and the differential program.

Since the address translation is performed by the address translator 5 in the embedded device 1 as described above, it is unnecessary to perform reconstruction of a program using the pre-update program and the differential program.

First Embodiment

Hereinafter, referring to the drawings, the first embodiment will be concretely described.

Figure 2:
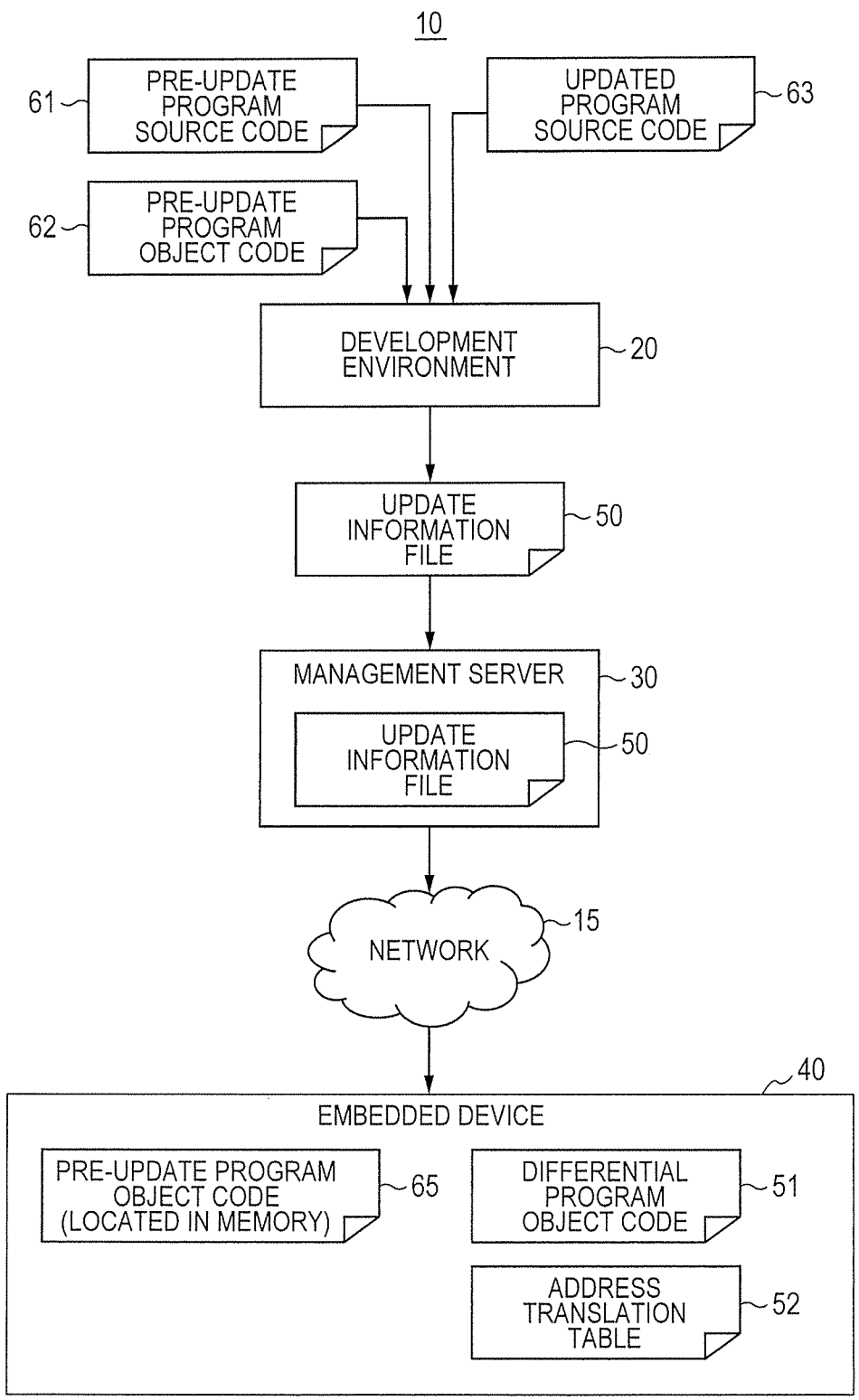
FIG. 2 is a schematic diagram illustrating a configuration example of an information system according to a first embodiment.

FIG. 2 is a schematic diagram illustrating a configuration example of an information system 10 according to the first embodiment. The information system 10 includes a development environment 20, a management server 30, and an embedded device 40. The management server 30 and the embedded device 40 are coupled to each other via a network 15. The embedded device 40 corresponds to a control device such as an in-vehicle ECU (Electronic Control Unit) or an industrial FA (Factory Automation) control device. Although FIG. 2 illustrates the case where one development environment 20, one management server 30, and one embedded device 40 are provided, the number of the management servers 30 and the number of the embedded devices 40 may be arbitrary number. A plurality of management servers 30 may be cascade-coupled. The network 15 may be arbitrary as long as the management server 30 and the embedded device 40 can be mutually coupled. Therefore, the network 15 may be constructed by wired coupling and/or wireless coupling. The network 15 includes, for example, the Internet, broadcast waves, and in-vehicle/industrial networks.

In the information system 10, a source code of a pre-update program, an object code of a pre-update program, a source code of an updated program, and the like are input to the development environment 20. An update information file 50 generated by the development environment 20 is transmitted to the embedded device 40 via the network 15. In the embedded device 40, an object code 65 of a pre-update program is preliminarily disposed in the memory. The embedded device 40 receives a differential program object code 51 and an address translation table 52 included in the update information file 50 and executes the updated program. It will be concretely described below.

Figure 3:
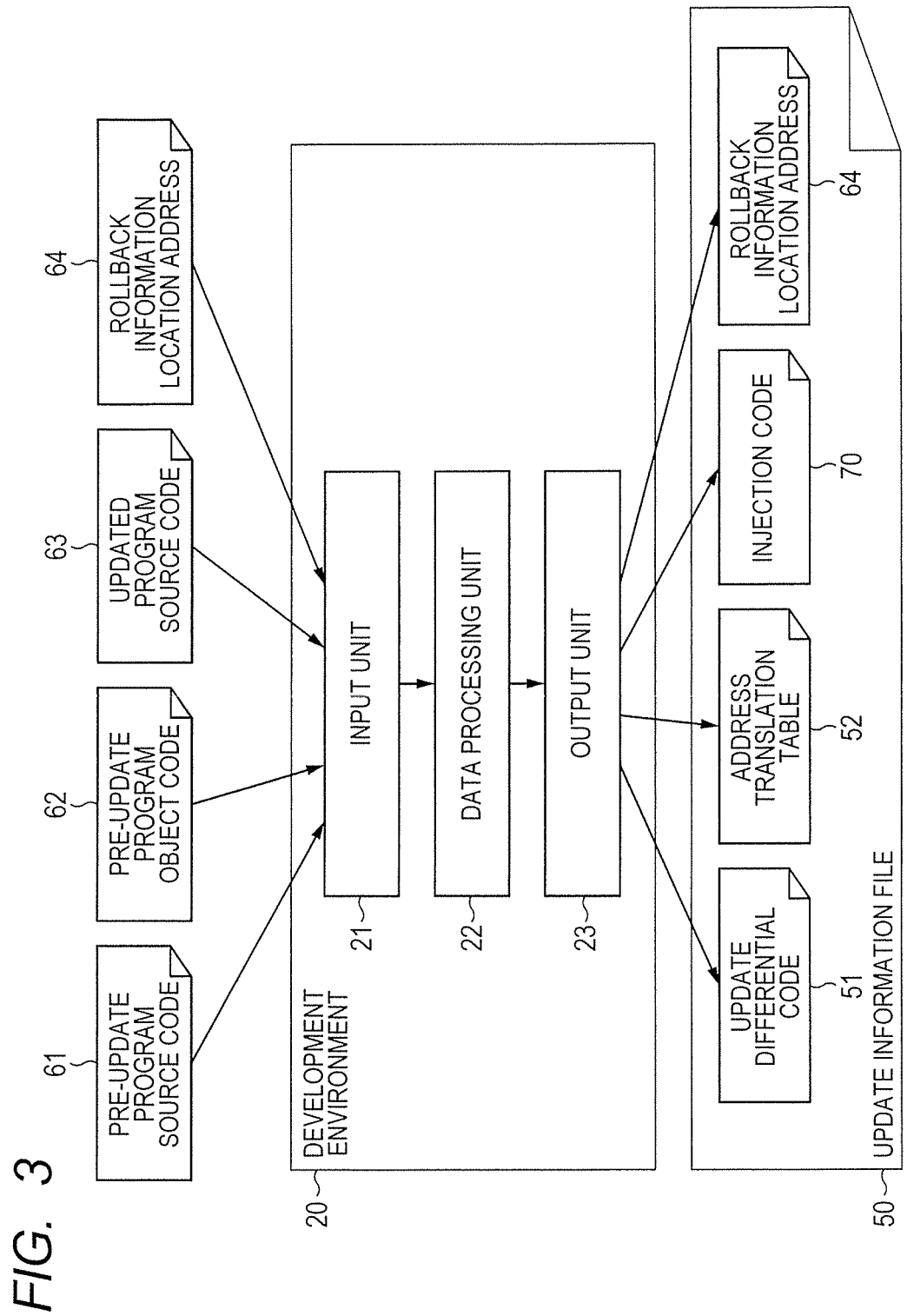
FIG. 3 is a block diagram illustrating a configuration example of a development environment.

FIG. 3 is a block diagram illustrating a configuration example of the development environment 20. The development environment 20 is a computer system used by the generator of the update differential program in the information system 10. In the following description, the update differential program (differential program) is also called an update differential code or an update differential binary. The update differential program (differential program) is a program of the difference between the pre-update program and the updated program. The development environment 20 generates the update information file 50 which is distributed to one or more embedded devices 40. The development environment 20 has an input unit 21, a data processing unit 22, and an output unit 23.

The input unit 21 is a device used by the generator of the update differential program to give an instruction to the development environment 20. In the case of this example, the input unit 21 is used to give an instruction of generating, for instance, the update information file 50 used by the embedded device 40. The input unit 21 receives, as inputs, a pre-update program source code 61, an object code 62 of a pre-update program corresponding to the pre-update program source code 61, an updated program source code 63, and a rollback information location address 64. The pre-update program is a program which is currently operating in the embedded device. The updated program is a program which will be newly operated in the embedded device and can be called an update program. The rollback information location address 64 is, for example, when some abnormality is detected in program updating, information constructing a program recovery point as a rollback target.

The output unit 23 is a device used to send the update information file 50 to the management server 30 and is, for example, an output interface.

The data processing unit 22 is constructed by a processing device and a memory which are not illustrated. The processing device interprets the content of a read program and executes a data process. The processing device is constructed by, for example, a CPU (Central Processing Unit), an MPU (Micro Processing Unit), or the like. The memory is a storing device temporarily storing process data used in the processing device. The memory is, for example, a RAM (Random Access Memory) or the like. In the memory, a program assisting generation of the update information file 50 and the like is stored. The program includes a compiler of converting the updated program source code 63 to an object code of the updated program, a program of extracting the differential program source code between the two source codes, and a compiler and a linker of converting the differential program source code to a proper object code, or a compiler and a linker of converting the difference between two program object codes to a differential program object code.

The update information file 50 includes information for updating the pre-update program object code 62 which operates in the embedded device 40. Concretely, the update information file 50 is made by the update differential code 51, the address translation table 52, an injection code 70, and the rollback information location address 64. In the following description, the update differential code will be also called an update differential binary, an update differential object code, or the like. The details of the update information file 50 will be described later. Hereinafter, embodiments will be described by using an injection code. However, by using a data sequence made by the name of a call function and an argument sequence of the function in place of the injection code, a form of constructing the function corresponding to the injection code from the data sequence in the embedded device may be realized. By employing such a realizing method, at the time of constructing a function corresponding to the injection code, validity verification of an injection code such as verification of the signature of a data sequence can be realized more securely.

Figure 4:
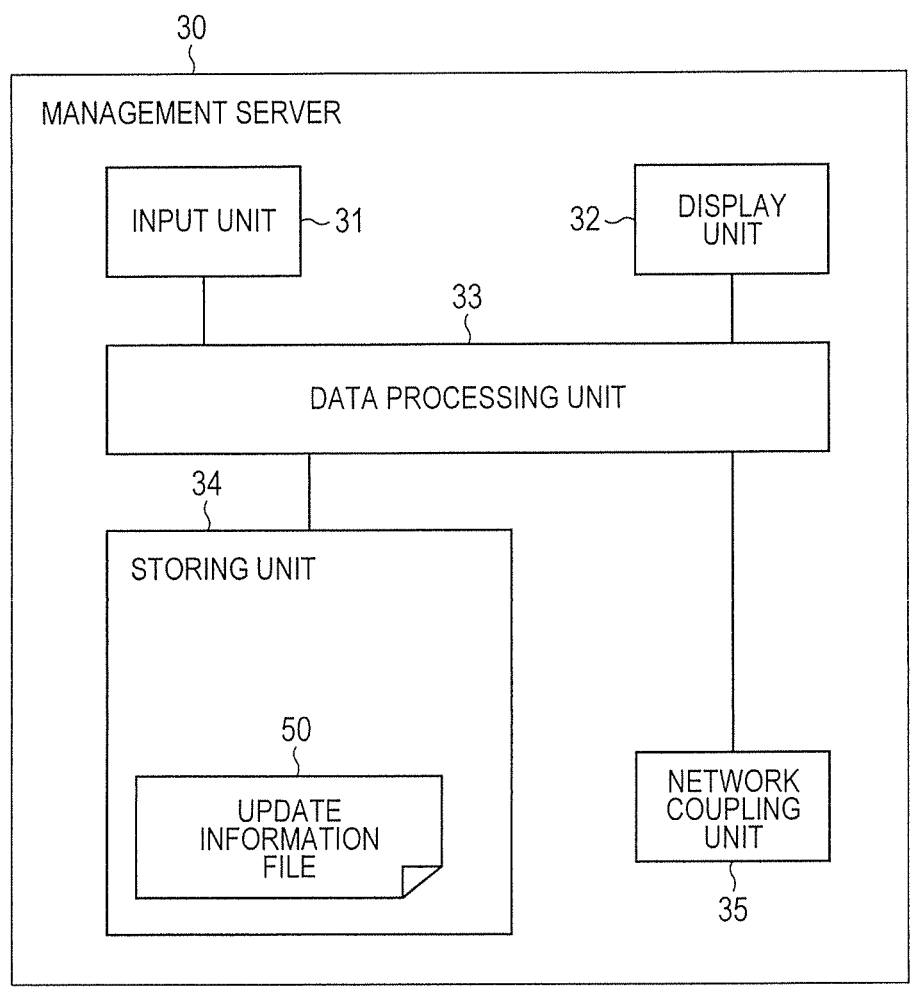
FIG. 4 is a block diagram illustrating a configuration example of a management server.

Next, the configuration of the management server 30 will be described. FIG. 4 is a block diagram illustrating a configuration example of the management server 30. The management server 30 is a computer system which receives an output of the development environment 20 once in the information system 10 and, after that, distributes the update information file 50 to one or more embedded devices 40. The management server 30 has an input unit 31, a display unit 32, a data processing unit 33, a storing unit 34, and a network coupling unit 35.

The input unit 31 is a device used to deliver the update information file 50 to the data processing unit 33. The development environment 20 and the input unit 31 may be arbitrary coupled as long as they are coupled mutually. Therefore, the coupling may be wired cupping and/or wireless coupling. For the coupling, for example, the Internet or broadcast wave is used.

The display unit 32 is an output device displaying various data and the like as input information to the management server 30 and a process result. As the display unit 32, for example, a CRT (Cathode Ray Tube) display or a liquid crystal display is used.

The data processing unit 33 is constructed by a processing device and a memory which are not illustrated. The processing device interprets the data in the read update information file 50 and executes the data process. The processing device is, for example, a CPU, an MPU, or the like. The memory is a storing device temporarily storing process data used in the processing device. The memory is, for example, a RAM or the like. In the memory, a program for assisting conversion of the update information file 50 to a form adapted to the transfer protocol in the network 15 or the like is stored. The program includes a program of performing, in the case of division transferring the update differential program object code and the address translation table included in the update information file 50, a process of dividing them, a process of correcting each of injection codes required to locate a divided update differential program object code and a divided address translation table into an embedded device in accordance with the division, and the like.

The storing unit 34 is a device to/from which various data is stored/read. The storing unit 34 is, for example, an HDD (Hard Disk Drive), an optical storing device, or a flash memory device. In the case of the example, the update information file 50 or the like is stored in the storing unit 34. The network coupling unit 35 is a communication device for coupling the management server 30 to the network 15.

Figure 5:
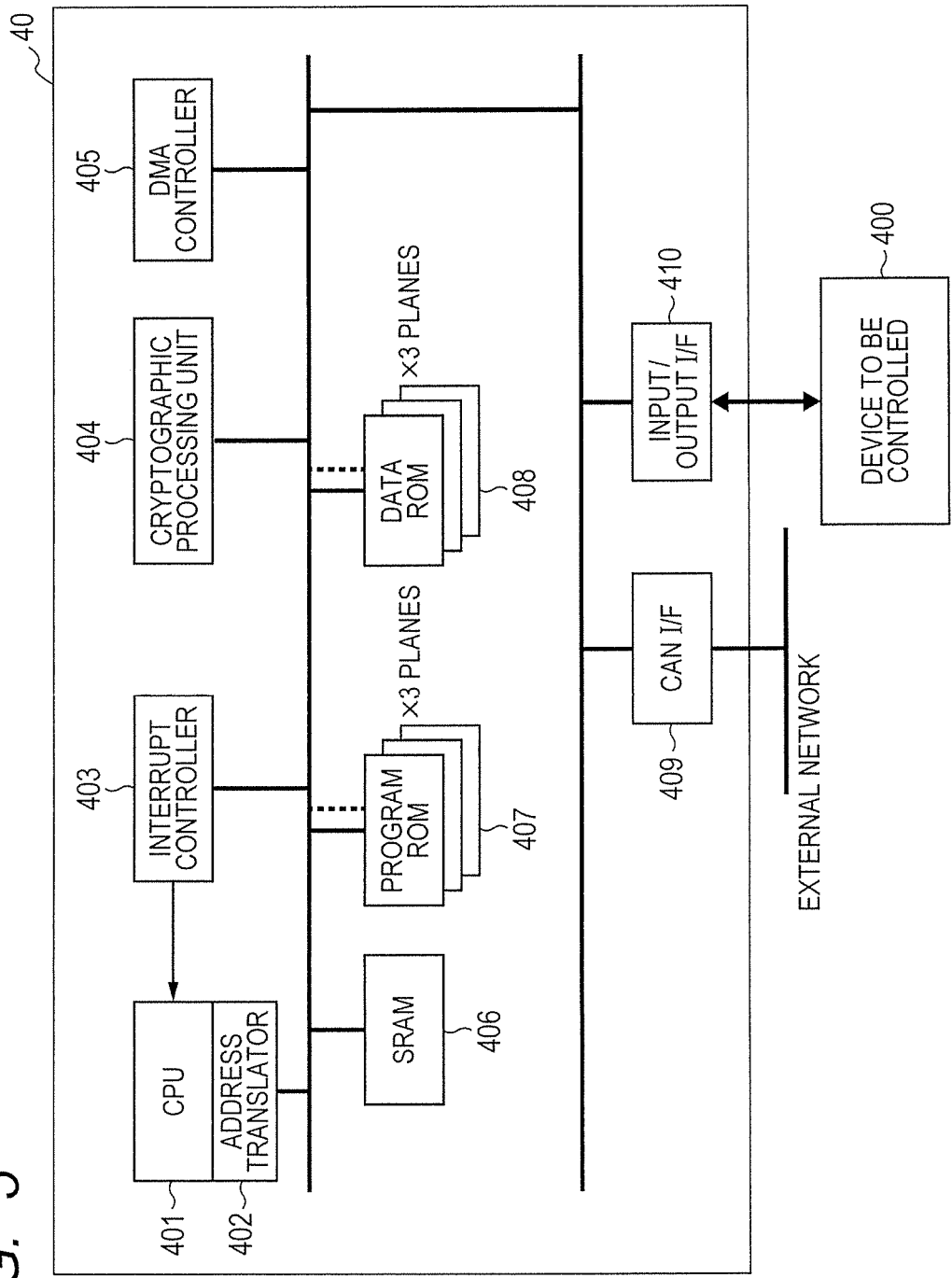
FIG. 5 is a block diagram illustrating a configuration example of an embedded device.

Next, the embedded device 40 will be described. FIG. 5 is a block diagram illustrating a configuration example of the embedded device 40. The embedded device 40 in the information system 10 is a device on which a program to be updated operates. The embedded device 40 is, for example, an embedded controller which controls a device 400 to be controlled and has a CPU 401, an address translator 402 translating the address of a program executed by the CPU 401, an interrupt controller 403, a cryptographic processing unit 404, a DMA (Direct Memory Access) controller 405, an SRAM (Static Random Access Memory) 406, a program ROM (Read Only Memory) 407 having a configuration of three planes from/to which data can be read/written/erased independently, a data ROM 408 having a configuration of three planes from/to which data can be read/written/erased independently, a CAN (Controller Area Network) interface 409, and an input/output interface 410. The program ROM 407 and the data ROM 408 are, for example, concretely, nonvolatile memories such as flash memories. The CPU 401 executes the program disposed in the program ROM 407 by using data disposed in the data ROM 408. The program ROM 407 and the data ROM 408 are, concretely, nonvolatile memories such as flash memories. The CPU 401 executes a program disposed in the program ROM 407 by using data disposed in the data ROM 408. The cryptographic processing unit 404 is a unit performing secure management of a cryptographic key, encryption or decoding of a program or data using a cryptographic key, issue of a signature, verification of the signature, and the like. The cryptographic processing unit 404 verifies, for example, the signature of update information. The cryptographic processing unit 404 is also called a signature verifying unit. The cryptographic processing unit 404 performs the above-described process by, for example, executing a program by a not-illustrated CPU included in the cryptographic processing unit 404. In the program ROM 407, a default program is disposed in any of the planes, and a differential program from the default program is disposed in another plane. In the data ROM 408, default data is disposed in any of the planes and differential data from the default data is disposed in the second plane. The differential program and the differential data is included in update information received by the CAN interface 409. The CAN interface 409 is also called a network input/output unit and receives the update information via the network 15. The address translator 402 performs address translation by using the address translation table included in the update information received by the CAN interface 409.

Figure 6:
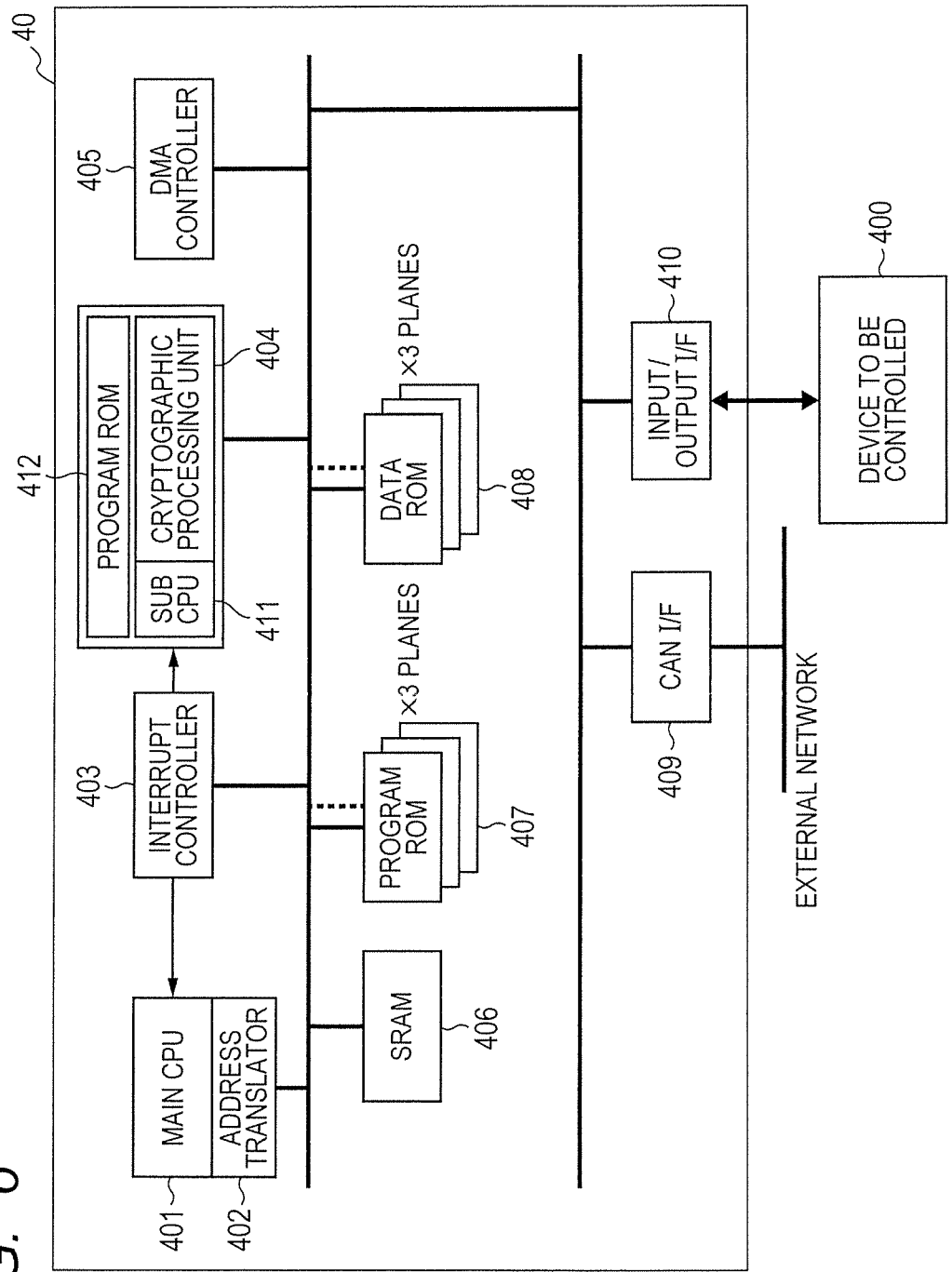
FIG. 6 is a block diagram illustrating another configuration example of the embedded device.

Although the embedded device 40 does not have a sub CPU in the example illustrated in FIG. 5, as illustrated in FIG. 6, the embedded device 40 may have the main CPU 401, the address translator 402 translating the address of a program executed by the CPU 401, the interrupt controller 403, the cryptographic processing unit 404, a sub CPU 411, a program ROM 412 used by the sub CPU 411, the DMA controller 405, the SRAM 406, the program ROM 407 having a configuration of three planes to/from which data can be written/read/erased independently, the data ROM 408 having a configuration of three planes to/from which data can be written/read/erased independently, the CAN interface 409, and the input/output interface 410. The program ROM 412 may be physically disposed in the program ROM 407.

Figure 7:
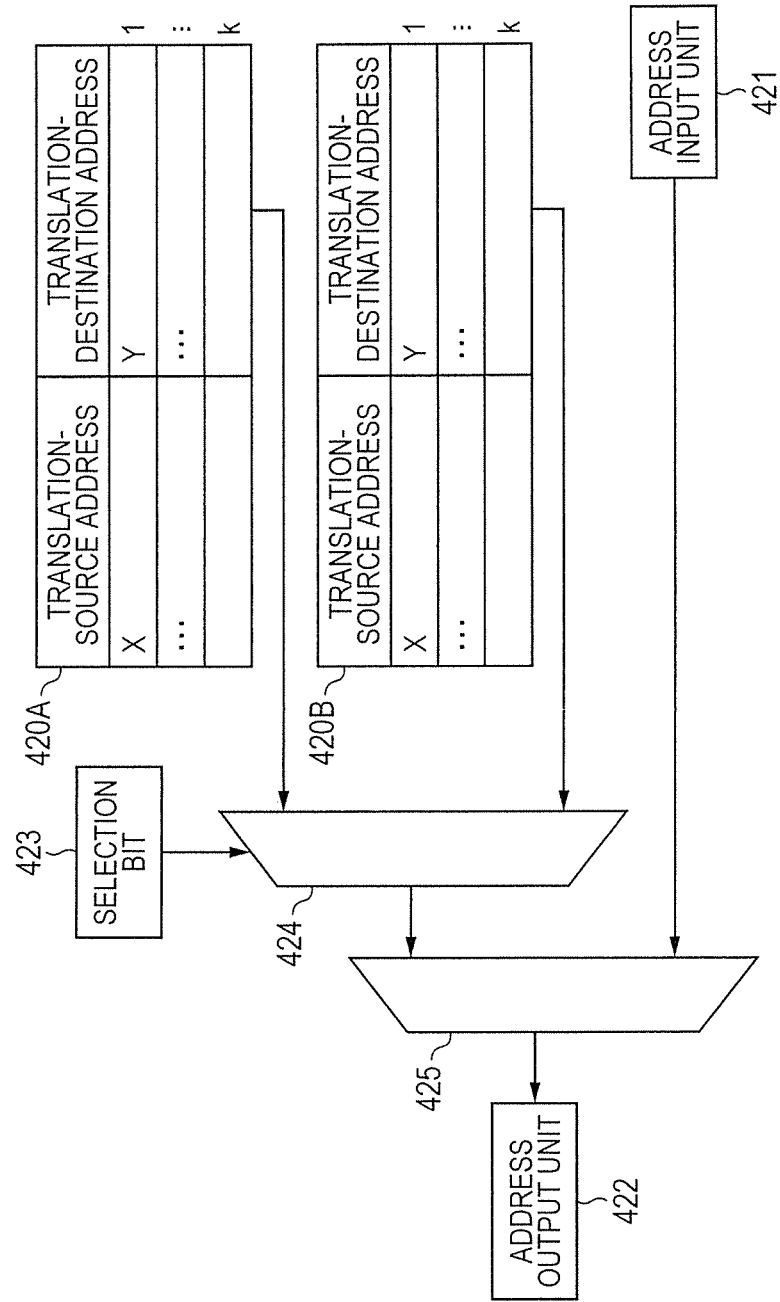
FIG. 7 is a schematic diagram illustrating outline of an address translator according to the first embodiment.

FIG. 7 is a schematic diagram illustrating outline of the address translator 402 according to the embodiment. For example, in the case where an address input to an address input unit 421 is an address to be translated, the address translator 402 translates the address by using any of two address translation tables 420A and 420B and outputs the resultant address from an address output unit 422. For example, one of the two address translation tables 420A and 420B is a table used by updating of the n-th time, and the other one is a table used by updating of the (n+1)th time. As described above, in the updating of the (n+1)th time, for example, execution of the program performed on the basis of the translation by the address translation table 420A is switched to execution of the program performed on the basis of the translation by the address translation table 420B.

The address input unit 421 is an address input interface in the address translator 402 and receives an address generated by decoding an instruction by the CPU 401 (more concretely, the core of the CPU 401). The address may be input directly from the core of the CPU 401 or via a bus. The address output unit 422 is an output interface of the address in the address translator 402 and outputs an address to a memory bus to which the program ROM 407 and the data ROM 408 are coupled. The address output unit 422 may be input directly to the program ROM 407 and the data ROM 408 not via the memory bus.

With such a configuration, in the address translator 402, as the address translation table 420A or 420B, the address translation table 52 included in the update information file 50 is set. The address translator 402 performs translation using the address translation table selected by a selector 424 based on a selection bit 423 for the input address from the address input unit 421 and outputs an output address from the address output unit 422. The address translator 402 can switch validation/invalidation of the translation using the address translation table by a selector 425.

The translation of the program address executed by the CPU is performed by the above-described address translation, and the update differential program object code as the update part of the pre-update program object code is properly made executable, thereby enabling the updated program object code to be executed.

Figure 8:
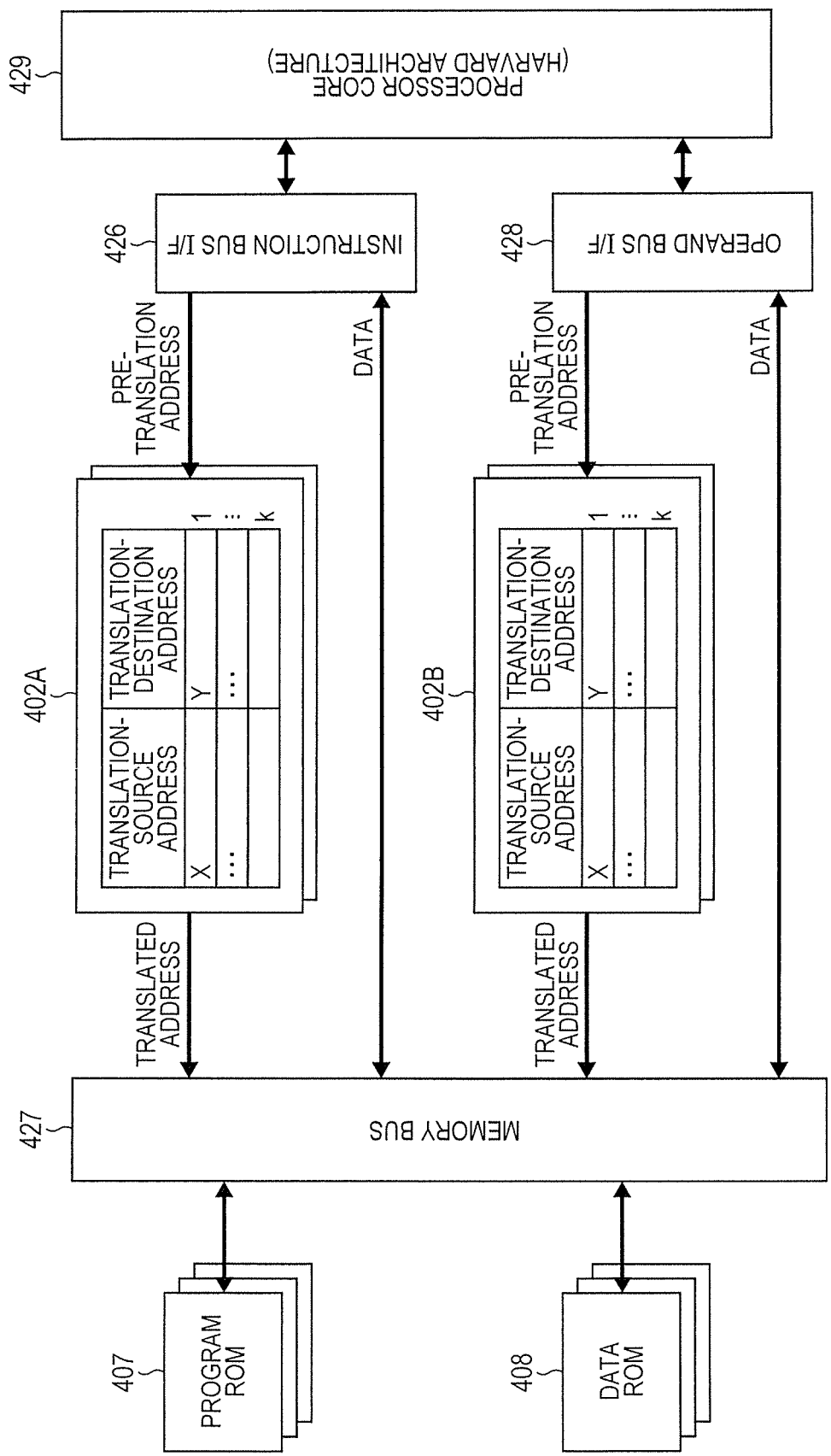
FIG. 8 is a block diagram illustrating a coupling example of the address translator.

Next, the coupling relation of the address translator 402 will be described more specifically. FIG. 8 is a block diagram illustrating a more concrete coupling example of the address translator 402. The embedded device 40 has, as the address translators 402, concretely, an address translator 402A for the program ROM 407 and an address translator 402B for the data ROM 408. In the embodiment, in correspondence with the fact that the number of planes of the program ROM is three, the embedded device 40 has two address translators 402A for the program ROM 407. Similarly, the embedded device 40 has two address translators 402B for the data ROM 408. The address translator 402A for the program ROM 407 is provided between an instruction bus interface 426 and a memory bus 427 and outputs an address obtained by translating a pre-translation address from the instruction bus interface 426 to the memory bus 427. The address translator 402B for the data ROM 408 is provided between an operand bus interface 428 and the memory bus 427 and outputs an address obtained by translating a pre-translation address from the operand bus interface 428 to the memory bus 427. Each of the instruction bus interface 426 and the operand bus interface 428 is coupled to a processor core 429 (CPU 401) constructed by a hard architecture.

When an address obtained by decoding an instruction by the CPU 401 is an address corresponding to a change part in the default program, the address translator 402A for the program ROM 407 translates the address to an address in which a differential program is located. When an address obtained by decoding an instruction by the CPU 401 is an address corresponding to a change part in default data, the address translator 402B for the data ROM 408 translates the address to an address in which differential data is located. The CPU 401 executes a process using the differential data in accordance with the address translated by the address translator 402B for the data ROM 408. As described above, in the embodiment, the embedded device 40 has, in addition to the address translator 402A for the program ROM 407, the address translator 402B for the data ROM 408. Consequently, not only updating of a program code but also updating of data can be handled. Generally, when data located in a program ROM and a data ROM is updated, since the address is different from that of original data, a program code for accessing the updated data is also changed. By the change, a problem that the differential code amount increases occurs. By using an address translator, data can be updated while suppressing a change of the address on the program code as much as possible, and the differential code increase amount can be reduced.

Figure 9:
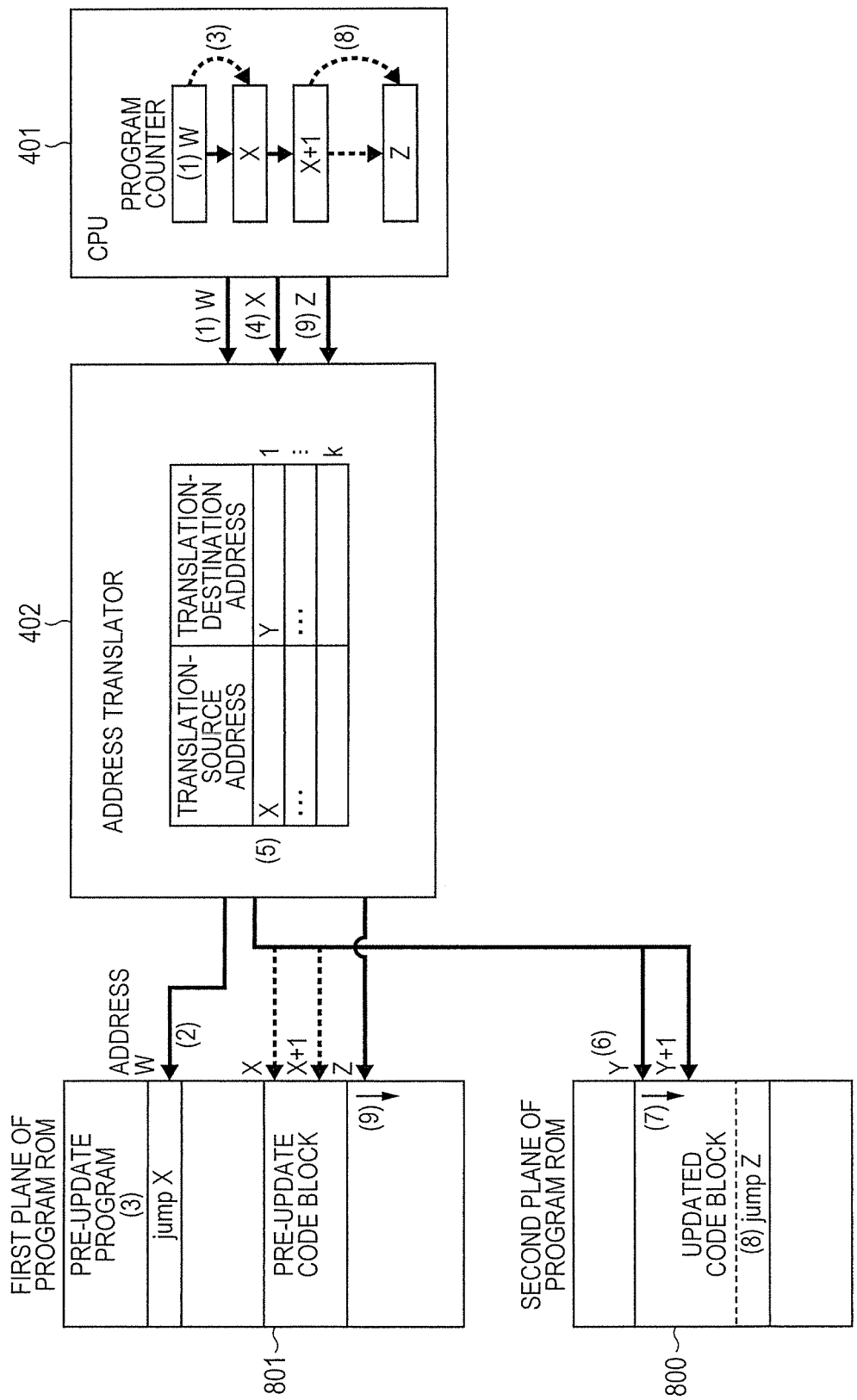
FIG. 9 is a schematic diagram explaining an example of an updated-program execution procedure.

Next, the updated-program executing procedure will be described. FIG. 9 is a schematic diagram explaining an example of an updated-program execution procedure. A case where a pre-update program object code is located in the first plane of the program ROM 407, and a part of an update differential program object code is located in the second plane of the program ROM 407 will be examined. It is assumed that a code block 800 located in the second plane corresponds to a code block 801 as a part of the pre-update program object code. At the time of executing a program by the CPU 401, by executing address translation by the address translator 402, the code block 801 is replaced by the code block 800, and the program is executed. By such a method, the updated program can be executed. Hereinafter, the example of executing the updated program in FIG. 9 will be described.

First, the value of a program counter in the CPU 401 is W (refer to (1) in the diagram). Since W does not exist in a translation-source address in an address translation table at this time, the address translator 402 outputs W (refer to (2) in the diagram). Subsequently, the CPU 401 executes an instruction Jump X in the address W and rewrites the program counter to X (refer to (3) in the diagram). Next, the CPU 401 tries to read an instruction in the address X (refer to (4) in the diagram). However, since X matches the translation-source address (refer to (5) in the diagram), the address translator 402 outputs an address Y (refer to (6) in the diagram). Consequently, the CPU 401 reads an instruction from the address Y and executes it (refer to (7) in the diagram). After that, the value of the program counter is changed to X+1, X+1 is read as Y+1 by the address translator 402, and the instruction in the address Y+1 is executed. An instruction Jump Z is located at the end of the updated code block 800 and executed by the CPU 401 (refer to (8) in the diagram). After that, the CPU 401 continues the execution from the address Z of the pre-update program (refer to (9) in the diagram).

Figure 10:
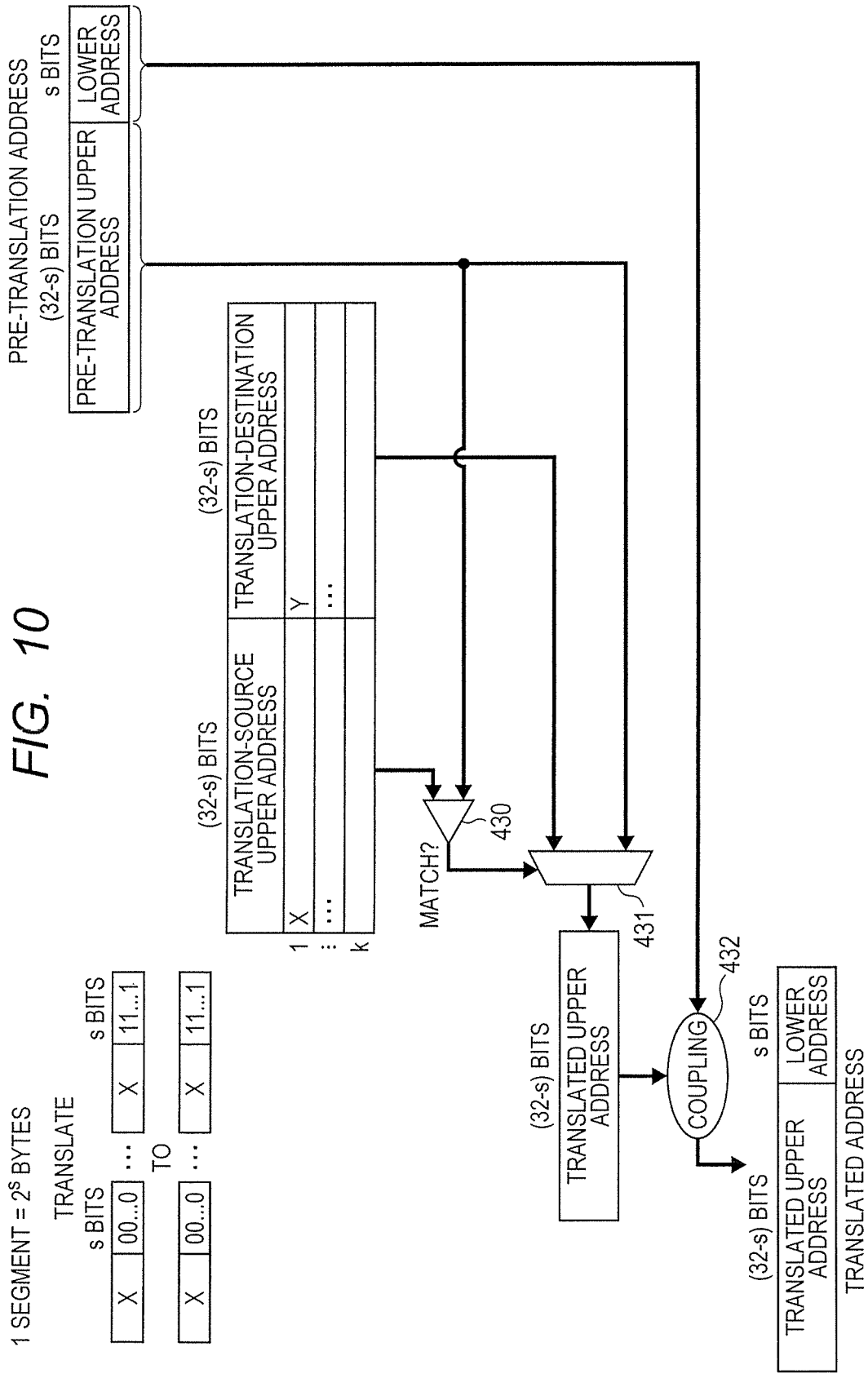
FIG. 10 is a schematic diagram explaining the details of address translation by the address translator.

The details of the address translation by the address translator 402 will now be described. The address translator 402 realizes address translation by, concretely, changing an upper bit sequence (hereinafter, called upper address) of predetermined number of bits in the address obtained by decoding the instruction by the CPU 401 and coupling the changed upper bit sequence and a lower bit sequence of the address (hereinafter, also called lower address). Specifically, the address translator 402 determines whether an input upper address matches a translation-source address registered in the address translation table, when they match, replaces the upper address with a translation-destination address, couples the lower address to the translated upper address, and outputs the resultant. As described above, the address translator 402 performs address translation by using the number of bits of the upper address as one segment. In such a manner, the size of the address translation table can be made smaller than that in the case of translating all of bits of an address. FIG. 10 is a schematic diagram explaining the details of address translation by the address translator 402. It is assumed here that the number of bits of an address is 32 bits and the segment size set in the address translator 402 is $2^s$ bytes. In this case, in an address translation table in which, for example, maximum k pieces of translations are written, a pair of an upper address of (32-s) bits as a translation-source address and an upper address of (32-s) bits as a translation-destination address is stored. The address translator 402 determines whether the upper address of the pre-translation address matches the address of the translation source indicated in the address translation table or not by a comparator 430. When the addresses match, a selector 431 outputs an address of translation destination indicated in the address translation table and, when the addresses do not match, outputs the upper address of the pre-translation address. After that, a coupling device 430 couples the upper address of (32-s) bits output from the selector 431 and a lower address of the pre-translation address of s bits to generate a translated address.

Figure 11A:
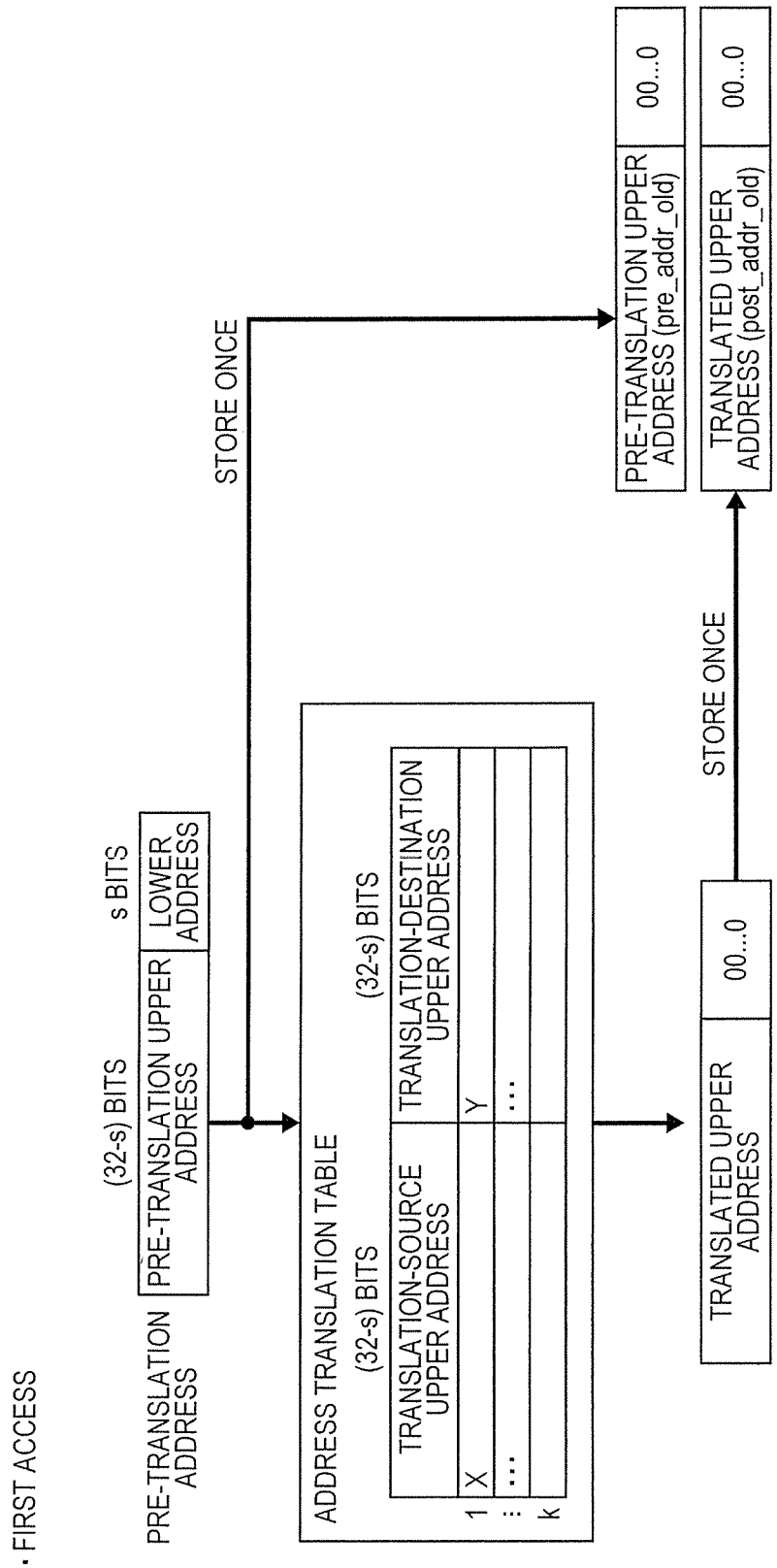
FIG. 11A is a schematic diagram explaining an example of address translation in the case where the size of a data table after updating exceeds the segment size handled by an address translator for a data ROM, and illustrates translation at the time of an access of the first time to the data table.
Figure 11B:
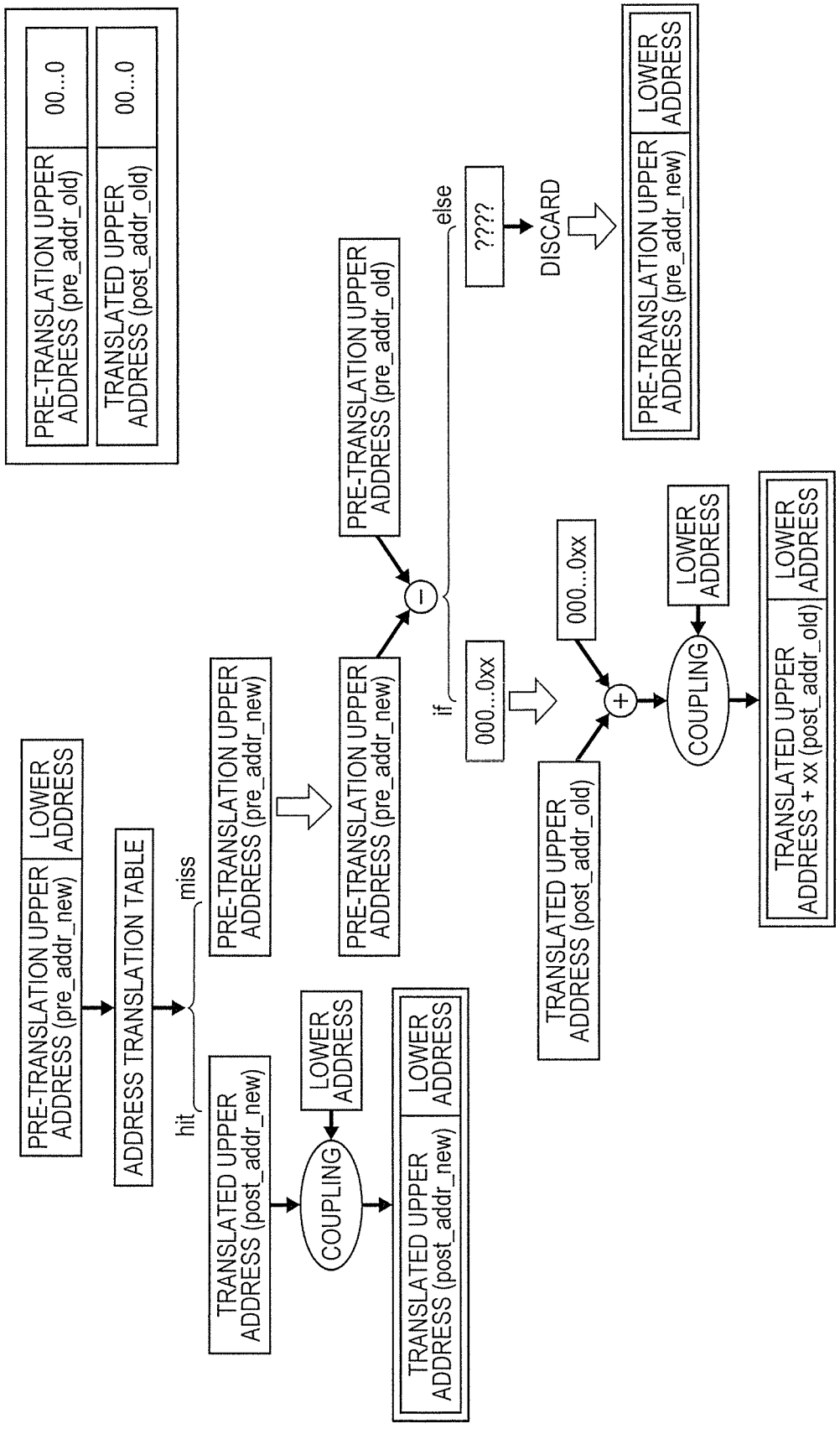
FIG. 11B is a schematic diagram explaining an example of address translation in the case where the size of the data table after updating exceeds the segment size handled by the address translator for a data ROM, and illustrates translation at the time of accesses of the second and subsequent times to the data table.

The procedure of executing an update program using the address translator 402B for the data ROM is also a procedure of translating an upper address of a translation source to an upper address of a translation destination, coupling a lower address to the resultant address, and accessing a data table or the like on the data ROM 408 newly located. A devise as will be described may be added. By the following device, also in the case where a data table of a sequence newly located or the like becomes a large data table exceeding the segment size handled by the address translator 402B for the data ROM, updating can be realized. FIGS. 11A and 11B are schematic diagrams explaining an example of address translation in the case where the size of a data table after updating exceeds the segment size handled by the address translator 402B for a data ROM. FIG. 11A illustrates translation at the time of a first access to the data table. FIG. 11B illustrates translation at the time of second and subsequent accesses to the data table.

In this case as well, it is assumed that the number of bits of an address is 32 bits and the segment size set in the address translator 402 is $2^s$ bytes. That is, the segment size becomes the size of an S-bit address space. Generally, in accesses to a data table, the addresses of the accesses vary only by an address offset of sequence elements or the like.

At the time of the first access to the data table, the address translator 402B for the data ROM stores once a pre-translation upper address (pre_addr_old) and a translated upper address (post_addr_old) based on an address translation table into a register or the like. At the time of the first access, the address translator 402B for the data ROM couples a bit sequence of s bits which are all 0 is coupled to the upper address after the translation, and outputs the resultant as a translated address. At the time of the second and subsequent accesses to the data table, the address translator 402B for the data ROM outputs a translated address as follows. The pre-translation upper address at the time of the second and subsequent accesses is described as pre_addr_new. When pre_addr_new matches the translation-source address of the address translation table, the address translator 402B for the data ROM couples the translation-destination upper address indicated in the address translation table and the input lower address and outputs the resultant as a lower address. On the contrary, when pre_addr_new does not match the translation-source address of the address translation table, the address translator 402B for the data ROM obtains the difference addr_diff between pre_addr_new and pre_addr_old. That is, addr_diff pre_addr_new−pre_addr_old is calculated. When all of the bits other than the predetermined lower t bits of the difference addr_diff are zero, the address translator 402B for the data ROM couples the upper address (post_addr_old+addr_diff) generated by the sum of post_addr_old and addr_diff to the lower address and outputs the resultant. When all of the bits other than the predetermined lower t bits of the difference addr_diff are not zero, the address translator 402B for the data ROM couples pre_addr_new and the lower address and outputs the resultant. That is, in this case, the address translator 402B for the data ROM determines that the access is not an access to the data table anymore and outputs the input address without translation.

By the address translation method, a new program can be adapted to, for example, the case where the size of a sequence originally disposed in a data ROM becomes large so as to exceed the border of segments. With respect to an address to a part to which the sequence size matches, in a default program and an update program, the same address can be accessed by the address translator. Consequently, when there is no change in the value of the same address, only a program code performing an access to an increased part becomes a differential code. Particularly, in an address translation method which will be disclosed hereinlater, the differential code performing an access to an increased part can be a code performing an access to an address successive to the address of the part to which the sequence size matches.

Figure 12:
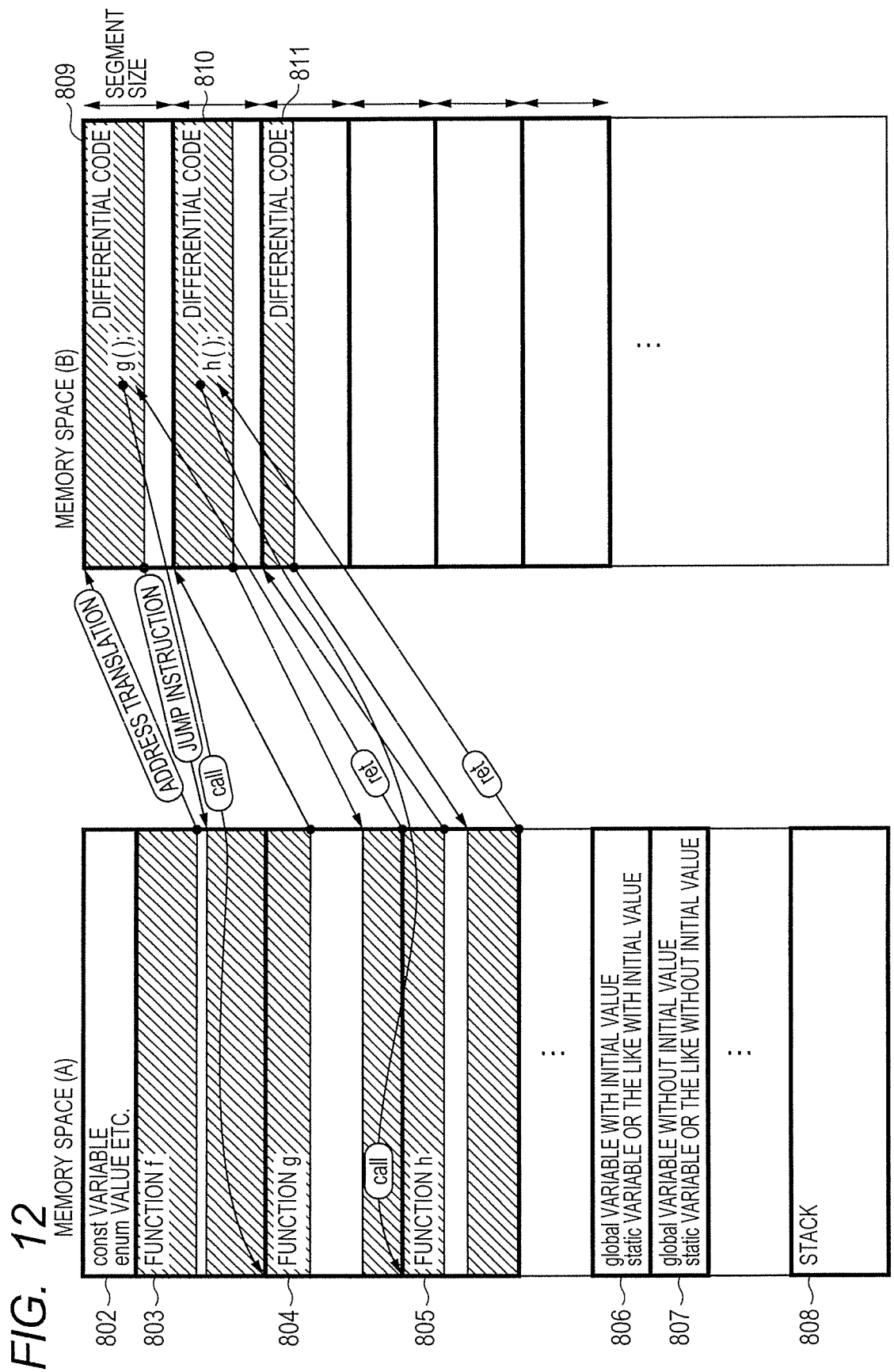
FIG. 12 is a schematic diagram illustrating a state of program execution transition between a pre-update program and a differential program.

Next, program execution transition between a pre-update program and a differential program will be described. FIG. 12 is a schematic diagram illustrating a state of program execution transition between a pre-update program and a differential program. In this case, an object code of a pre-update program is disposed in a memory space A. In the memory space A, for example, a const variable, a constant variable disposed in a text segment such as an enumerated-type value, and its value are disposed in a memory region 802, a function f is disposed in a memory region 803, a function g is disposed in a memory region 804, a function h is disposed in a memory region 805, a variable with an initial value is disposed in a memory region 806, a variable without an initial value is disposed in a memory region 807, and a stack or the like is disposed in a memory region 808. In a memory space B, object codes of an update differential program are disposed. It is assumed that a patch 809 corresponds to an update differential program object code corresponding to a part of the function f, a patch 810 corresponds to an update differential program object code corresponding to a part of the function g, and a patch 811 corresponds to an update differential program object code corresponding to a part of the function h. An example of the program execution transition between the codes written in FIG. 12 will now be described.

First, during execution of the function f by the CPU 401, execution of the program shifts to the head address of a patch 809. In execution of the function g in the patch 809, the head address of the function g disposed in the memory space A is called. After completion of the calling of the function g, the execution of the program shifts to the next address of the position of calling the function g in the patch 809, and the remaining program in the patch 809 is executed. After completion of the execution of the patch 809, the execution of the program shifts to the address of the function f to which the program should return. Next, during execution of the function g by the CPU 401, the execution of the program shifts to the head address of the patch 810 by address translation. In execution of the function h in the patch 810, the head address of the function h disposed in the memory space A is called. After completion of the calling of the function h, the execution of the program shifts to the address next to the call position of the function h in the patch 810, and the remaining program of the patch 810 is executed. Then, the execution of the program shifts to the address of the function g to which the program should return after completion of the execution of the patch 810. Next, during execution of the function h in the CPU 401, by the address translation, the execution of the program shifts to the head address of the patch 811. The execution of the program shifts to the address of the function h to which the program should return after completion of the execution of the patch 811. After that, the CPU 401 continues execution of the function h and completes the execution of the program.

Figure 13:
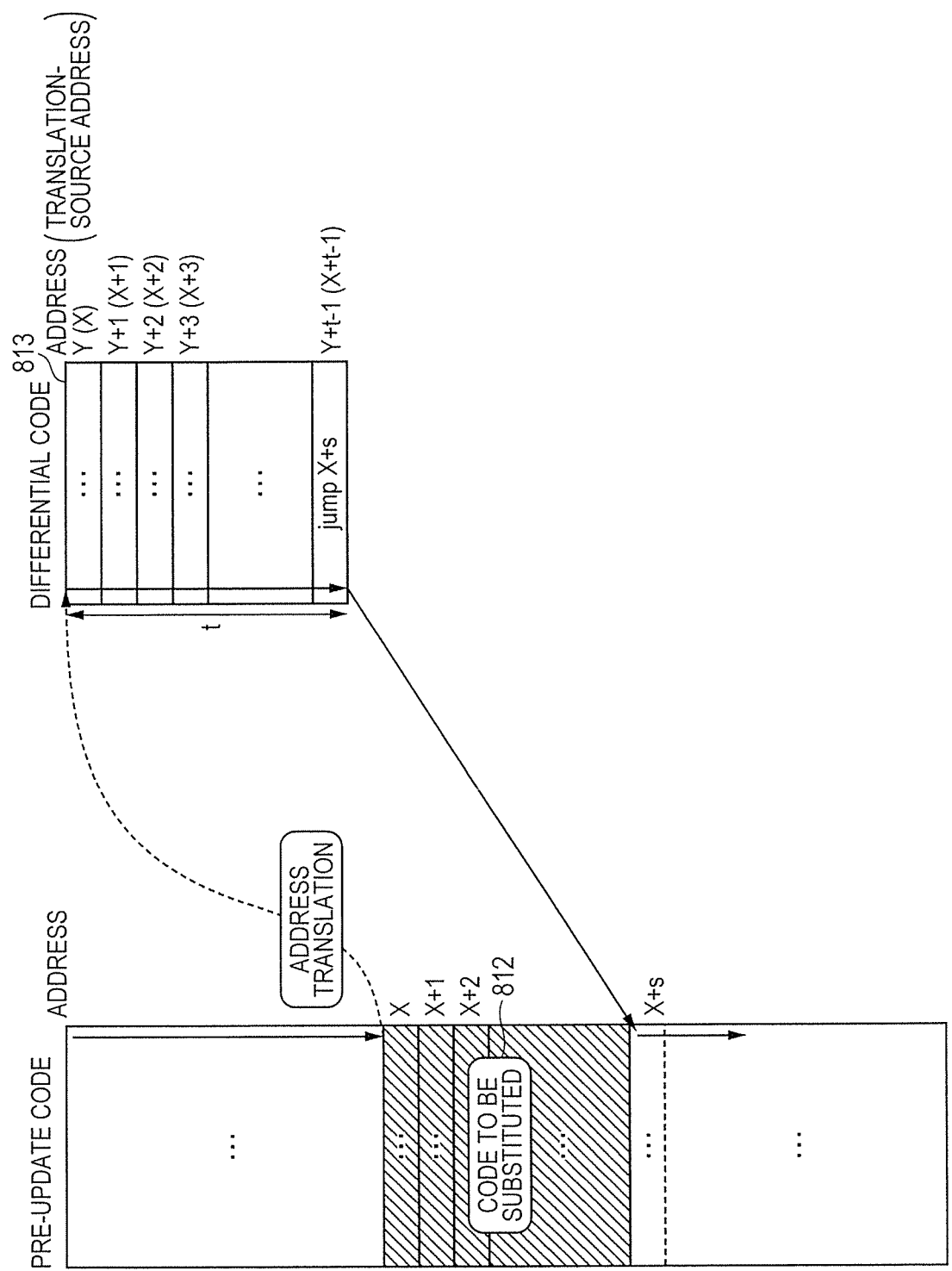
FIG. 13 is a schematic diagram illustrating an example of correspondence between a translated address and a differential code.

An example of correspondence between a translated address and a differential code will now be described with reference to FIGS. 13 to 16. FIG. 13 is a schematic diagram illustrating an example of correspondence between a translated address and a differential code. The case that the updated program is executed by replacing a code 812 to be substituted with a differential code 813 will be described as an example. The example illustrated in FIG. 13 relates to the case that a differential code size t is the same as the size s of a code to be substituted or smaller than the size s of the code to be substituted, and the case that s and t are equal to or less than a segment size set in the address translator 402A for a program. When execution of the program by the CPU 401 reaches the head address of the code 812 to be substituted, the address set in the program counter is translated to the head address of the differential code 813 by the address translator 402A for program, and program transition is executed. While the address translator 402A for program sequentially translates a pre-translation address to an address of the differential code 813, the program execution is continued to the ending address of the differential code 813. In the ending address of the differential code 813, a jump instruction to the address next to the ending address of the code 812 to be substituted is disposed, and execution of the remaining program is restarted.

Figure 14:
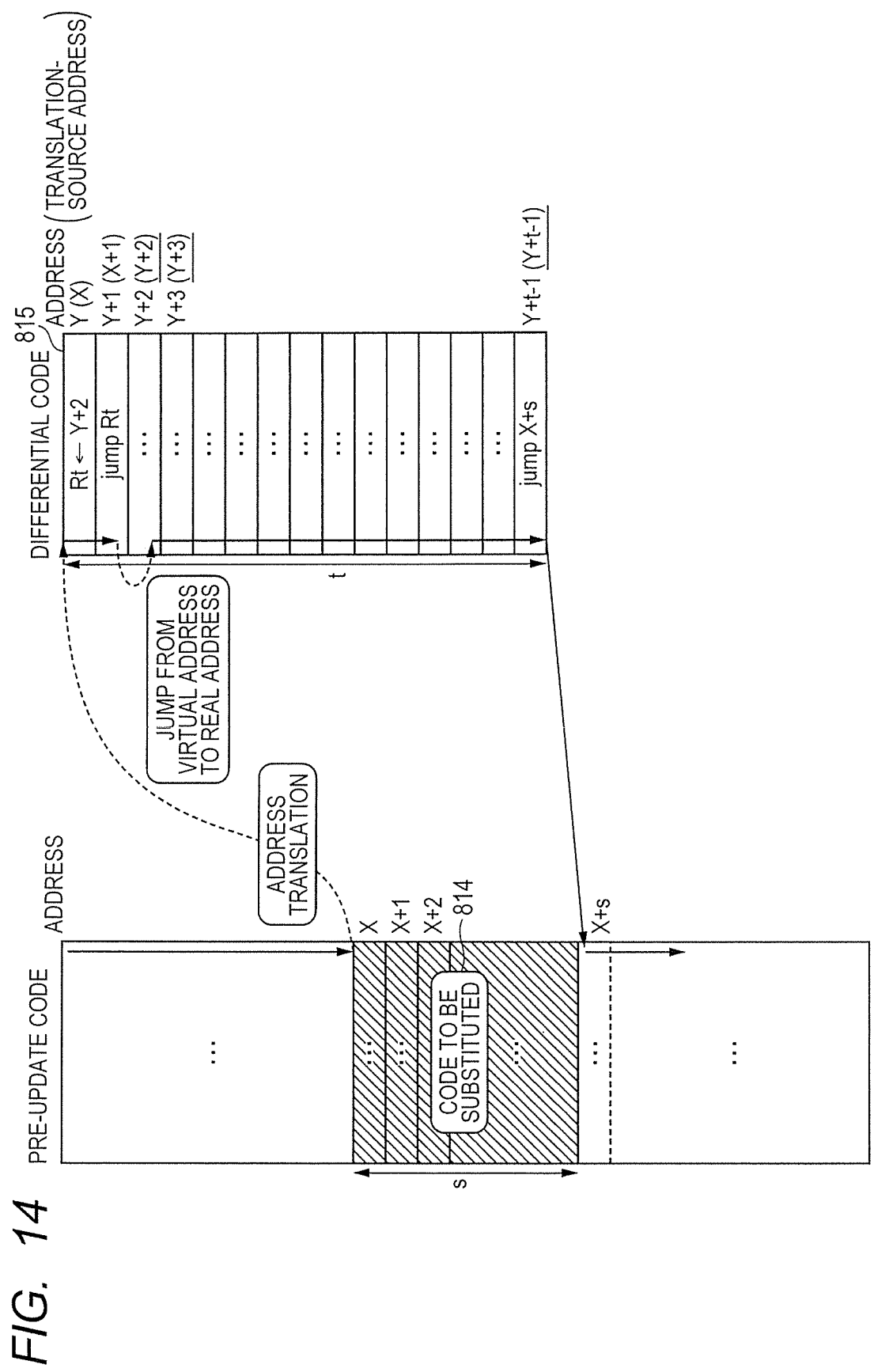
FIG. 14 is a schematic diagram illustrating another example of correspondence between the translated address and the differential code.

FIG. 14 is a schematic diagram illustrating another example of correspondence between the translated address and the differential code. A case of executing an updated program by replacing a code 814 to be substituted with a differential code 815 will be described as an example. The example illustrated in FIG. 14 corresponds to a case where the differential code size t is larger than the size s of the code to be substituted or a case where any of s or t is larger than the segment size set in the address translator 402A for program. When the program execution by the CPU 401 reaches the head address of the code 814 to be substituted, the address set in the program counter is substituted to the head address of the differential code 815 by the address translator 402A for program, and program transition is executed. At the head of the differential code 815, an instruction related to the jump instruction to the start address of the update differential program is disposed. The instruction related to the jump instruction includes an object code executing a jump and, as necessary, may include an object code executing saving and recovery of data stored in a register and an object code executing calculation of the address of a jump destination. There is a case that the object code executing saving and recovery of data stored in a register becomes necessary for the following reasons. Generally, insertion of an instruction calculating a jump destination address of a jump instruction is necessary. An instruction sequence and a jump instruction necessary for address calculation for a jump instruction are inserted at the time of generating an update differential binary, and the instruction sequence does not originally exist in an update program for generating an update differential binary. That is, the instruction sequence is an instruction sequence which does not originally appear when the update program is executed. Therefore, execution of the instruction sequence may produce a CPU register state different from the original CPU register state. Consequently, by holding the register state of the CPU before execution of the instruction sequence by saving it in a register and recovering the register state after the execution, the influence of the instruction sequence on the CPU register state can be eliminated. The address of the jump destination is, for example, the address next to the address in which the object code of the instruction sequence related to the jump instruction is completed. Therefore, after the program transition by the jump instruction, the CPU 401 continues the program execution until the ending address of the differential code 815. At the ending address of the differential code 815, the jump instruction to the address next to the ending address of the code 814 to be substituted is disposed, and execution of the remaining program of the pre-update code is restarted.

As described above, when the size of a differential code which can replace the code of the part to be substituted is larger than that of the code of the part to be substituted in the program or when the size of the code to be substituted or the size of the differential code is larger than the segment size, the address translator 402 performs the following address translation. Specifically, the address translator 402 translates the start address of the code of the part to be substituted to an address in which an instruction related to a jump instruction to the start address of an instruction sequence replacing the code of the part to be substituted is stored. By such a manner, when the size of the differential code replacing the code of the part to be substituted is larger than the size of the code of the part to be substituted in the program, or when the size of the code to be substituted or the size of the differential code is larger than the segment size, execution of the updated program can be properly realized.

Figure 15:
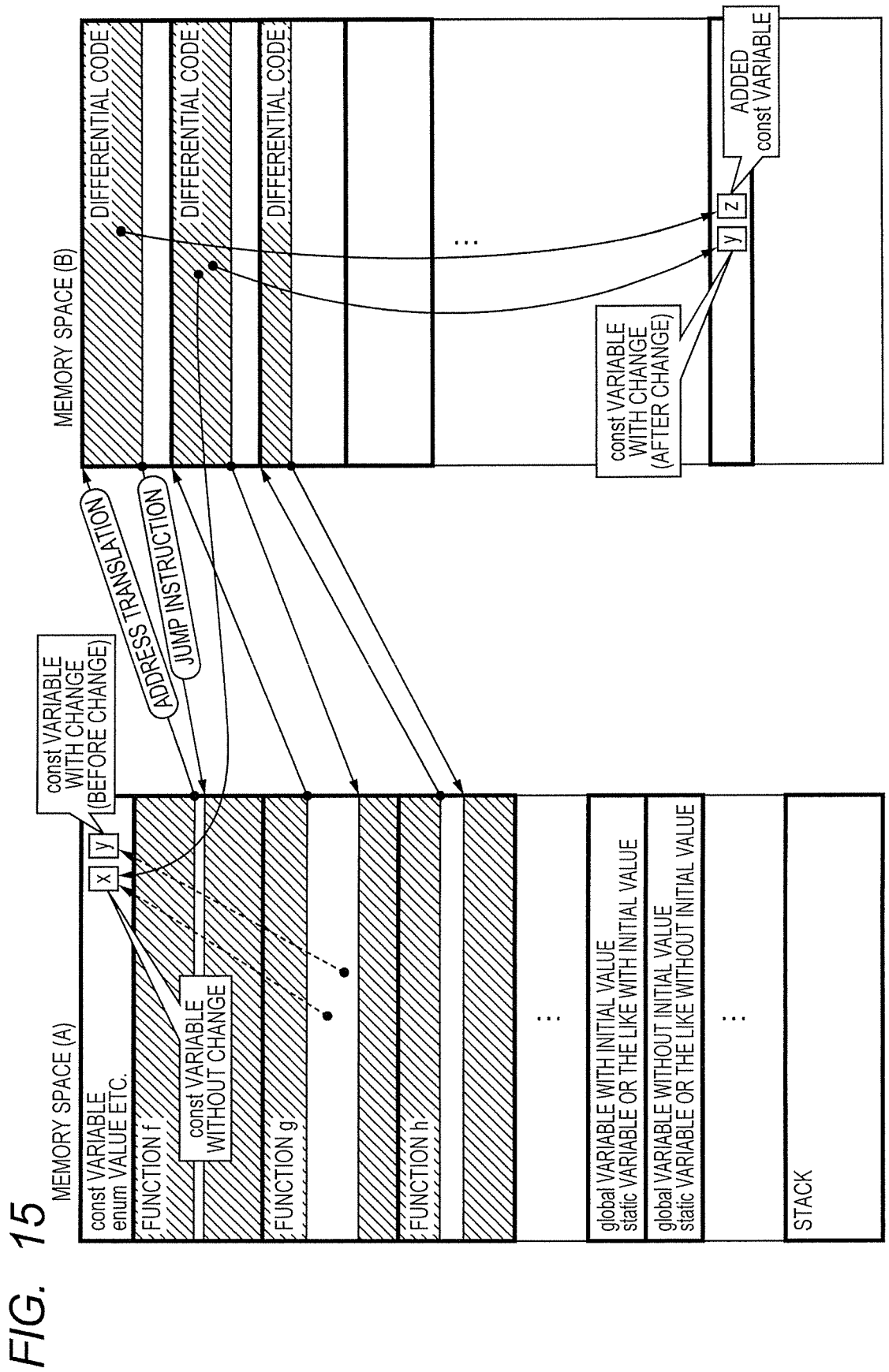
FIG. 15 is a schematic diagram illustrating an example of correspondence between a translated address and a differential code in the case where a variable is updated.

An example of the case where a variable is updated will be described with reference to FIGS. 15 and 16. FIG. 15 is a schematic diagram illustrating an example of correspondence between a translated address and a differential code in the case where a variable is updated. The diagram relates to the case where a code to be substituted is substituted by a differential code and an updated program is executed, and corresponds to an example that there is addition or change of a constant variable disposed in a text segment such as a Const variable or an enumeration value or addition of a variable with an initial value and the variables are accessed only from the differential code. Referring to the variable disposed in the memory space B not the variable originally disposed in the memory space A with respect to the part in which the variable is added or changed, the program is executed according to the execution method of FIG. 13 or 14. The variables are disposed newly as a part of a differential code in the memory space B in which a differential code is disposed. At the time of executing a differential code, with respect to the part in which a variable is added or changed, the program is executed with reference to the variable in the memory space B not the variable originally disposed in the memory space A, thereby realizing updating of the value of the variable.

Figure 16:
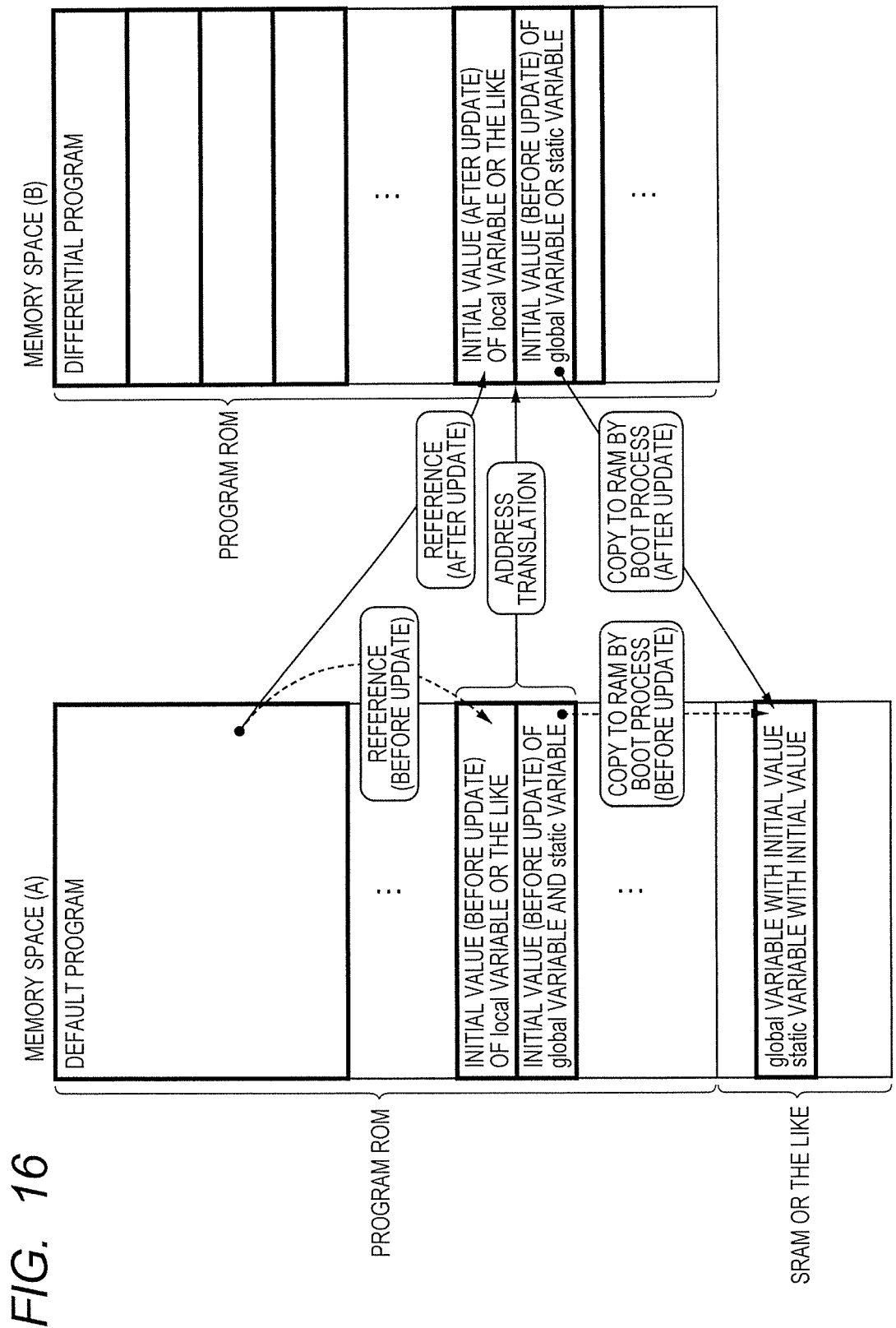
FIG. 16 is a schematic diagram illustrating another example of correspondence between a translated address and a differential code in the case where a variable is updated.

FIG. 16 is a schematic diagram illustrating another example of correspondence between a translated address and a differential code in the case where a variable is updated. The diagram relates to the case where a code to be substituted is substituted by a differential code and an updated program is executed, and corresponds to an example that there is a change in an initial value of a variable with an initial value as a global variable or a variable with an initial value as a local variable, or there is an addition of a variable with initial value which is referred to from a pre-update code. Referring to a variable group newly disposed in the memory space B using an address translating mechanism with respect to a part in which the value is added or changed, the program is executed according to the execution method of FIG. 13 or 14. With respect to a part where an initial value is changed or a variable with an initial value is added, a variable group to be added or a changed variable group for a group of variables disposed in the memory space A and influenced by the change or addition is newly disposed in the memory space B in which a differential code is disposed. At the time of executing a differential code, by executing the differential code with reference to the variables by using the address translating mechanism, program execution accompanying addition or change can be realized. Particularly, in the case of a local variable, a variable disposed in the memory space B is accessed. On the other hand, in the case of a global variable, when a variable disposed in the memory space B is rebooted, after it is expanded in a data segment (the SRAM 406 in the case where the data segment is assigned or the data ROM 408 in the case where the data segment is assigned to the data ROM 408), the program execution accompanying addition or change of a variable with an initial value is executed. Such expansion is executed by a data ROM erase/write process function for updating a global variable of a BIOS function or a data ROM write process function for updating a global variable which will be described later. An update differential binary is configured so that a proper argument is passed to those functions to carry out call and execution.

Figure 17:
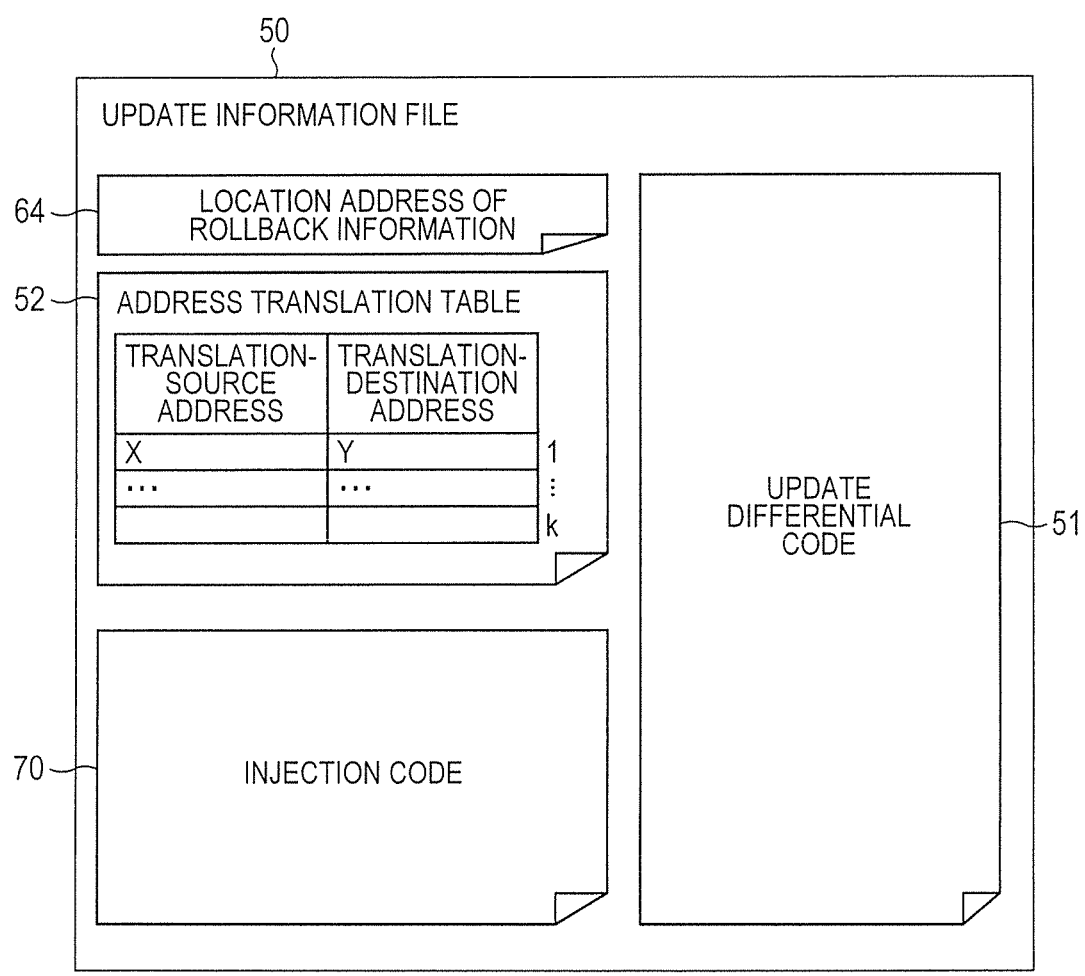
FIG. 17 is a schematic diagram illustrating a configuration example of an update information file.

Next, the details of the update information file 50 will be described. The update information file 50 is used to update a program of an embedded device. As described above, the update information file 50 is constructed by the rollback information location address 64, the address translation table 52, the injection code 70, and the update differential program object code 51 (FIG. 17). Hereinafter, each of the elements of the update information file 50 will be described.

The rollback information location address 64 is, for example, information of a program restoration point when some abnormality is detected in program updating. In the embodiment, it refers to the head address of a storage region in an address translation table corresponding to an update differential program object code which was patched before. It is assumed that the address translation table is stored in the data ROM 408 or the like. There is the possibility that a plurality of address translation tables are disposed. In the case of designating, as a restoration point, a state where no address translation table is referred to, that is, a state where no patch is applied, an injection code for invalidating the address translator 402 is generated.

The address translation table 52 is, as described above, a table describing a correspondence relation of address translation for update differential program execution, using the head address of a code part to which a patch is applied in a pre-update program as a translation-source address and the head address of the patch as a translation-destination address. In the embodiment, concretely, the address translation table 52 is a table describing the corresponding relation between an upper address of the translation-source address and an upper address of the translation-destination address. It is assumed here that k pieces of correspondence relations of address translation can be designated. k denotes a constant such as 32 and is determined by hardware specifications or the like.

The injection code 70 is a program group used to call a BIOS program for executing disposition of the update differential program object code 51 into the program ROM 407, disposition of the address translation table 52 into the data ROM 408, setting of the address translation table 52 to the address translator 402, validation of the address translator 402, erasure of data in the program ROM 407 or data ROM 408 as necessary, rollback process using detection of abnormality as a trigger, expansion of the BIOS program for executing those processes from the data ROM 408 to the program ROM 407, and the like. In this case, the injection code is a program for passing a proper argument to a corresponding BIOS routine and calling the BIOS routine. As a method of executing the injection code, for example, an injection code is disposed in the SRAM 406 via the CAN interface 409, a program counter is moved to the address in which the injection code is disposed by the interrupt controller 403, and the injection code is executed. By the execution of the injection code, the corresponding BIOS starts, and data transferred to the SRAM 406 via the CAN interface 409 such as an update differential binary is disposed in the program ROM 407 or the data ROM 408. The disposition location of the BIOS code may be in a plane which is not in execution in the program ROM 407 or a plane which is not in execution in the data ROM 408. The injection code may be executed in an interrupt handler which is activated by an interrupt from the CAN interface 409. For example, in the case of always executing the injection code by an interruption, all of BIOS codes may be written to clear the interruption and execute a halt instruction at the end of the execution.

Figure 18:
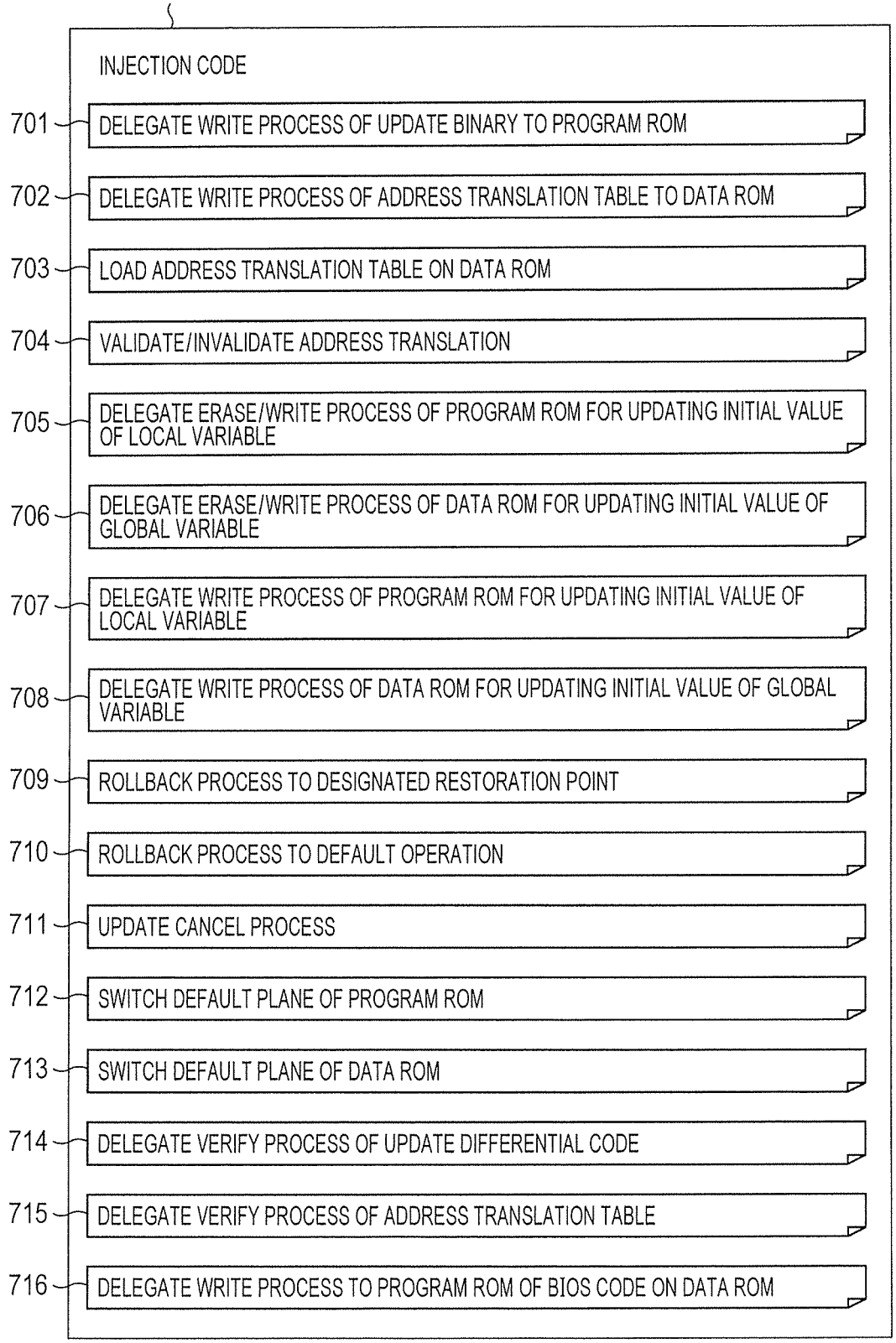
FIG. 18 is a schematic diagram illustrating a configuration example of an injection code.

FIG. 18 is a schematic diagram illustrating a configuration example of an injection code. The injection code 70 is constructed by, for example, an injection code 701 of write process delegation to the update binary program ROM 407, an injection code 702 of write process delegation to the data ROM 408 in the address translation table, an injection code 703 of loading the address translation table on the data ROM 408, an injection code 704 of validating/invalidating address translation, an injection code 705 of ease/write process delegation of the program ROM 407 for updating the initial value of a local variable, an injection code 706 of erase/write process delegation of the data ROM 408 for updating the initial value of a global variable, an injection code 707 of write process delegation of the program ROM 407 for updating the initial value of a local variable, an injection code 708 of rollback process to a designated recovery point, an injection code 710 of the rollback process to a default operation, an injection code 711 of updating cancel process, an injection code 712 of default plane switching of the program ROM 407, an injection code 713 of default plane switching of the data ROM 408, an injection code 714 of verify process (signature verifying process) delegation of an update differential code, an injection code 715 of verify process (signature verifying process) of an address translation table, an injection code 716 of write process delegation to the program ROM 407 of the BIOS code on the data ROM 408, and the like. The details of each of the injection codes will be described later.

Figure 19:
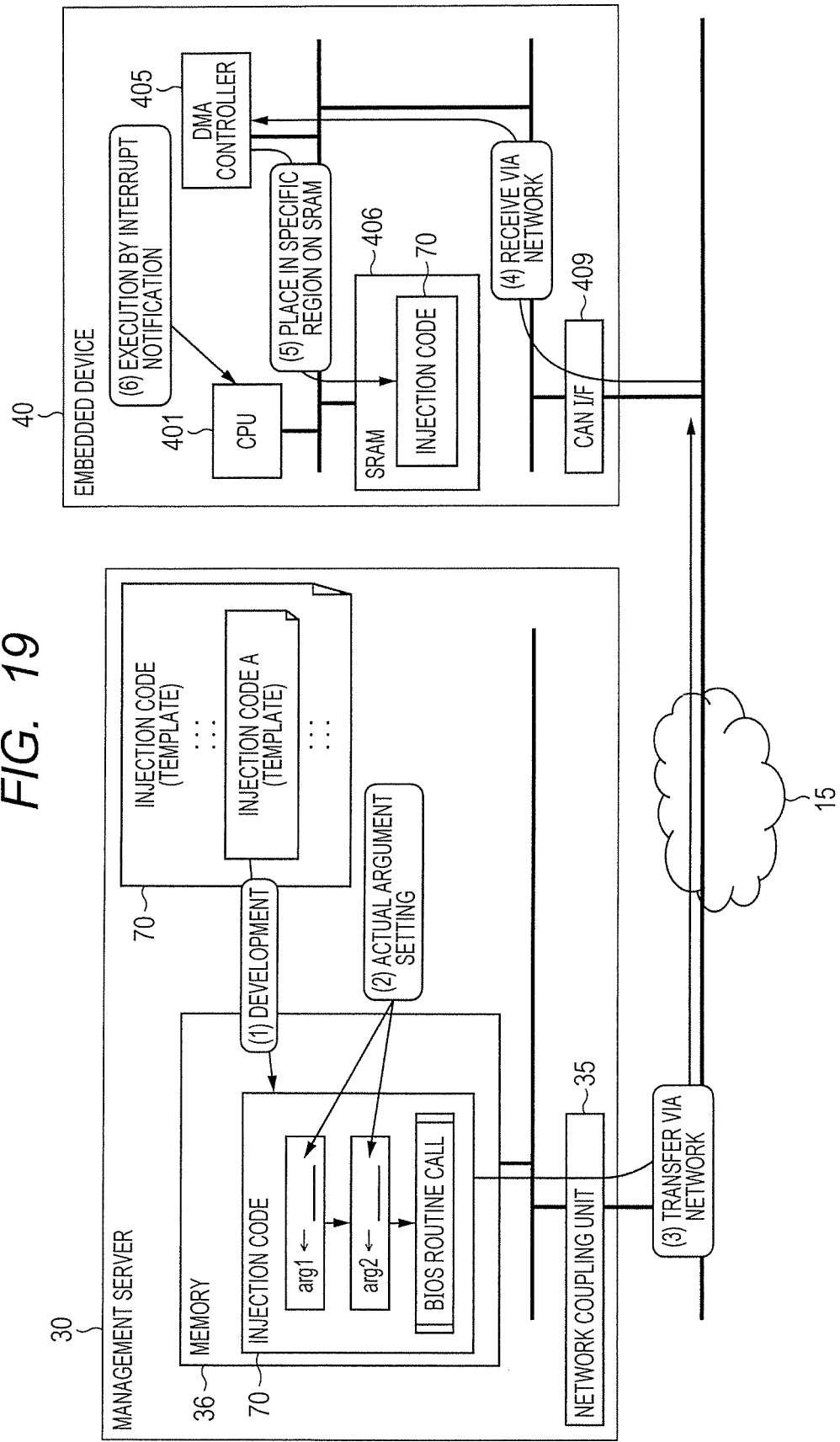
FIG. 19 is a schematic diagram explaining the flow until an injection code is executed.

Next, the flow until the injection code is executed will be described. FIG. 19 is a schematic diagram explaining the flow until an injection code is executed. First, a template of an injection code (injection code A) to be generated is selected from an injection code template group in the management server 30 and expanded onto a memory 36 of the management server 30 (refer to (1) in the diagram). Next, in the management server 30, according to an argument definition of an injection code, an actual argument is set to the injection code A (refer to (2) in the diagram). Then the injection code A in which the actual argument is set is transmitted from the network I/F such as the network coupling unit 35 in the management server 30 to the network 15 (refer to (3) in the diagram). The embedded device 40 receives the injection code A in which the actual argument is set via the network from the network I/F such as the CAN interface 409 (refer to (4) in the diagram). For example, a data transfer program on the DMA controller 405 or the CPU 401 is started by an interrupt from the CAN interface 409 and the injection code A in which the actual argument is set is disposed in a specific region in the SRAMA controller 406 (refer to (5) in the diagram). The injection code A in which the actual argument disposed in the specific region in the SRAM 406 after notification of an interrupt expressing disposition completion in the case of using a DMA Controller 405, or after notification of a data transfer program on the CPU 401 in the case of using the data transfer program.

Figure 20:
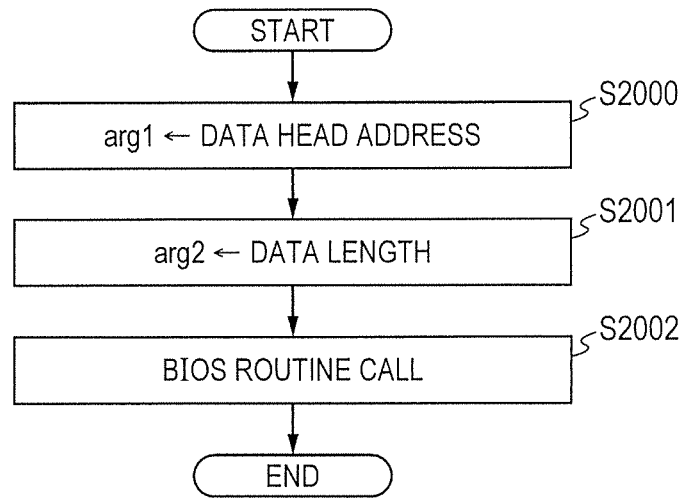
FIG. 20 is a flowchart illustrating an example of procedure of a process of calling a BIOS routine code corresponding to a process in an injection code.

Hereinafter, each of the injection codes will be described. FIG. 20 is a flowchart illustrating an example of procedure of a process of calling a BIOS routine code corresponding to processes in the injection code 703 of loading an address translation table on the data ROM 408, the injection code 714 performing verification process delegation of an update differential code, or a process in the injection code 715 performing verification process delegation of an address translation table.

First, in step 2000 (S2000), the data head address is disposed in a first argument arg1. In the case of the injection code 703 of loading the address translation table on the data ROM 408, the head address of a read source is set as a first argument arg1. In the case of the injection code 714 performing verifying process delegation of an update differential code and the injection code 715 performing verifying process delegation of an address translation table, the head address of an object to be verified is set as the first argument arg1. Next, the data length is disposed as a second argument arg2 in step S2001 (S2001). In the case of the injection code 703 of loading the address translation table on the data ROM 408, the data length of data to be read is set as the second argument ang2. In the case of the injection code 714 performing verifying process delegation of an update differential code and the injection code 715 performing verifying process delegation of an address translation table, the data length of an object to be verified is set as the second argument arg2. Next, in step 2002 (S2002), the corresponding BIOS routine is called.

In the BIOS routine called by the injection code 703 of loading the address translation table on the data ROM 408, the address translation table on the data ROM 408 is loaded. An example of execution is as follows. In a state where the address translation table is disposed in the SRAM 406 by DMA transfer by an interrupt from the CAN interface 409, the injection code 703 of the address translation table on the data ROM 408 is disposed in the SRAM 406. The injection code is executed by the interrupt, and a BIOS routine call is generated. In the BIOS routine, the address translation table disposed in the SRAM 406 is set in the address translator 402.

In the BIOS routine called by the injection code 714 of the verify process delegation of the update differential code, a process of verifying the object code of the update differential program is executed. An execution example is as follows. In a state where the object code of an update differential program with a signature is disposed in the SRAM 406 by DMA transfer by an interrupt from the CAN interface 409, the injection code 714 of the verify process delegation of the code is disposed in the SRAM 406 by an interrupt from the CAN interface 409, the injection code is executed by the interrupt, and a BIOS routine call is generated. In the BIOS routine, a process of verifying the signature of the object code of the update differential program disposed in the SRAM 406 is executed.

In the BIOS routine called by the injection code 715 of the verify process delegation of the address translation table, a process of verifying the signature of the address translation table is executed. An execution example is as follows. In a state where an address translation table with a signature is disposed in the SRAM 406 by DMA transfer by an interrupt from the CAN interface 409, the injection code 715 of the verify process delegation of the address translation table is disposed in the SRAM 406 by an interrupt from the CAN interface 409, the injection code is executed by the interrupt, and a BIOS routine call is generated. In the BIOS routine, the signature of the address translation table disposed in the SRAM 406 is verified.

Figure 21:
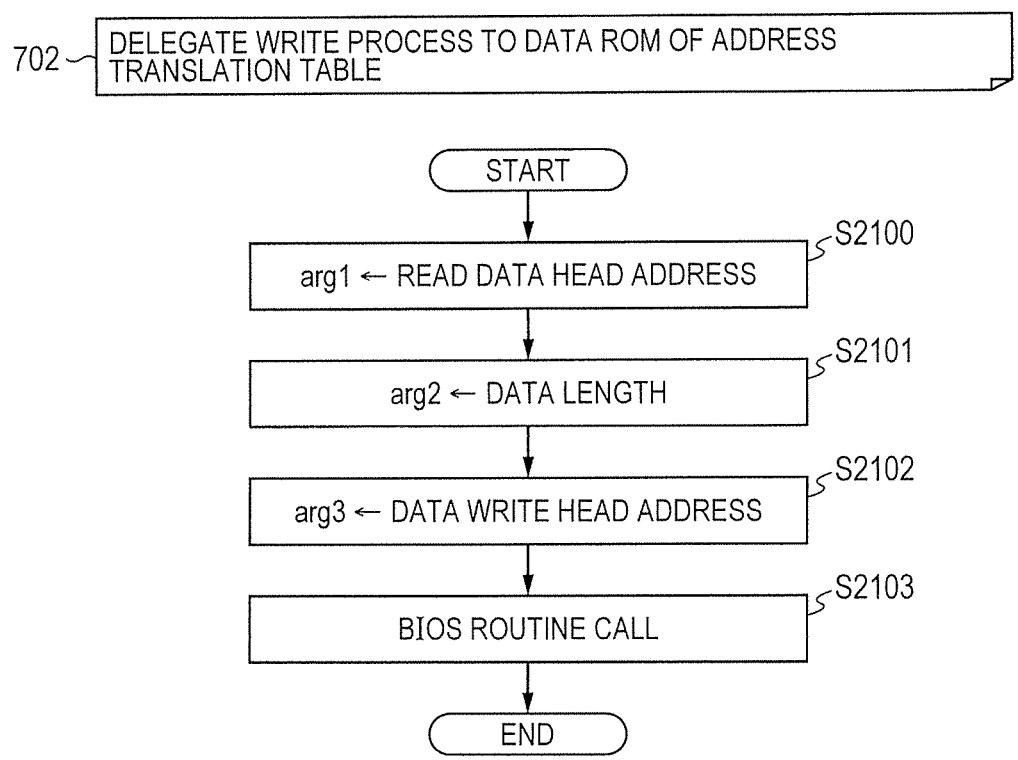
FIG. 21 is a flowchart illustrating an example of procedure of a process of calling a BIOS routine code corresponding to a process in an injection code.

FIG. 21 is a flowchart illustrating an example of procedure of a process of calling a BIOS routine code corresponding to a process in the injection code 702 of performing delegation of a writing process to the data ROM 408 of the address translation table. First, in step 2100 (S2100), the head address of read data is disposed in a first argument arg1. In step 2101 (S2101), the data length is disposed in a second argument arg2. In step 2102 (S2102), the head address of a data write destination is disposed in a third argument arg3. In step 2103 (S2103), a corresponding BIOS routine is called. In the BIOS routine called by the injection code 702 of delegation of the write process to the data ROM 408 of the address translation table, the write process to the data ROM 408 of the address translation table is executed. An execution example is as follows. In a state where the address translation table is disposed in the SRAM 406 by the DMA transfer by an interrupt from the CAN interface 409, the injection code 702 of delegation of the write process to the data ROM 408 of the address translation table is disposed in the SRAM 406 by an interrupt from the CAN interface 409, the injection code is executed by the interrupt, and a BIOS routine call is generated. In the BIOS routine, the write process to the data ROM 408 of the address translation table disposed in the SRAM 406 is executed.

Figure 22:
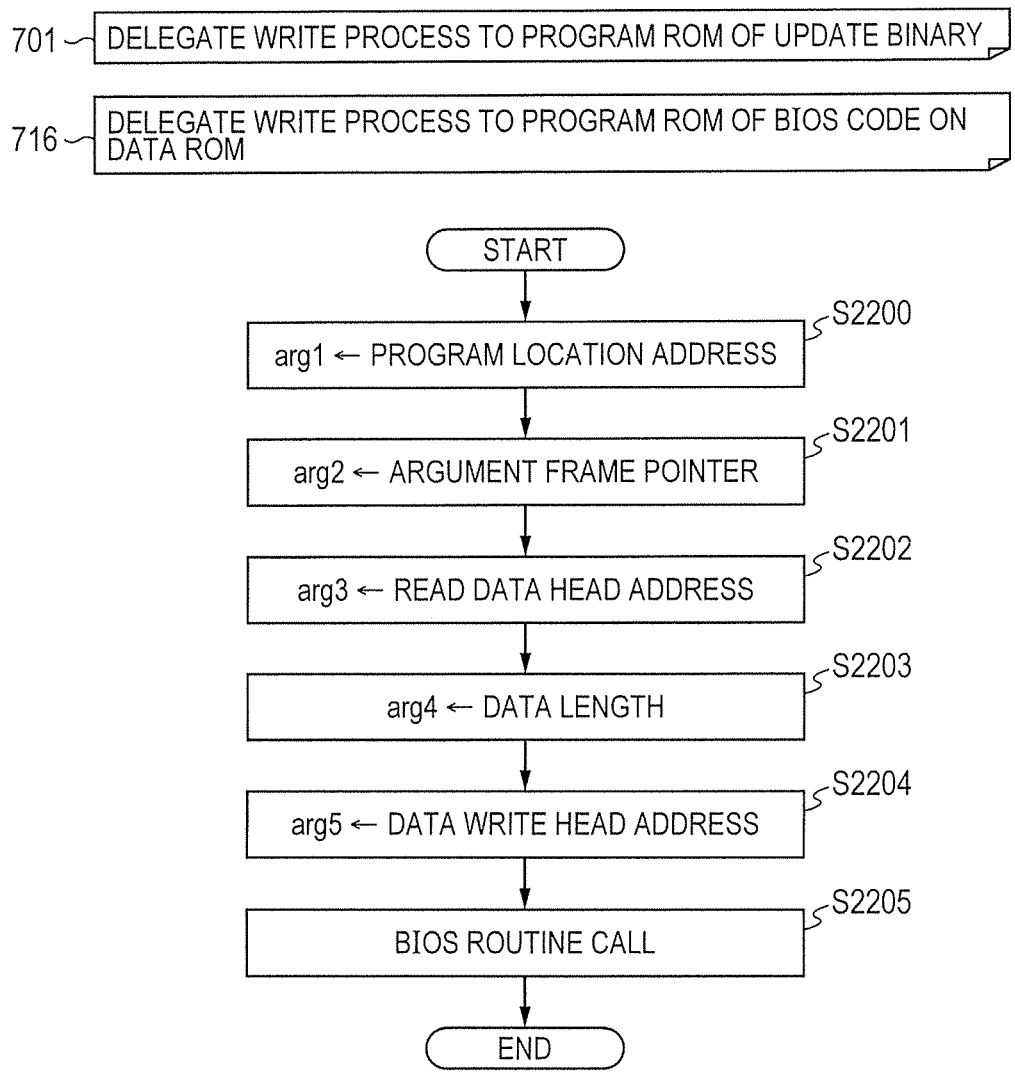
FIG. 22 is a flowchart illustrating an example of procedure of a process of calling a BIOS routine code corresponding to a process in an injection code.

FIG. 22 is a flowchart illustrating an example of procedure of a process of calling a BIOS routine code corresponding to a process in the injection code 701 performing delegation of write process to the program ROM 407 of an object code of an update differential program or in the injection code 716 performing delegation of write process to the program ROM 407 of a BIOS routine code disposed on the data ROM 408. First, in step 2200 (S2200), the address on the SRAM 406 in which a write process program (driver) to the program ROM 407 is disposed in the first argument arg1. The write process program is preliminarily disposed in a specific address in the program ROM 407. Next, in step 2201 (S2201), a frame pointer of an argument passed to the write process program is disposed in the second argument arg2. The arguments set in the steps 2200 and 2201 are arguments necessary to operate the driver of the ROM. It is due to the fact that rewriting of the program ROM 407 has to be executed on the SRAM 406. Subsequently, in step 2202 (S2202), the head address of read data is disposed in the third argument arg3. In step 2203 (S2203), the data length of read data is disposed in the fourth argument arg4. In step 2204 (S2204), the head address of a data write destination is disposed in the fifth argument arg5. In step 2205 (S2205), a corresponding BIOS routine is called.

In a BIOS routine called by the injection code 701 of delegation of the write process to the program ROM 407 of the object code of the update differential program, a write process program to the program ROM 407 is disposed in the address of the SRAM 406 designated as the first argument, the frame pointer designated as the second argument is passed to the write process program, and the write process program is executed, thereby performing the process of writing the object code of the update differential program to the program ROM 407. An execution example is as follows. In a state where the object code of the update differential program is disposed in the SRAM 406 by DMA transfer by an interrupt from the CAN interface 409, the injection code 701 of delegation of the write process to the program ROM 407 of the object code of the update differential program is disposed in the SRAM 406 by an interrupt from the CAN interface 409, the injection code is executed by an interrupt, and a BIOS routine call is generated. In the BIOS routine, the process of writing of the object code of the update differential program disposed in the SRAM 406 to the program ROM 407 is executed. The program of the writing process to the program ROM 407 disposed in the SRAM 406 may be realized as dedicated hardware using the SRAM 406 as a work memory.

In a BIOS routine called by delegation of the process of writing the BIOS routine code disposed on the data ROM 408 to the program ROM 407, a write process program to the program ROM 407 is disposed in the address of the SRAM 406 designated as the first argument, the frame pointer designated as the second argument is passed to the write process program, and the write process program is executed, thereby performing the process of writing the BIOS routine code disposed on the data ROM 408 to the program ROM 407. An execution example is as follows. By an interrupt from the CAN interface 409, the injection code 716 of delegation of the write process to the program ROM 407 of the BIOS routine code disposed on the data ROM 408 is disposed in the SRAM 406, the injection code is executed by an interrupt, and a BIOS routine call is generated. In the BIOS routine, the process of writing the BIOS routine code disposed in the data ROM 408 to the program ROM 407 is executed.

Figure 23:
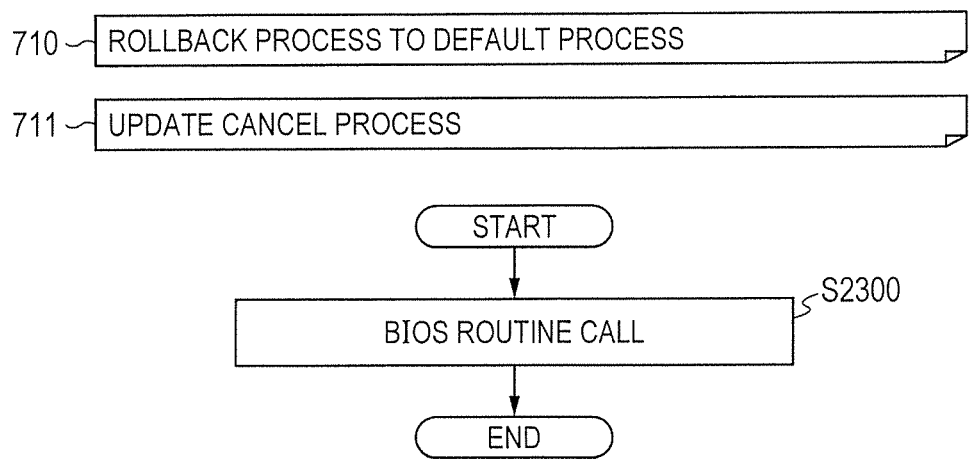
FIG. 23 is a flowchart illustrating an example of procedure of a process of calling a BIOS routine code corresponding to a process in an injection code.

FIG. 23 is a flowchart illustrating an example of procedure of a process of calling a BIOS routine code corresponding to a process in the injection code 710 performing delegation of a rollback process to a default program operation and the injection code 711 performing delegation of an update cancel process. In step 2300 (S2300), a corresponding BIOS routine is called. In a BIOS routine called by the injection code 710 of delegation of the rollback process to the default program operation, the rollback process to the default program operation is executed. An execution example is as follows. The injection code 710 of delegation of the rollback process to the default program is disposed in the SRAM 406 by an interrupt from the CAN interface 409, the injection code is executed by an interrupt, and a BIOS routine call is generated. In the BIOS routine, the rollback process to the default program operation is executed. In the rollback process to the default program operation, for example, setting is made so that invalidation of the address translator 402 is executed at the time of booting in the next restart. In the BIOS routine called by the injection code 711 of delegation of the update cancel process, the update cancel process is executed. An execution example is as follows. By an interrupt from the CAN interface 409, the injection code 711 of delegation of the update cancel process is disposed in the SRAM 406, the injection code is executed by an interrupt, and a BIOS routine call is generated. In the BIOS routine, the update cancel process is executed. In the update cancel process, for example, a written part in the program ROM 407 or the data ROM 408 is checked, and the written part is erased. When the program state is saved before the updating operation, the program state is recovered, and a process of restarting the program from the saved state is performed.

Figure 24:
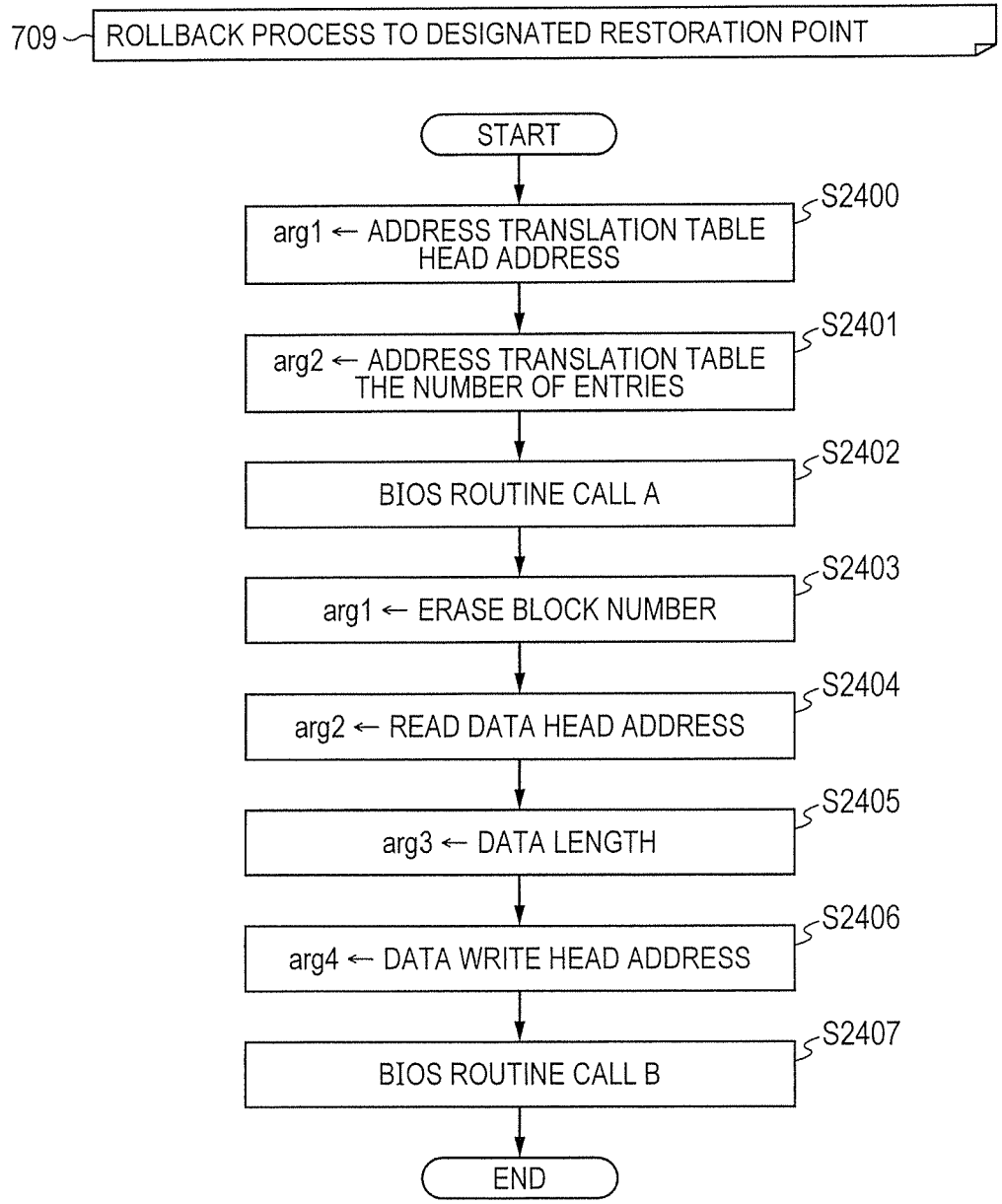
FIG. 24 is a flowchart illustrating an example of procedure of a process of calling a BIOS routine code corresponding to a process in an injection code.

FIG. 24 is a flowchart illustrating an example of procedure of a process of calling a BIOS routine code corresponding to a process in the injection code 709 performing delegation of a rollback process to a designated restoration point. For example, there are the following preconditions for rollback. Specifically, the preconditions are that an update differential code is disposed in the program ROM 407 a plurality of times, a program excluding a local variable and a global variable with an initial value in the update differential code is disposed in the program ROM 407 without being overwritten, and a local variable and a global variable with an initial value included in the update differential code until then are stored in the ROM 408 like an address translation table is stored in the data ROM 408. An update differential code (a program excluding a local variable and a global variable with an initial value) to which the process is rolled back can be set by setting a corresponding address translation table. There is the possibility that a local variable and a global variable with an initial value are already overwritten in some updates, so that the variables have to be rewritten at the time of rollback.

In step 2400 (S2400), the head address of an address translation table corresponding to a restoration point is disposed in the first argument arg1. In step 2401 (S2401), the number of entries of an address translation table corresponding to a restoration point is disposed in the second argument arg2. In step 2402 (S2402), a BIOS routine A setting the address translation table corresponding to the restoration point is called. The following steps 2403 to 2407 are executed only by necessary number of times. In step 2403 (S2403), erase block number is disposed in the first argument arg1. The erase block number is the number of a block to be erased in the program ROM 407 or the data ROM 408 for realizing variable update. In step 2404 (S2404), the head address of a region on the data ROM 408 in which a code corresponding to a variable update part in a differential program to be rolled back is disposed in the second argument arg1. That is, the head address is the head address of read data. In step 2405 (S2405), data length of read data is disposed in the third argument arg3. In step 2406 (S2406), the head address of a data write destination is disposed in a fourth argument arg4. In step 2407 (S2407), a BIOS routine B erasing/writing the program ROM 407 and the data ROM 408 for realizing a disposition state of a local variable and a global variable with an initial value at a designated restoration point is called. By setting an argument as described above, an object to be written in a local variable and a global variable with an initial value included in the update differential code until then, stored in the data ROM 408, is written. Concretely, in the case of a local variable, it is written into a region whose head address is the address on the program ROM 407 designated for program execution. In the case of a global variable, it is written into a region whose head address is the address on the data ROM 408 designated for program execution. In a BIOS routine called by the injection code 709 of delegation of the rollback process to a designated restoration point, the rollback process to the designated restoration point is performed. An execution example is as follows. The injection code 709 of delegation of the rollback process to the designated restoration point is disposed in the SRAM 406 by an interrupt from the CAN interface 409, the injection code is executed by an interrupt, and a BIOS routine is called. In the BIOS routine, the rollback process to the designated restoration point is executed. In the rollback process to the designated restoration point, first, an address translation table corresponding to a restoration point which is designated first is set in the address translator 402 and, next, a process of erasing/writing the program ROM 407 and the data ROM 408 for realizing a disposition state of the local variable and the global variable with an initial value at the designated restoration point is executed.

Figure 25:
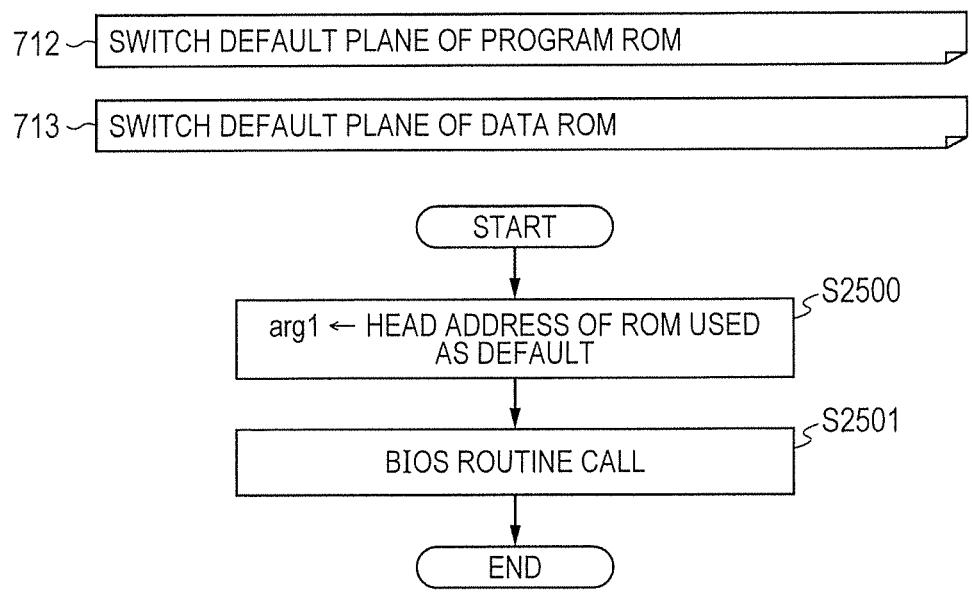
FIG. 25 is a flowchart illustrating an example of procedure of a process of calling a BIOS routine code corresponding to a process in an injection code.

FIG. 25 is a flowchart illustrating an example of procedure of a process of calling a BIOS routine code corresponding to a process in the injection code 712 performing delegation of the process of switching the default program disposition plane of the program ROM 407 or the injection code 713 performing delegation of a process of switching the default program disposition plane in the data ROM 408. In step 2500 (S2500), the head address of the ROM used as a default is disposed in the first argument arg1. In step 2501 (S2501), a corresponding BIOS routine is called. In the BIOS routine called by the injection code 712 of delegation of the process of switching the default program disposition plane in the program ROM 407, the process of switching the default program disposition plane in the program ROM 407 is executed. In the BIOS routine called by the injection code 713 of delegation of the process of switching the default program disposition plane in the data ROM 408, the process of switching the default program disposition plane in the data ROM 408 is executed. An execution example is as follows. By an interrupt from the CAN interface 409, the injection codes 712 and 713 of delegation of the process of switching the default program disposition plane in the program ROM 407 and the data ROM 408 are disposed in the SRAM 406. The injection codes are executed by an interrupt, and a BIOS routine is called. In the BIOS routine, the process of switching the default program disposition plane in the program ROM 407 and the data ROM 408 is executed.

Figure 26:
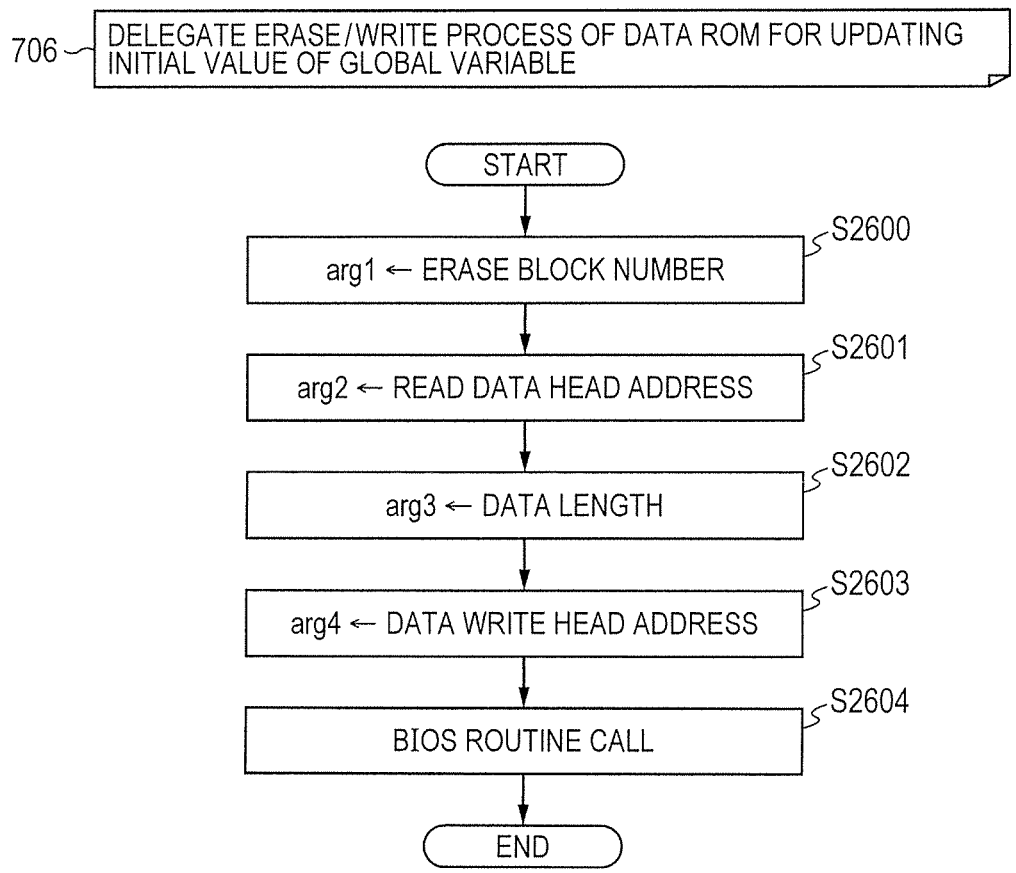
FIG. 26 is a flowchart illustrating an example of procedure of a process of calling a BIOS routine code corresponding to a process in an injection code.

FIG. 26 is a flowchart illustrating an example of procedure of a process of calling a BIOS routine code corresponding to a process in the injection code 706 performing delegation of erase and write process of the data ROM 408 for realizing updating of a global variable. In step 2600 (S2600), an erase block number is disposed in the first argument arg1. The erase block number is the number to be erased in the data ROM 408 for realizing variable updating. In step 2601 (S2601), the head address of a region in the data ROM 408 or the SRAM 406 in which the code corresponding to a global variable update part in a differential program as a rollback object is disposed in the second argument arg2. That is, the head address is the head address of read data. In step 2602 (S2602), the data length of read data is disposed in a third argument arg3. In step 2603 (S2603), the head address of a data write destination is disposed in a fourth argument arg4. In step 2604 (S2604), a corresponding BIOS routine is called. In the BIOS routine called by the injection code 702 of delegation of the write and erase process to the data ROM 408 for realizing updating of a global variable, the erase and write process to the data ROM 408 for realizing updating of a global variable is executed. An execution example is as follows. By an interrupt from the CAN interface 409, the injection code 706 of delegation of the erase and write process to the data ROM 408 for realizing update of a global variable is disposed in the SRAM 406. The injection code is executed by an interrupt, and a BIOS routine call is generated. In the BIOS routine, the erase and write process to the data ROM 408 for realizing updating of a global variable is executed.

Figure 27:
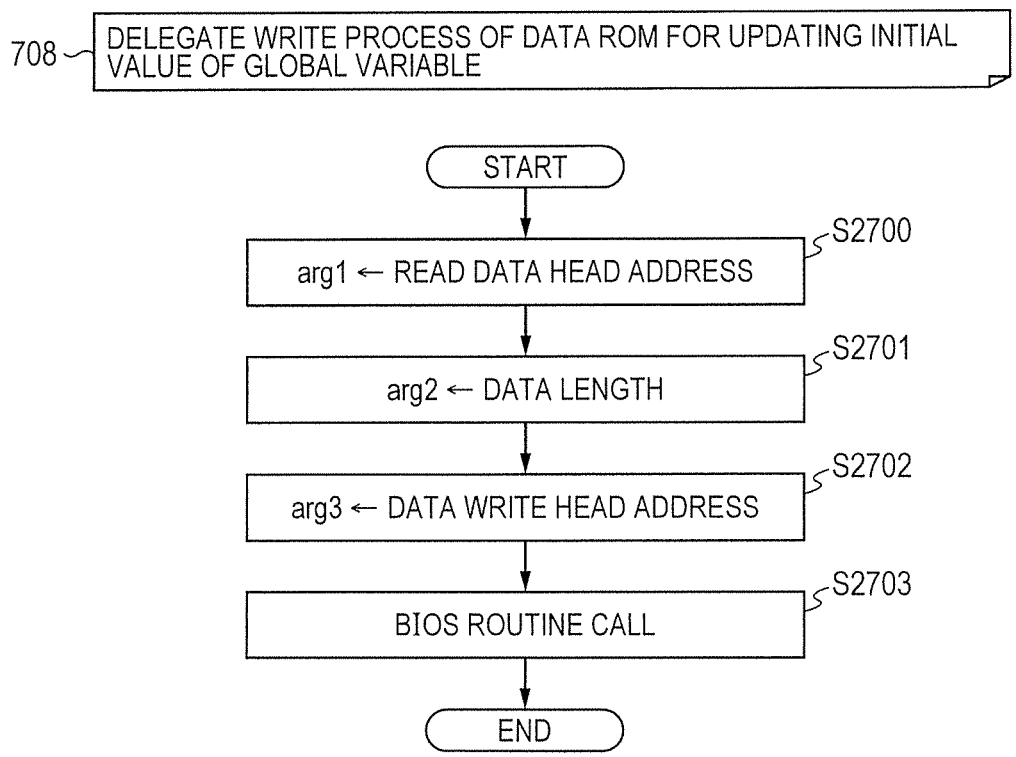
FIG. 27 is a flowchart illustrating an example of procedure of a process of calling a BIOS routine code corresponding to a process in an injection code.

FIG. 27 is a flowchart illustrating an example of procedure of a process of calling a BIOS routine code corresponding to a process in the injection code 708 performing delegation of write process to the data ROM 408 for realizing updating of a global variable. In step 2700 (S2700), the head address of a region (in the data ROM 408 or the SRAM 406) in which the code corresponding to a global variable update part in a differential program as a rollback object is disposed in the first argument arg1. That is, the head address is the head address of read data. In step 2701 (S2701), the data length of read data is disposed in the second argument arg2. In step 2702 (S2702), the head address of a data write destination is disposed in the third argument arg3. In step 2703 (S2703), a corresponding BIOS routine is called. In the BIOS routine called by the injection code 708 of delegation of the write process to the data ROM 408 for realizing updating of a global variable, the write process to the data ROM 408 for realizing updating of a global variable is executed. An execution example is as follows. By an interrupt from the CAN interface 409, the injection code 708 of delegation of the write process to the data ROM 408 for realizing updating of a global variable is disposed in the SRAM 406. The injection code is executed by an interrupt, and a BIOS routine call is generated. In the BIOS routine, the write process to the data ROM 408 for realizing updating of a global variable is executed.

Figure 28:
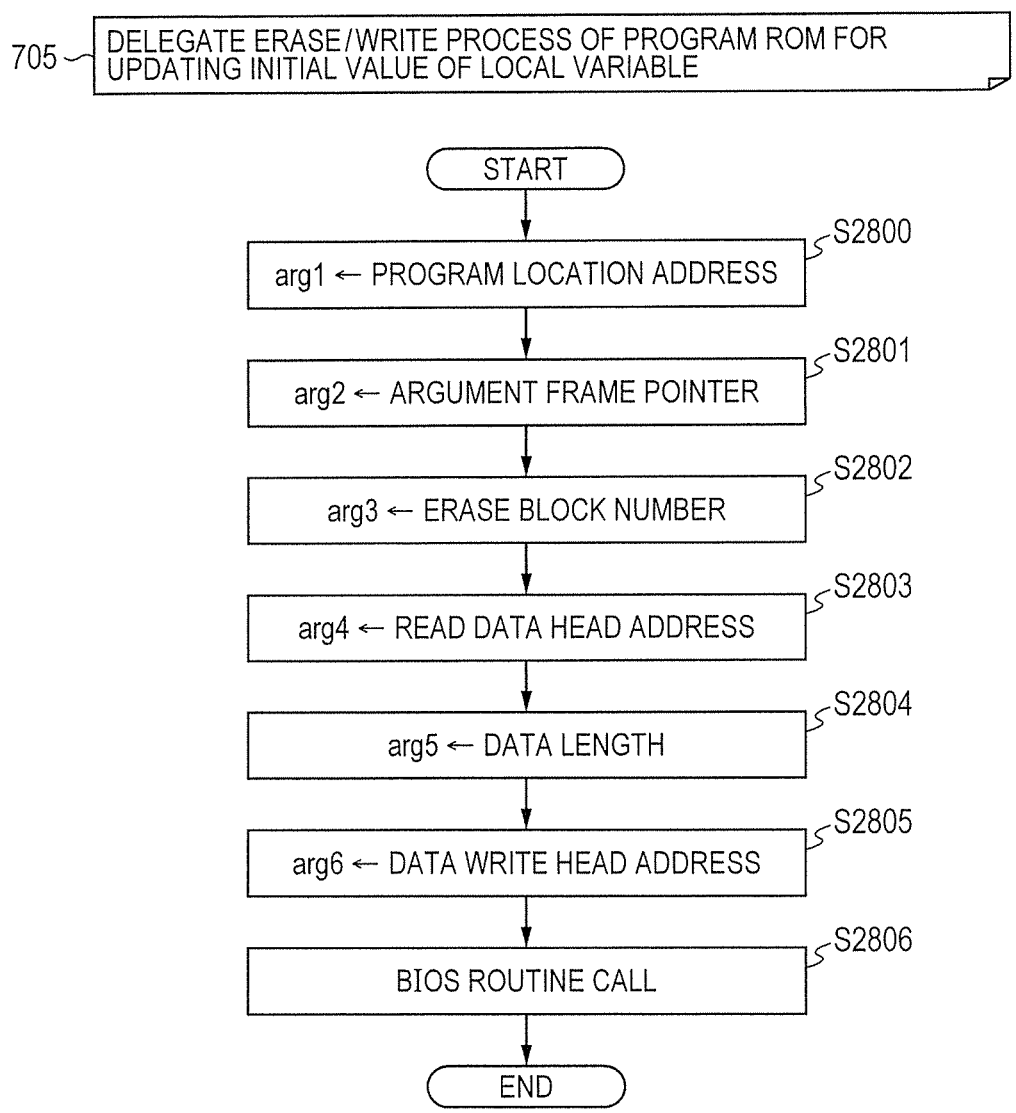
FIG. 28 is a flowchart illustrating an example of procedure of a process of calling a BIOS routine code corresponding to a process in an injection code.

FIG. 28 is a flowchart illustrating an example of procedure of a process of calling a BIOS routine code corresponding to a process in the injection code 705 performing delegation of erase and write process to the program ROM 407 for realizing updating of a local variable. First, in step 2800 (S2800), the address in the SRAM 406 in which an erase and write process program (driver) to the program ROM 407 is disposed is disposed in the first argument arg1. The erase and write process program is preliminarily disposed in a specific address in the program ROM 407. Next, in step 2801 (S2801), the frame pointer of an argument passed to the erase and write process program is disposed in the second argument arg2. The argument set in steps 2800 and 2801 is an argument necessary to operate the driver of the ROM. This is due to the fact that rewriting of the program ROM 407 has to be executed on the SRAM 406. Subsequently, in step 2802 (S2802), erase block number is disposed in the third argument arg3. The erase block number is the number of a block to be erased in the program ROM 407 for realizing variable updating. In step 2803 (S2803), the head address of a region on the data ROM 408 or the SRAM 406 in which the code of a local variable update part in a differential program to be rolled back is disposed is disposed in the fourth argument arg4. That is, the head address is the head address of read data. In step 2804 (S2804), the data length of read data is disposed in the fifth argument arg5. In step 2805 (S2805), the head address of data write destination is disposed in the sixth argument arg6. In step 2806 (S2806), a corresponding BIOS routine is called. In a BIOS routine called by the injection code 705 of delegation of erase and write process of the program ROM 407 for realizing local variable updating, the erase and write program for the program ROM 407 is disposed in the address in the SRAM 406 designated in the first argument, and the frame pointer designated in the second argument is passed to the erase and write program. By executing the erase and write program, the erase and write process on the program ROM 407 for realizing updating of a local variable is performed. An execution example is as follows. The injection code 705 of delegation of the erase and write process to the program ROM 407 for realizing updating of a local variable is disposed in the SRAM 406 by an interrupt from the CAN interface 409, the injection code is executed by an interrupt, and a BIOS routine is called. In the BIOS routine, the erase and write process to the program ROM 407 for realizing updating of a local variable is performed. The erase and write program for the program ROM 407 disposed in the SRAM 406 may be realized as dedicated hardware using the SRAM 406 as a work memory.

Figure 29:
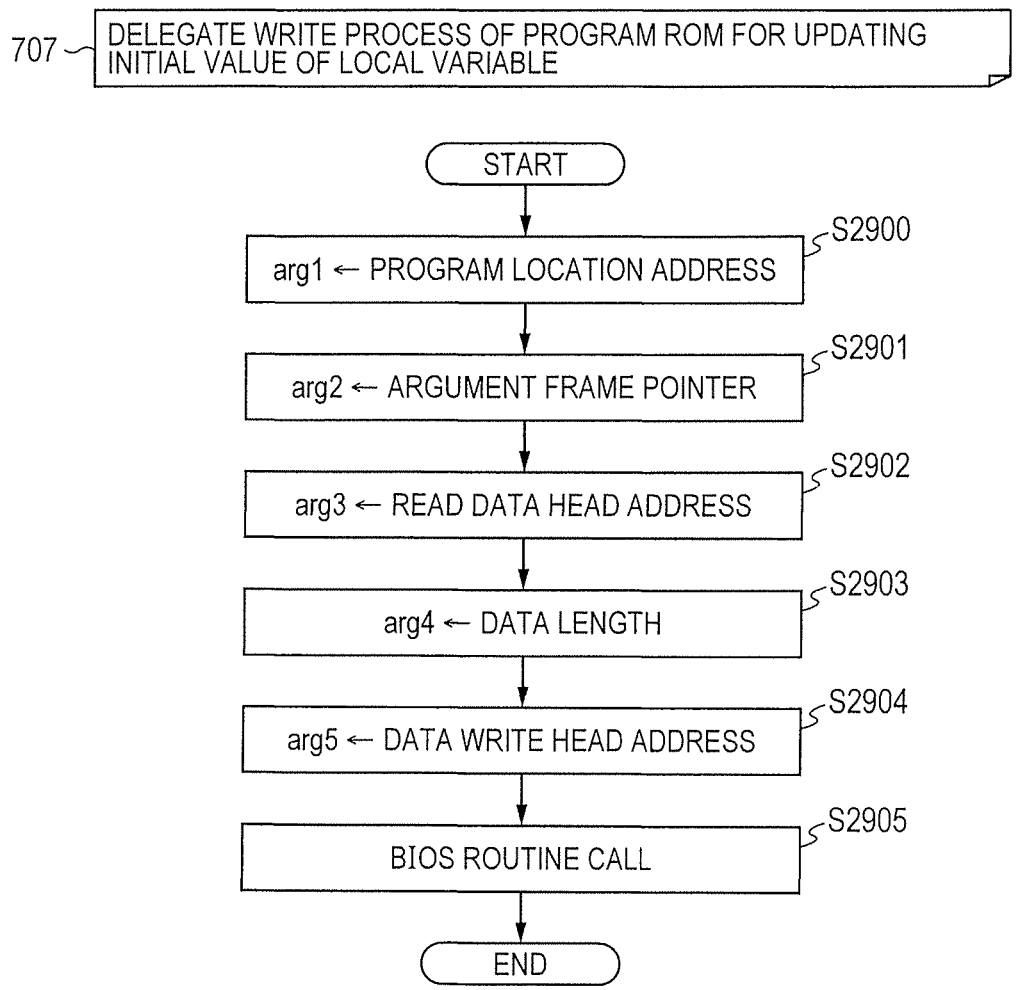
FIG. 29 is a flowchart illustrating an example of procedure of a process of calling a BIOS routine code corresponding to a process in an injection code.

FIG. 29 is a flowchart illustrating an example of procedure of a process of calling a BIOS routine code corresponding to a process in the injection code 707 performing delegation of the write process to the program ROM 407 for realizing updating of a local variable. First, in step 2900 (S2900), the address in the SRAM 406 in which a write process program (driver) to the program ROM 407 is disposed is disposed in the first argument arg1. The write process program is preliminarily disposed in a specific address in the program ROM 407. Next, in step 2901 (S2901), the frame pointer of an argument passed to the write process program is disposed in the second argument arg2. The argument set in steps 2900 and 2901 is an argument necessary to operate the driver of the ROM. This is due to the fact that rewriting of the program ROM 407 has to be executed on the SRAM 406. Subsequently, in step 2902 (S2902), the head address of a region on the data ROM 408 or the SRAM 406 in which the code corresponding to a local variable update part in the differential program to be rolled backed is disposed is disposed in the third argument arg3. That is, the head address is the head address of read data. In step 2903 (S2903), data length of read data is disposed in the fourth argument arg4. In step 2904 (S2904), the head address of data write destination is disposed in the fifth argument arg5. In step 2905 (S2905), a corresponding BIOS routine is called. In the BIOS routine called by the injection code 707 of delegation of the write process of the program ROM 407 for realizing updating of a local variable, the write process program is disposed in the address in the SRAM 406 designated in the first argument, and the frame pointer designated in the second argument is passed to the write process program. By executing the write process program, the write process on the program ROM 407 for realizing updating of a local variable is performed. An execution example is as follows. The injection code 707 of delegation of the write process to the program ROM 407 for realizing updating of a local variable is disposed in the SRAM 406 by an interrupt from the CAN interface 409, the injection code is executed by an interrupt, and a BIOS routine is called. In the BIOS routine, the write process to the program ROM 407 for realizing updating of a local variable is performed. The write process program disposed in the SRAM 406 may be realized as dedicated hardware using the SRAM 406 as a work memory.

Figure 30:
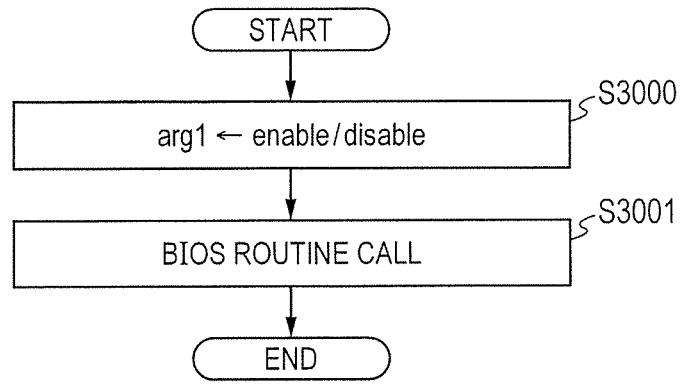
FIG. 30 is a flowchart illustrating an example of procedure of a process of calling a BIOS routine code corresponding to a process in an injection code.

FIG. 30 is a flowchart illustrating an example of procedure of a process of calling a BIOS routine code corresponding to a process in the injection code 704 performing delegation of address translation validating/invalidating process. In step 3000 (S3000), a value designating validation/invalidation of the address translator 402 is disposed in the first argument arg1. In step 3001 (S3001), a corresponding BIOS routine is called. In a BIOS routine called by the injection code 704 of delegation of the process of validating/invalidating the address translator, the process of validating/invalidating the address translator is performed. An execution example is as follows. The injection code 704 of delegation of the address translation validating/invalidating process is disposed in the SRAM 406 by an interrupt from the CAN interface 409, the injection code is executed by an interrupt, and a BIOS routine is called. In the BIOS routine, the process of validating/invalidating the address translator is performed.

The various injection codes have been described above. In the case of the configuration of FIG. 5, by the CPU 401, the injection code is disposed and executed and the BIOS routine called by the injection code is executed. In the case of the configuration of FIG. 6, the operations may be executed by either the main CPU 401 or the sub CPU 411. In the case of executing the operations by the sub CPU 411, a BIOS code may be disposed in the program ROM 412. In the case where a BIOS code is disposed in the program ROM 412, a BIOS routine is executed by the sub CPU 411, and a transfer path to each of the program ROM 407 and the data ROM 408 is duplicated as illustrated by broken lines in FIG. 6, without exerting influence on the function of a program being presently executed in the main CPU 401 and an execution operation cycle, the update information file 50 can be dynamically disposed in the program ROM 407 and the data ROM 408 during the operation of the program being presently executed. In the case where a transmission path duplicated as illustrated by the broken lines is not used, by setting an access from the sub CPU 411 to the program ROM 407 and the data ROM 408 by execution of various BIOS codes as a pre-emptive access of lowest priority, the influence on the execution operation of the program which is presently executed in the main CPU 401 can be largely reduced.

Figure 31A:
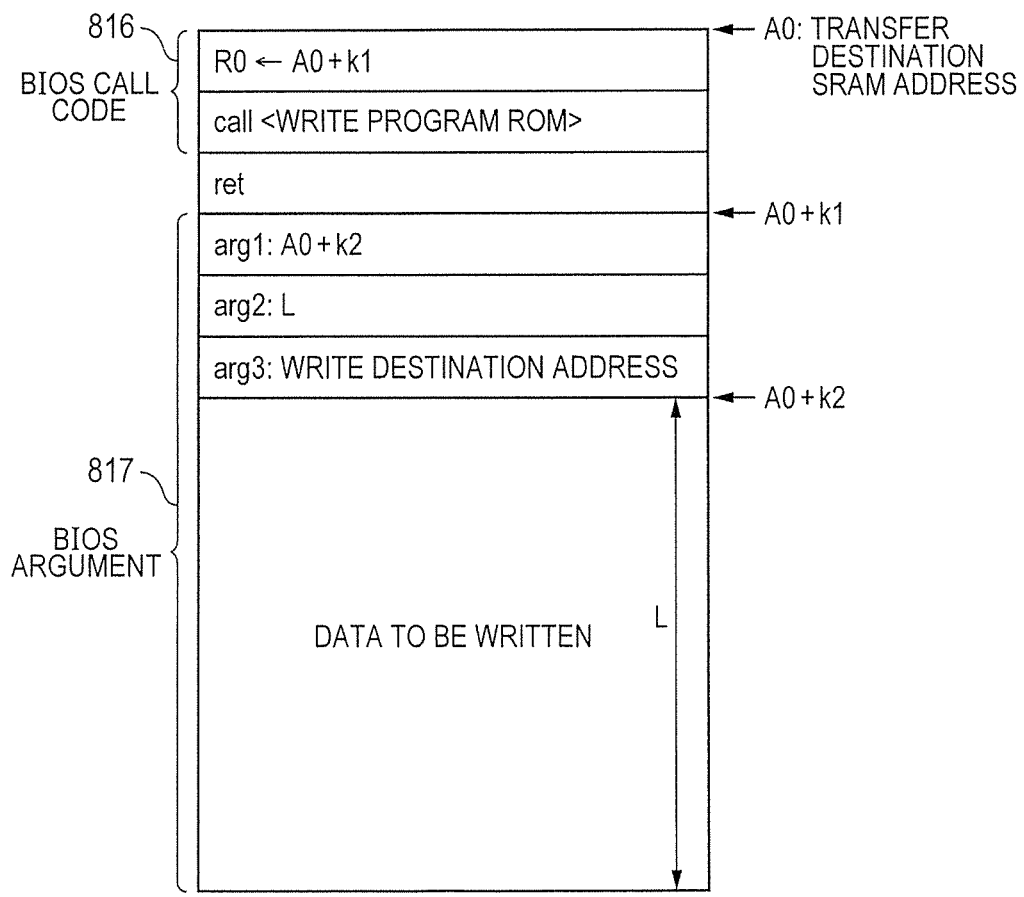
FIG. 31A is a schematic diagram illustrating a configuration example of an injection code in the case of executing a BIOS routine by a function call.
Figure 31B:
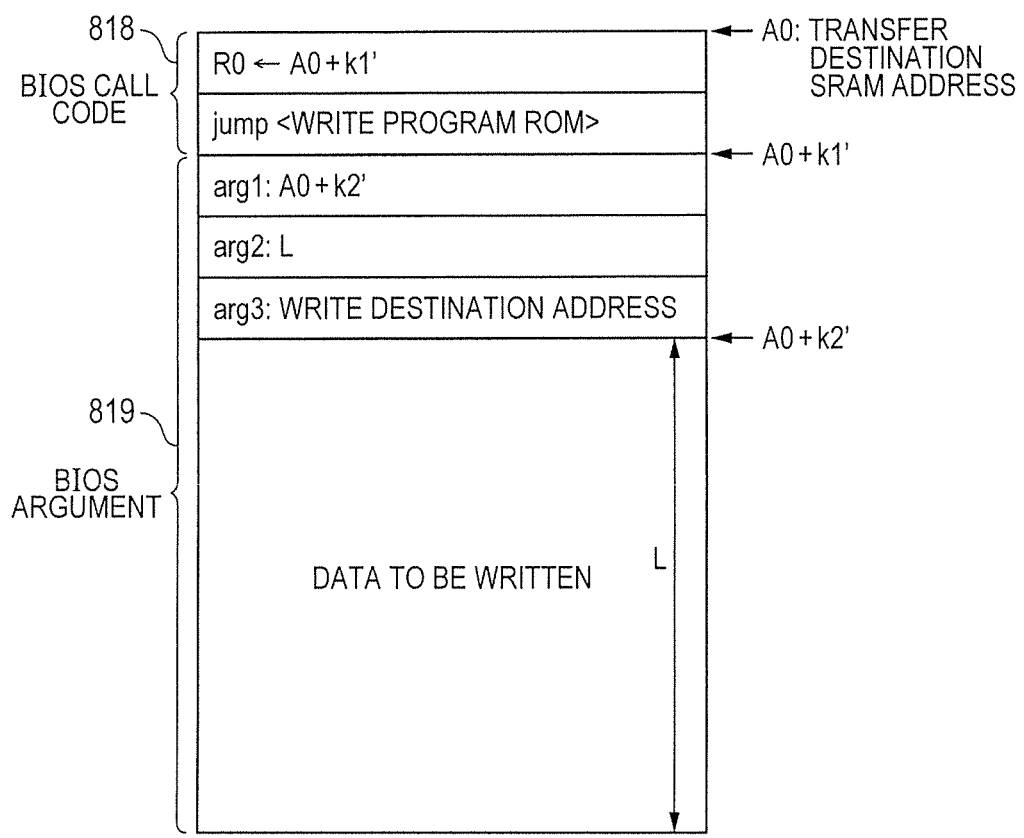
FIG. 31B is a schematic diagram illustrating a configuration example of an injection code in the case of executing a BIOS routine by a jump instruction to the BIOS routine.

Next, a configuration example of an injection code will be described. FIGS. 31A and 31B illustrate configuration examples of an injection code. FIG. 31A illustrates an example corresponding to the case of executing a BIOS routine by a function call, and FIG. 31B illustrates an example corresponding to the case of executing a BIOS routine by a jump instruction to a BIOS routine. In each of FIGS. 31A and 31B, the injection code 701 of delegation of the write process to the program ROM 407 of an update binary is illustrated as an example. In the case of executing a BIOS routine by a function call, the injection code is constructed by a BIOS routine function call part 816 made by setting of a frame pointer to a BIOS argument and a BIOS routine function call instruction and a disposition part 817 of arguments to the BIOS routine (refer to FIG. 31A). On the other hand, in the case of executing a BIOS routine by a jump instruction to the BIOS routine, the injection code is constructed by a BIOS routine function call part 818 made by setting of a frame pointer to a BIOS argument and a jump instruction and a disposition part 819 of arguments to the BIOS routine (refer to FIG. 31B).

Figure 32A:
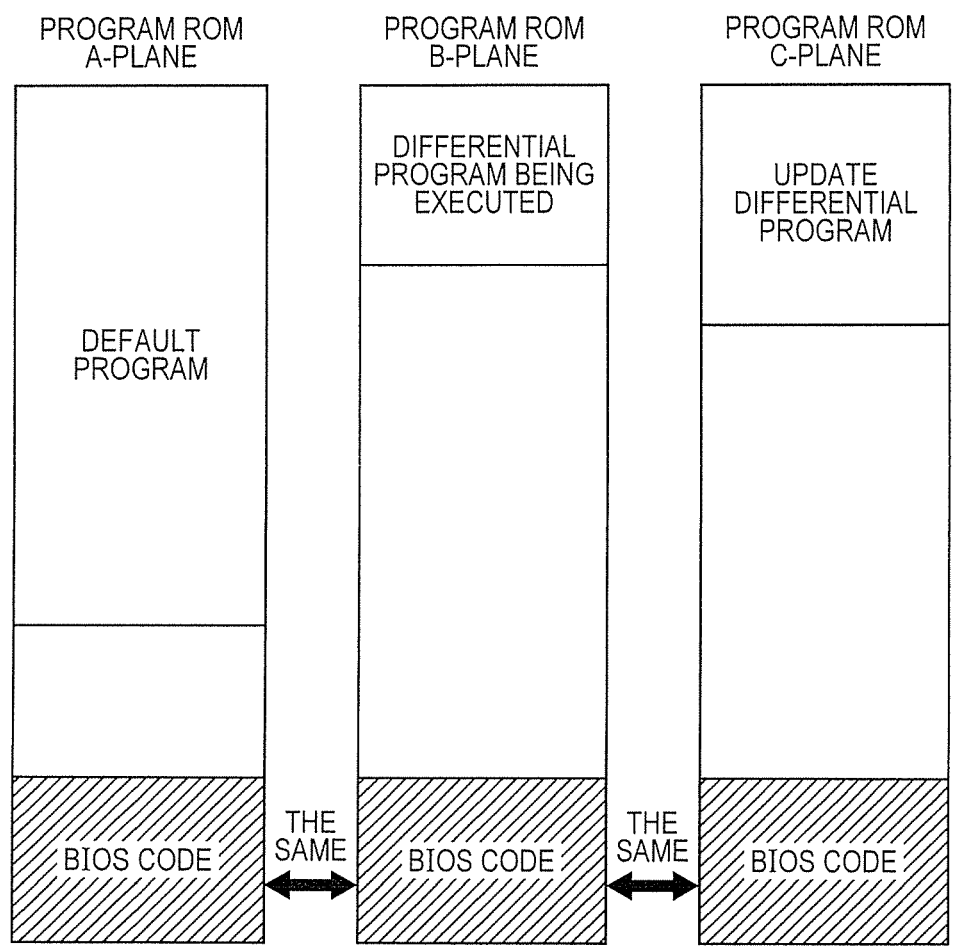
FIG. 32A is a schematic diagram illustrating a disposition example of BIOS codes in a program ROM of three planes in the case of updating a program without accompanying updating of a BIOS code.
Figure 32B:
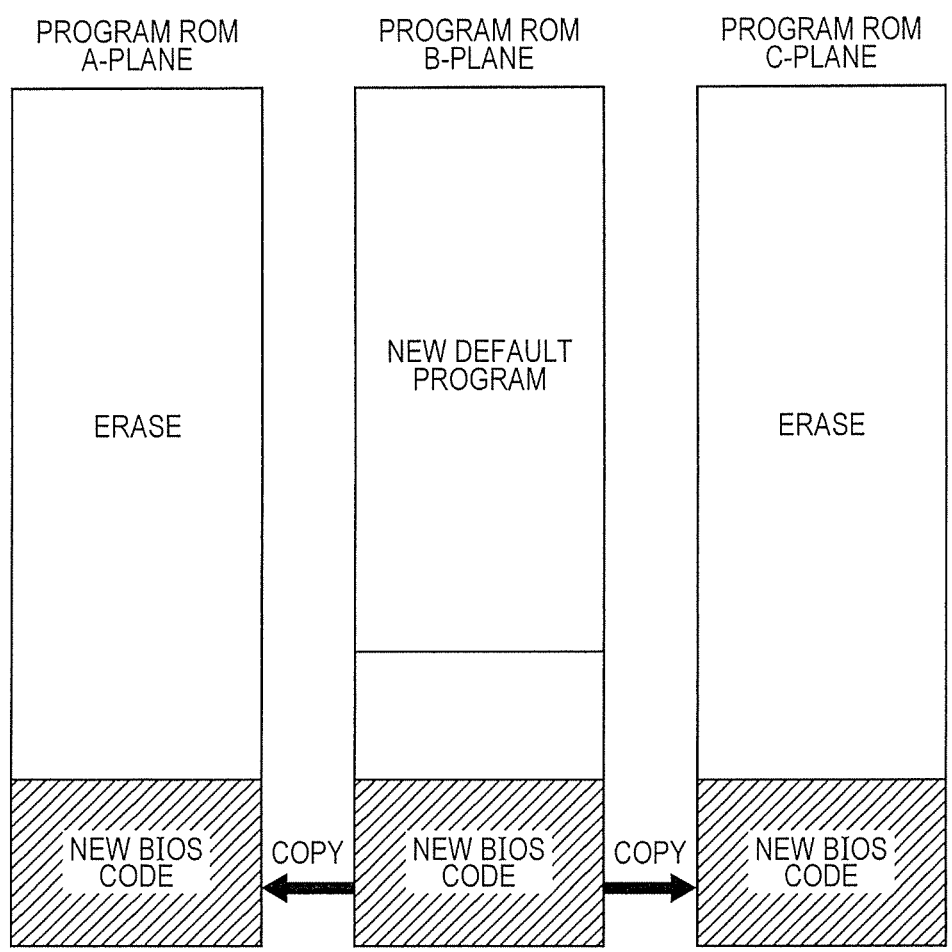
FIG. 32B is a schematic diagram illustrating a disposition example of BIOS codes in a program ROM of three planes in the case of updating a whole default program including updating of a BIOS code.

Next, BIOS code disposition examples will be described. FIGS. 32A and 32B are schematic diagrams each illustrating a disposition example of BIOS codes in the program ROM 407 of three planes. FIG. 32A illustrates an example corresponding to the case of updating a program without accompanying updating of a BIOS code. FIG. 32B illustrates an example corresponding to the case of updating a whole default program including updating of a BIOS code.

First, with reference to FIG. 32A, the case of updating a program without accompanying updating of a BIOS code will be described. In FIG. 32A, the same BIOS codes are disposed in the three planes. A default program is disposed in the plane A, and a differential code which is presently executed is disposed in the plane B. In the planes A and B, a program updated from the default program is being executed. It is now assumed that a new update differential program is disposed in the plane C. In disposition of the update differential program to the plane C, the BIOS code disposed in the plane C is used. In the disposition of the update differential program to the plane C, a program ROM write driver expanded in the SRAM 406 executes writing. In such a manner, without disturbing an access from the CPU 401 to the planes A and B, the update differential program can be disposed in the plane C. That is, the update differential program can be disposed in the plane C during execution of a program in the planes A and B. Each of the update differential programs disposed in the planes B and C is an update differential program from the default program disposed in the plane A. The update differential program disposed in the plane B may be constructed by reusing the update differential program already disposed in the plane B. The update differential program disposed in the plane C may be constructed by reusing the update differential program already disposed in the plane C.

Next, with reference to FIG. 32B, the case of updating a whole default program including updating of a BIOS code will be described. FIG. 32B illustrates a state where the planes A and C are erased, a new default program and a new BIOS code are disposed in the plane B, and the new BIOS code disposed in the plane B is copied to the planes A and C. The following process is performed in the state. First, the plane B is erased by calling and executing an erase process BIOS in the program ROM 407 by an injection code of delegation of the erase process of the program ROM 407. Next, a new default program and a new BIOS code are disposed in the plane B by calling and executing a program ROM write process from the injection code of write process delegation of the program ROM. By calling and executing a default plane switching process BIOS from the injection codes 712 and 713 of default plane switching process delegation, the start address at the time of restart is set at the head of the plane B. An injection code of delegation of the program ROM erase for executing erasure during restart of the planes A and C of the program ROM 407 and an injection code of delegation of the program ROM write process for executing copying during restart of the new BIOS code to the planes A and C are disposed from the SRAM 406 to the data ROM 408 before restart, the two injection codes are expanded from the data ROM 408 to the SRAM 406 and executed. The reason why the injection codes are once disposed in the data ROM 408 is because data stored in the SRAM 406 is lost at the time of restart. After restart, the program disposition structure illustrated in FIG. 32B is realized, the program start address is set at the head of the plane B, and the new default program of the plane B is executed. The new BIOS may be disposed once in the data ROM 408 and then expanded to the program ROM 407 at a proper timing.

Figure 33A:
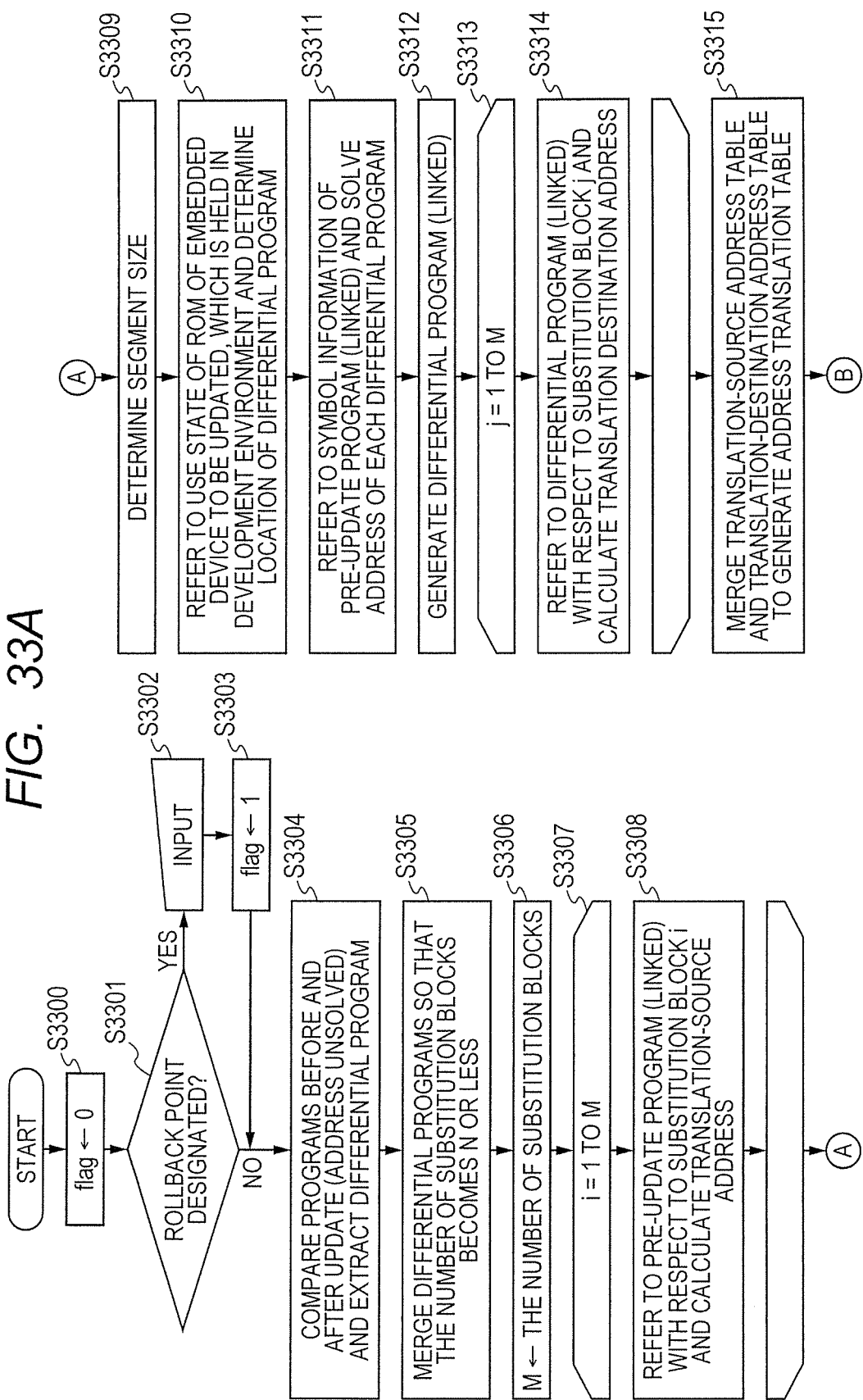
FIG. 33A is a flowchart illustrating an example of a process of generating an update binary code and update information corresponding to a differential update.
Figure 33B:
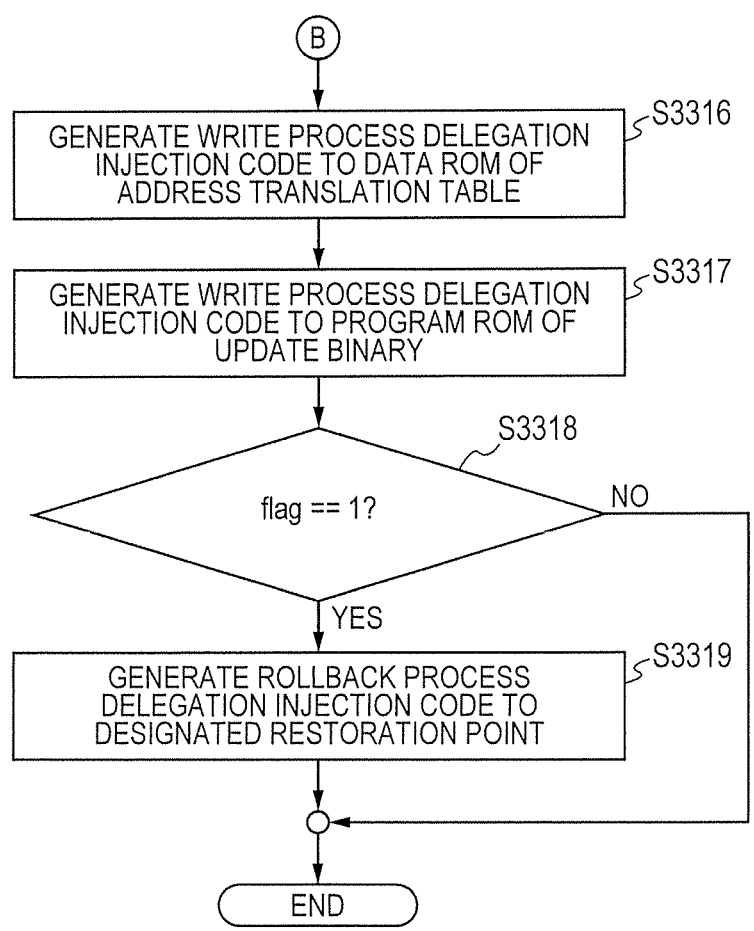
FIG. 33B is a flowchart illustrating an example of a process of generating an update binary code and update information corresponding to a differential update.

Next, the procedure of generating the update information file 50 will be described. FIGS. 33A and 33B are a flowchart illustrating an example of a process of generating an update binary code and update information corresponding to a differential update. The flowchart is executed by the data processing unit 22 of the development environment 20. Concretely, the flow is realized by, for example, executing a program stored in a memory of the data processing unit 22 by a processing device of the data processing unit 22.

In step 3300 (S3300), the data processing unit 22 substitutes an initial value 0 in a variable "flag".

In step 3301 (S3301), the data processing unit 22 determines whether a rollback point is designated or not. When there is designation, the process shifts to step 3302. When there is no designation, the process shifts to step 3304.

In step 3302 (S3302), the data processing unit 22 receives an input of the designation of the rollback point from the user and stores it.

In step 3303 (S3303), the data processing unit 22 updates the value of the variable flag to 1.

In step 3304 (S3304), the data processing unit 22 compares programs before and after updating (address unsolved) to extract a differential program. In the extraction, a function structure may be also considered. In particular, without inline-expanding a function included in one of the programs, using the correspondence between function names in a call graph as a function correspondence structure, the difference may be extracted for each of corresponding functions.

In step 3305 (S3305), the data processing unit 22 merges code blocks so that the number of code blocks (substitution blocks) constructing a differential code becomes N or less by a method in which a part having no change between two programs can be included. N is, for example, a value which is smaller one of the maximum value of the number of entries which can be set in an address translation table and the number of segments in a memory region in which an update differential program is disposed. A concrete example of the merging process will be described with reference to FIGS. 35A and 35B.

In step 3306 (S3306), the data processing unit 22 substitutes the number of code blocks constructing a differential code (the number of substitution blocks) to variable M.

In step 3307 (S3307), the data processing unit 22 repeats the step 3308 M times while increasing the variable "i" one by one from 1 to M.

In step 3308 (S3308), the data processing unit 22 extracts the head address of the i-th code block in the differential code in a pre-update program (default program) as an address-solved program by a link. The head address corresponds to the address of a translation source at the time of updating. When the code block refers to a function in the default program, the data processing unit 22 extracts the call address of the function.

In step 3309 (S3309), the data processing unit 22 determines segment size which is set in the address translation table. The segment size corresponds to the number of bits of an upper address to be translated. In determination of the segment size, the size of each of code blocks constructing the differential code may be considered. For example, the maximum value, a median value, or an average value of sizes may be used. When the number of bits of an upper address determining the segment size is small, whereas a large differential code can be disposed without any device, the number of differential code blocks which can be disposed becomes small. On the other hand, when the number of bits of an upper address determining the segment size is large, the device as illustrated in FIG. 11A, 11B, or 14 is necessary at the time of disposition. However, the larger number of differential code blocks can be disposed to the number of entries of the address translation table as the upper limit.

In step 3310 (S3310), the data processing unit 22 refers to a use state of the ROM of the embedded device 40 to be updated, which is held in the development environment and determines the disposition location (head address) of each of code blocks constructing the differential program. The disposition location (head address) is determined so that at most one code block is disposed every segment size obtained in step 3309. In disposition of the code blocks constructing a differential code, the region in the program ROM 407 may be reused. It is also possible to device so that the number of erasure times of the region to be reused in the program ROM 407 becomes uniform in any of the areas. When the number of erasure times exceeds the specified number, an alarm may be generated. Based on the alarm, the user may change an update from an update by a differential code to a general program update illustrated in FIG. 34 or set an update of the next time as a general program update. The reference to the number of erasure times has the following advantages. For example, when a flash memory is used as the ROM, since the flash memory deteriorates by erasure and writing, by devising so that erasure and writing does not occur concentratedly in a specific region, the life of the flash memory can be increased. From the viewpoint of quality assurance, it is preferable to manage so that rewiring is not performed after the upper limit of the number of rewriting times.

In step 3311 (S3311), the data processing unit 22 refers to symbol information of a pre-update program (linked) and the address value of an address-solved symbol which is referred to from each of code blocks constructing a differential program is obtained. The data processing unit 22 performs address solution on an address-unsolved symbol or an address-unsolved code by using the head address of each of the code blocks determined in step 3310.

In step 3312 (S3312), the data processing unit 22 generates an address-solved differential program.

In step 3313 (S3313), the data processing unit 22 repeats the step 3314 while increasing the variable j one by one from 1 to M.

In step 3314 (S3314), the data processing unit 22 extracts the head address obtained in the step 3310 of each of the code blocks j constructing the differential program as a translated address.

In step 3315 (S3315), the data processing unit 22 merges the pre-translation address of each code block obtained in the step 3308 and the translated address extracted in the step S3314 as a correspondence table to generate an address translation table.

In step 3316 (S3316), the data processing unit 22 generates the injection code 702 of delegation of the write process to the data ROM 408 of the address translation table.

In step 3317 (S3317), the data processing unit 22 generates the injection code 701 of delegation of the write process to the program ROM of an update binary.

In step 3318 (S3318), the data processing unit 22 determines whether the value of the variable flag matches 1 or not. When the value matches 1, the process moves to step 3319. When the values do not match, the process is finished.

In step 3319 (S3319), the data processing unit 22 generates the injection code 709 of delegation of the rollback process to the designated restoration point. The injection code is executed, for example, when interruption by differential program update or abnormality on security occurs. On completion of the execution of the rollback BIOS code executed from the injection code, an update cancel BIOS code call may be executed.

Figure 34:
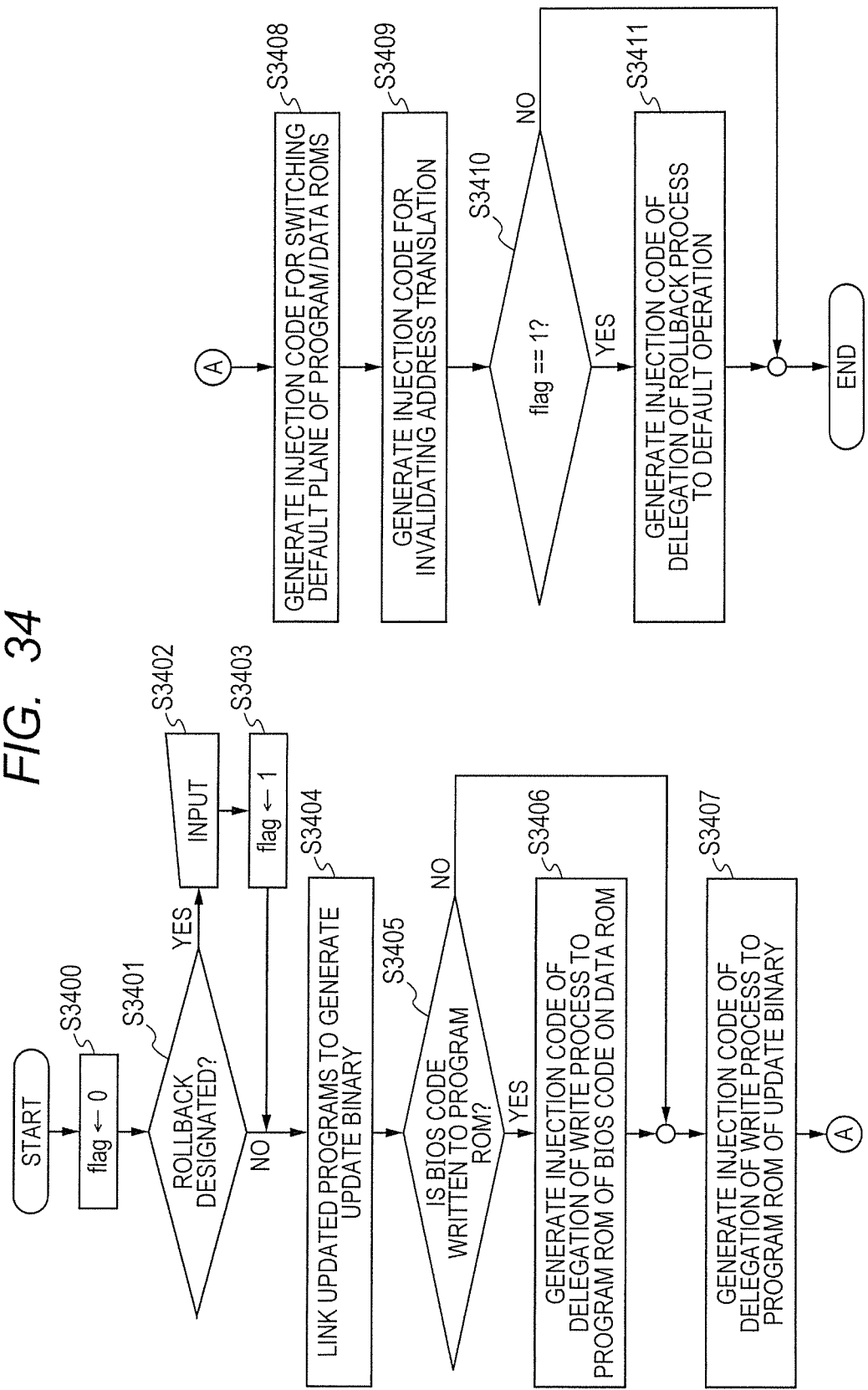
FIG. 34 is a flowchart illustrating an example of a process of generating an update binary code and update information corresponding to a general program update.

FIG. 34 is a flowchart illustrating an example of a process of generating an update binary code and update information corresponding to a general program update. The flow is executed in the data processing unit 22 in the development environment 20. The flow is concretely realized by, for example, executing a program stored in the memory of the data processing unit 20 by a processing device of the data processing unit 22.

In step 3400 (S3400), the data processing unit 22 substitutes an initial value 0 to the variable "flag".

In step 3401 (S3401), the data processing unit 22 determines whether rollback is designated or not. When rollback is designated, the process shifts to step 3402. When rollback is not designated, the process shifts to step 3404.

In step 3402 (S3402), the data processing unit 22 receives the input of designation of the rollback point from the user and stores the input data.

In step 3403 (S3403), the data processing unit 22 updates the value of the variable "flag" to 1.

In step 3404 (S3404), the data processing unit 22 performs address solution (link) of the updated program and generates an update binary.

In step 3405 (S3405), the data processing unit 22 determines whether a BIOS code is written from the data ROM 408 to the program ROM 407 or not. When it is written, the process shifts to step 3406. When it is not written, the process shifts to step 3407.

In step 3406 (S3406), the data processing unit 22 generates the injection code 716 of delegation of the write process to the program ROM 407 of the BIOS code store din the data ROM 408. The writing of the BIOS code to the program ROM 407 is performed when the BIOS code is not disposed yet in a part or all of the program ROM 407. In the case of the program ROM 407 of three planes, when the BIOS code is not disposed in a plane in the program ROM 407 to which a differential code is to be written, the BIOS code is written to the plane in the program ROM 407. By the operation, the BIOS code preliminarily stored in the data ROM 408 is written to the program ROM 407.

In step 3407 (S3407), the data processing unit 22 generates the injection code 701 of delegation of the program write process of an update binary. It is assumed here that the injection code also calls a BIOS code erasing the data ROM 408 for invalidating a restoration point for general program updating.

In step 3408 (S3408), the data processing unit 22 generates the injection code 712 for switching the default plane of the program ROM 407 and the injection code 713 for switching the default plane of the data ROM 408.

In step 3409 (S3409), the data processing unit 22 generates an injection code invalidating an address translation table.

In step 3410 (S3410), the data processing unit 22 compares whether the value of the variable "flag" is 1 or not. In the case of match, the process shifts to step 3411. In the case of mismatch, the process is finished.

In step 3411 (S3411), the data processing unit 22 generates the injection code 710 of delegation of the rollback process to the default operation. The injection code is executed when interruption by differential program update or abnormality on security occurs. On completion of the execution of the rollback BIOS code executed from the injection code, an update cancel BIOS code call may be executed.

Figure 35A:
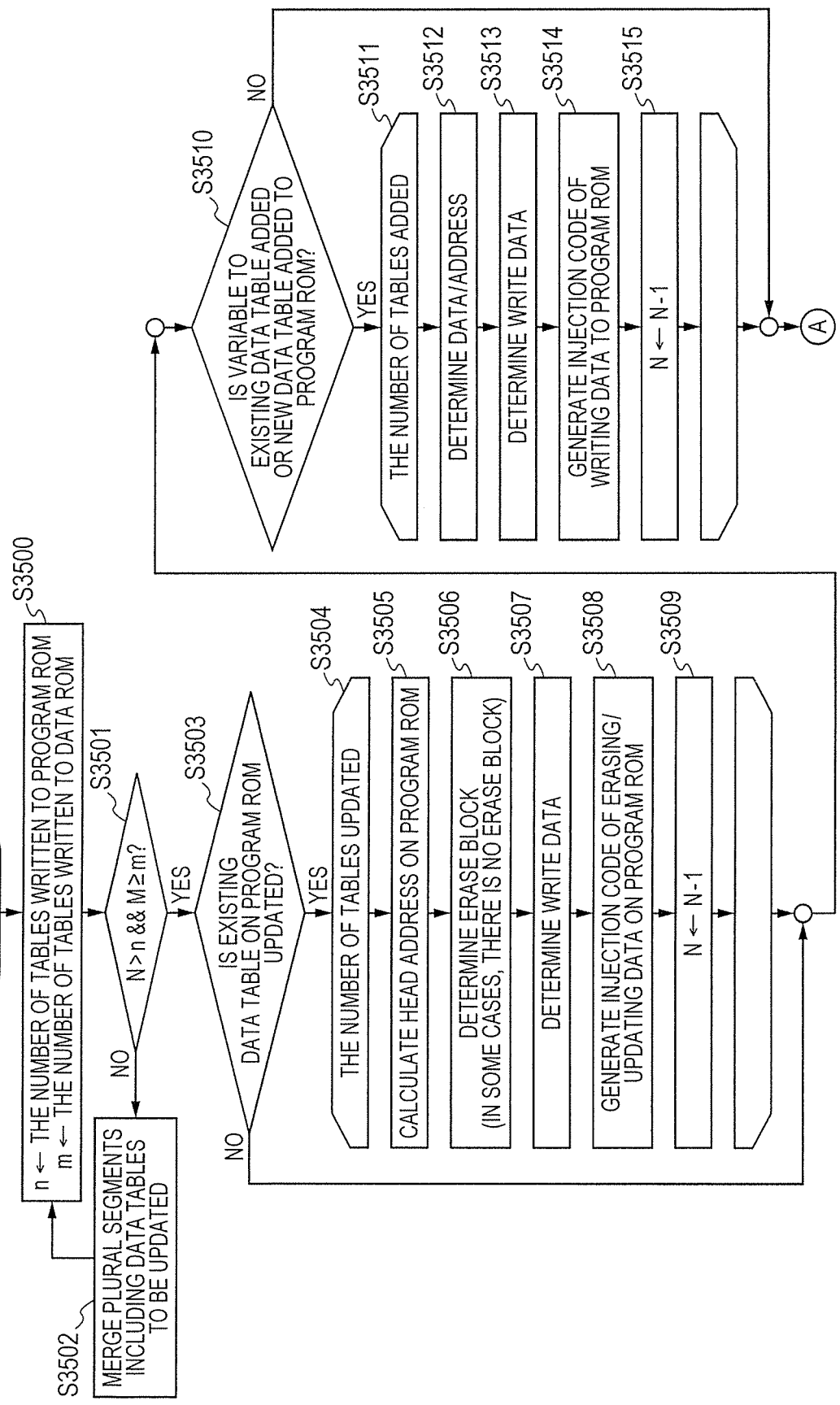
FIG. 35A is a flowchart illustrating an example of a process of merging differential programs.

Next, the details of the process step 3305 in FIG. 33A will be described. FIGS. 35A and 35B are flowcharts illustrating an example of a process of merging differential programs in the step 3305. In the following description, N denotes the number of entries of the address translation table in the program ROM 407, that is, the maximum value of address translation which can be set in the address translation table. M denotes the number of entries of the address translation table for the data ROM 408, that is, the maximum value of address translation which can be set in the address translation table. As will be described later, after generation of various injection codes which become necessary due to updating of a data table disposed in the program ROM 407 or the data ROM 408 or addition of a new data table, a merging process is executed so that the number of code blocks constructing a differential code becomes the number of code blocks which is equal to or less than a specific number. The data table indicates a local variable or global variable with an initial value. When a plurality of data tables to be updated are disposed in the same segment region, they are handled as one data table. Particularly, in the case of using the address translating process illustrated in FIGS. 11A and 11B, a plurality of data tables to be updated whose head addresses are disposed in the same segment region may be handled as one data table. Hereinafter, in the description of FIGS. 35A and 35B, it is assumed that the data table denotes data tables handled as one data table for each segment. It is assumed that new data tables are disposed so that the number of segments becomes the minimum. Concretely, it is realized by solving the knapsack problem. As an example of disposition that the number of segments becomes the minimum, for example, when a plurality of new local variables (sequence) with initial values are written in the same function, new local variables are disposed in the same segment as many as possible. It is also assumed that the head address of each of elements of data tables set as one data table in a segment (that is, data tables before coupling) is already calculated. Those head addresses are referred to at the time of generating the linked differential program in the step 3312 in FIG. 33A.

In step 3500 (S3500), the data processing unit 22 sets the number of write data tables to the program ROM 407 to n and sets the number of write data tables to the data ROM to m. The number of write data tables is the number of data tables to be written by rewriting or addition of the data tables.

In step 3501 (S3501), the data processing unit 22 determines whether or not N>n and M≤m are satisfied. If they are satisfied, the process shifts to step 3503. If they are not satisfied, the process shifts to step 3502.

Since the numbers exceed the numbers of entries, in step 3502 (S3502), the data processing unit 22 performs a process of merging adjacent segments including data tables to be written with respect to the writing having violation in step 3501. When there are not adjacent segments, the data processing unit 22 merges closest segments including the data tables to be written. The data processing unit 22 notifies the user that the difference update is impossible and inquires whether updating of a data table exceeding the segment size is allowed or not. If it is allowed, the process shifts to step 3500. If it is not allowed, the process is interrupted. When the process is interrupted, the user modifies the update program and performs the update preparing process again or changes the policy to updating of a whole program.

In step 3503 (S3503), the data processing unit 22 determines whether an existing data table on the program ROM 407 is changed or not in the differential program. When there is a change, the process shifts to the step 3504. When there is no change, the process shifts to the process of step 3510.

In step 3504 (S3504), the data processing unit 22 repeats the processes of the steps 3505 to 3509 only by the number of changed data tables.

In step 3505 (S3505), the data processing unit 22 calculates the head address on the program ROM 407 in which the changed data table is disposed. In the calculation of the head address, a free region is preferentially used. In the case where there is no sufficient space, when a data table to be updated is disposed in updating of the last time or before, whether the head address is reused or not is asked to the user. When the user allows it, calculation of the head address which is considered to be reused is executed. When the user does not allow it or when there is no object to be reused, the process is interrupted. When the process is interrupted, the user modifies the update program and executes the update preparing process again or changes the policy to updating of a whole program.

In step 3506 (S3506), when a data table is already included in the calculated address, the data processing unit 22 calculates an erase block number including the calculated address.

In step 3507 (S3507), when there is a block to be erased, the data processing unit 22 uses a data table variable in the block as write data including an update part. When there is no block to be erased, the data processing unit 22 uses the whole data table including a change as write data. The data processing unit 22 also calculates data length of a data table which is written by updating.

In step 3508 (S3508), the data processing unit 22 generates the injection code 705 of delegation of the erase/write process to the program ROM 407 by using the following arguments for operating the ROM erase and write driver. Specifically, as the arguments, the disposition address of the driver program, a frame pointer passed to the driver, the number of a block to be erased calculated in the step 3506, the head address of the disposition location in a built-in memory of data written by updating, data length of data written by updating, and the head address on the program ROM 407 calculated in the step 3505 are used. The built-in memory described above and later is, for example, the SRAM 406 but may be a memory having data to be written such as the data ROM 408. When it is determined in step 3506 that there is no block to be erased, the data processing unit 22 generates the injection code 707 of delegation of the program ROM write process, which does not accompany the number of a block to be erased.

In step 3509 (S3509), the data processing unit 22 substitutes the value obtained by subtracting one from the present value of N to the variable N.

In step 3510 (S3510), the data processing unit 22 determines whether a variable is added to an existing data table on the program ROM 407 in the differential program or a new data table is added. When there is addition, the process shifts to 3511. When there is no change, the process shifts to step 3516. When a variable is added to an existing data table, since an access to the variable is performed only from a differential code, thereafter, the variable is used as a new data table. Specifically, when only addition of a variable is performed to an existing data table, without changing the existing data table, an update differential binary is generated using only the added part as a new data table.

In step 3511 (S3511), the data processing unit 22 repeats the processes of the steps 3512 to 3515 only by the number of tables to which the addition is performed.

In step 3512 (S3512), the data processing unit 22 calculates the head address on the program ROM 407, in which a table added is disposed. Concretely, since a disposition state of each of data tables to be added is determined so that the number of segments becomes the minimum by, for example, solving the knapsack problem, the data processing unit 22 determines the head address of a segment in which a data table to be added is included. The data processing unit 22 calculates the data length of the data table to be added. In calculation of the head address, a free area is preferentially used. When there is no sufficient space, the process is interrupted. When the process is interrupted, the user modifies the update program and executes the update preparing process again or changes the policy to updating of a whole program.

In step 3513 (S3513), the data processing unit 22 sets a data table included in a segment having the head address determined in step 3512 as write data.

In step 3514 (S3514), the data processing unit 22 generates the injection code 707 of delegation of the program ROM writing process by using the following arguments for operating the ROM erase/write driver. Specifically, as the arguments, the disposition address of the driver program, a frame pointer passed to the driver, the head address of the disposition location in a built-in memory of write data, data length of the write data, and the head address on the program ROM 407 calculated in the step 3512 are used.

In step 3515 (S3515), the data processing unit 22 substitutes the value obtained by subtracting one from the present value of N to the variable N.

In step 3516 (S3516), the data processing unit 22 determines whether or not there is a change in an existing data table on the program ROM 407 in the differential program. When there is a change, the process shifts to 3517. When there is no change, the process shifts to step 3523.

In step 3517 (S3517), the data processing unit 22 repeats the processes of the steps 3518 to 3522 only by the number of tables each having a change.

In step 3518 (S3518), the data processing unit 22 calculates the head address on the data ROM 408, in which a table having a change is disposed. In calculation of the head address, a free space is preferentially used. In the case where there is no sufficient space, when a data table to be updated is disposed in updating of last time or before, the head address is used. If not, the process is interrupted. When the process is interrupted, the user modifies the update program and executes the update preparing process again or changes the policy to updating of a whole program.

In step 3519 (S3519), when a data table is already included in a calculated address, the data processing unit 22 calculates erasure block number including the calculated address.

In step 3520 (S3520), when there is a block to be erased, the data processing unit 22 sets a data table variable in the block as write data including updated data. When there is no block to be erased, the data processing unit 22 sets a whole data table having a change as write data. The data processing unit 22 also calculates data length of a data table which is written by updating.

In step 3521 (S3521), the data processing unit 22 generates the injection code 706 of delegation of the data ROM erase/write process by using, as arguments, the number of the block to be erased calculated in the step 3519, the head address of the disposition address in a built-in memory of write data, data length of the write data, and the head address calculated in the step 3518. When it is determined in step 3519 that there is no block to be erased, the data processing unit 22 generates the injection code 708 of delegation of data ROM writing process which does not accompany the number of a block to be erased.

In step 3522 (S3522), the data processing unit 22 substitutes the value obtained by subtracting one from the present value of M to the variable M.

In step 3523 (S3523), the data processing unit 22 determines whether or not there is addition of a variable to an existing data table on the data ROM 408 in the differential program or a new data table is added. When there is a change, the process shifts to step 3524. When there is no change, the process shifts to step 3529. When a variable is added to an existing data table, an access to the variable is performed only from a differential code. Consequently, thereafter, the variable is used as a new data table.

In step 3524 (S3524), the data processing unit 22 repeats the processes of the steps 3525 to 3528 only by the number of tables each having addition.

In step 3525 (S3525), the data processing unit 22 calculates the head address on the data ROM 408, in which a table having addition is disposed. Concretely, since a disposition state of each of data tables to be added is determined so that the number of segments becomes the minimum by, for example, solving the knapsack problem, the data processing unit 22 determines the head address of a segment in which a data table to be added is included. The data processing unit 22 also calculates the data length of the data table to be added. In calculation of the head address, a free area is preferentially used. When there is no sufficient space, the process is interrupted. When the process is interrupted, the user modifies the update program and executes the update preparing process again or changes the policy to updating of a whole program.

In step 3526 (S3526), the data processing unit 22 sets a data table included in a segment having the head address determined in step 3525 as write data.

In step 3527 (S3527), the data processing unit 22 generates the injection code 708 of delegation of the data ROM writing process by using, as arguments, the head address of the disposition location in a built-in memory of write data, data length of the write data, and the head address calculated in the step 3525.

In step 3528 (S3528), the data processing unit 22 substitutes the value obtained by subtracting one from the present value of the variable M to the variable M.

In step 3529 (S3529), the data processing unit 22 executes a merging process for making the number of differential codes N or less so that the following objective functions become optimum. In the merging process, a process of merging two or more differential codes disposed dispersedly in an update program so as to include a common code as a code which is common before and after an update is performed. By the process, the number of update differential code blocks excluding a local variable and a global variable with an initial value can be set to N or less. The objective functions in optimization are as follows. In the objective functions 1 to 3, the objective function 1 has the highest priority, and the objective function 2 has the second highest priority.

Objective Function 1: Minimize {Max of Sequence Code}

The objective function optimizes so that the maximum size of a code (sequence code) obtained by coupling blocks of update differential codes becomes minimum. The object of the optimization is to prevent the segment size from becoming too large, that is, to make N as large as possible.

Objective Function 2: Minimize {Total of Function Call in Common Code}

The objective function optimizes so that the number of function calls in a common code becomes minimum. At the time of coupling blocks of differential codes, a code (common code) which is not an object to be changed between different differential code blocks is included. When the number of function calls is large from the common code, program are executed in the planes of the program ROM. Since the planes of the program ROM have different power supplies, increase in power consumption and increase in the number of read cycles of the program ROM are concerned. Consequently, by the objective function 2, the number of calls is minimized.

Objective Function 3: Maximization of Reuse of Differential Code which is Already Disposed The object of the objective function is as follows. When disposition of an update differential code is performed a plurality of times by updating in the past, there is the possibility that an update differential code block disposed a few times before can be reused as it is for updating of this time. In this case, by reusing it, the disposition process can be reduced.

The objective function may be optimized by being formulated as a linear programming problem and solving the problem. The objective function may be also solved by speeding-up by using a technique such as Lagrangian relaxation. It may be also solved by being formulated as a graph covering problem in which a graph is expressed by coupling differential codes by sides whose vertex uses the size of each of the differential codes as a weight and using a sum of the size and function call as a weight and considering reusable vertexes are considered. The graph covering problem may be also solved heuristically. Anyway, optimization of the objective functions can be solved by general knowledge on the optimization problem.

Figure 36:
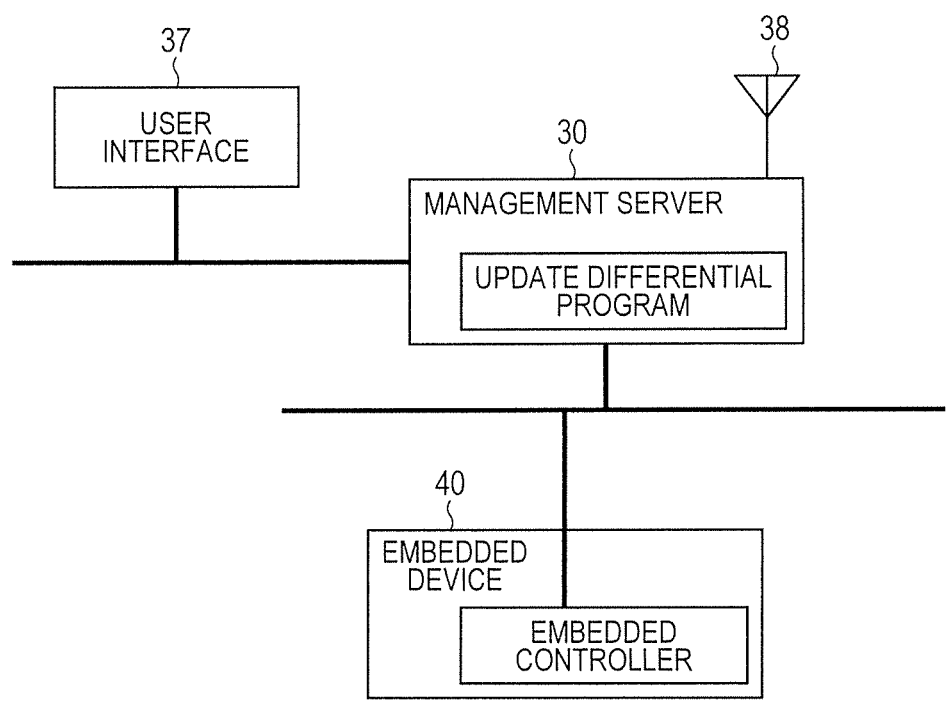
FIG. 36 illustrates a configuration example of a system in which an embedded device is placed.

Next, the updating operation in the embedded device 40 will be described. FIG. 36 illustrates a configuration example of a system in which the embedded device 40 is disposed, for explaining program updating operation in the embedded device 40. As illustrated in FIG. 36, as an example, the management server 30 is coupled to a user interface 37 and has an antenna 38 for performing transmission/reception to/from a wireless network. The description will be given on assumption that the embedded device 40 includes an embedded controller. The user interface 37 displays the presence/absence of an update differential program to an embedded controller as an object of the program updating operation and receives an instruction from the user of whether updating is actually executed or not. The management server 30 receives update information as information constructing an update information file including an update differential program from the antenna 38. On receipt of the update information, the management server 30 notifies the user interface 37 of the presence of updating. When the user instructs update pet mission on the basis of the information displayed in the user interface 37, the update differential program is disposed in the embedded controller in the embedded device 40.

Figure 37:
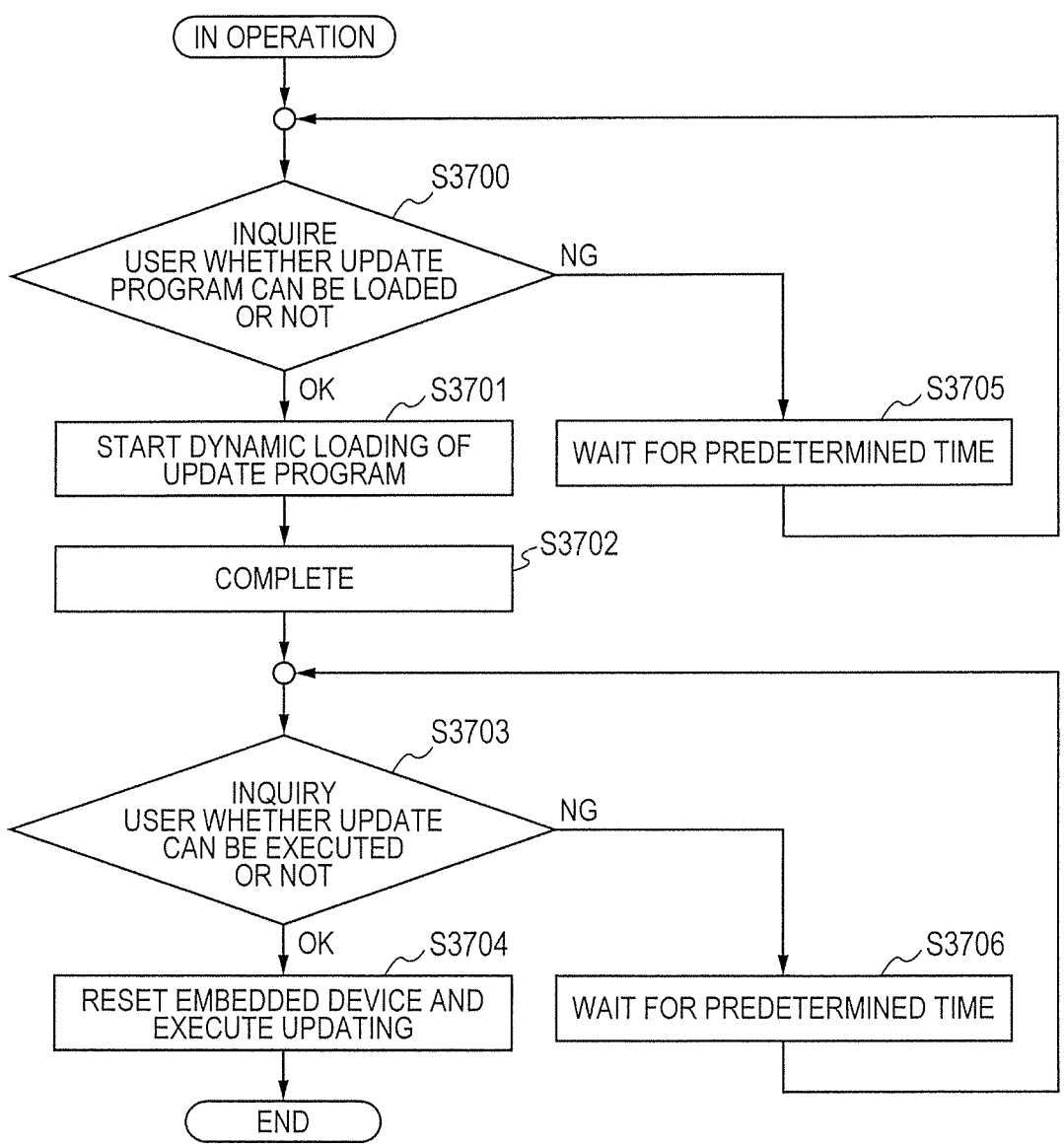
FIG. 37 is a flowchart illustrating an example of program updating procedure.

An example of the update procedure in the case where the number of planes of the program ROM 407 and the data ROM 408 will be as follows. FIG. 37 is a flowchart illustrating an example of the program updating procedure.

In step 3700 (S3700), the management server 30 inquires the user whether the update program can be loaded or not via the user interface 37. When the loading is allowed, the process shifts to step 3701. When the loading is not allowed, the process shifts to step 3705.

In the step 3701 (S3701), the management server 30 starts dynamic loading of the update program, that is, dynamic disposition of the update program to the program ROM 407 and the data ROM 408. The dynamic disposition denotes disposition of the difference from a program into the ROM without stopping the operation of the program.

In step 3702 (S3702), the management server 30 confirms completion of the dynamic disposition of the update program.

In step 3703 (S3703), the management server 30 inquires the user of whether update is possible or not via the user interface 37. When update is allowed, the process shifts to step 3704. When update is not allowed, the process shifts to step 3706.

In step 3704 (S3704), after completion of a setting necessary for the update such as a setting of allowance of the address translation table, the embedded device 40 is reset and restarted. At the time of restarting, the update is completed.

In step 3705 (S3705), after lapse of predetermined wait time, the process shifts to step 3700. Similarly, also in step 3706, after lapse of predetermined wait time, the process shifts to step 3703.

Figure 38:
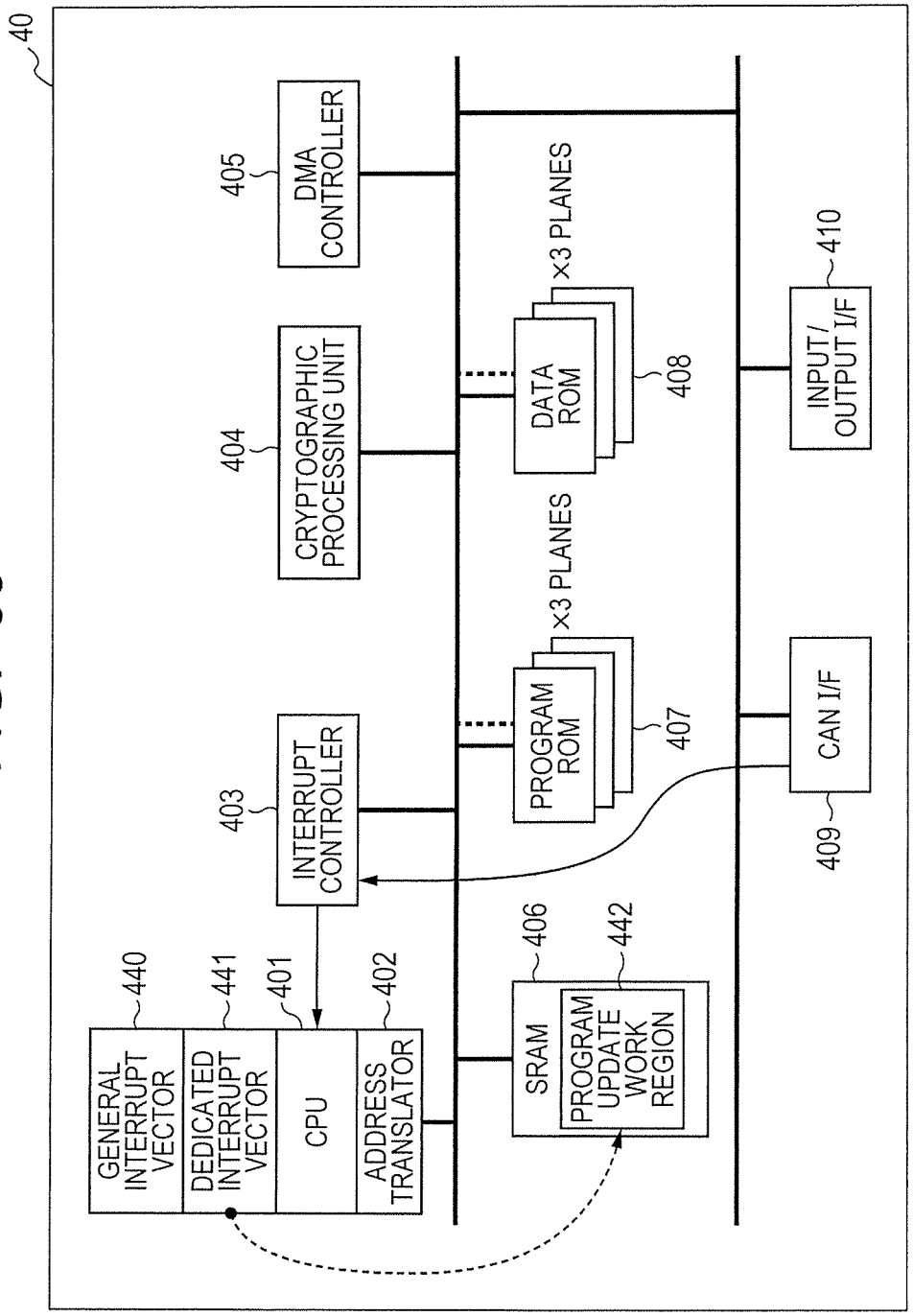
FIG. 38 is a schematic diagram explaining an example of dynamic disposition operation of a program in an embedded device.

Next, the dynamic disposition operation of a program in the embedded device 40 will be described. FIG. 38 is a schematic diagram explaining an example of dynamic disposing operation of a program in the embedded device 40. The SRAM 406 in the embedded device 40 has a program update work region 442 which is fixedly allocated at the time of starting. It is assumed that the CPU 401 has a general interrupt vector table 440 and a dedicated interrupt vector table 441. The dedicated interrupt vector table 441 is an interrupt vector table used in the dynamic program disposition and, physically, may be mounted as a part of the general interrupt vector table 440. An example of the dynamic disposition operation of the program is as follows.
(1) An interrupt requiring transfer of update information is received from the CAN interface 409 by the interrupt controller 403, and the interrupt controller 403 interrupts the CPU 401.
(2) The CPU 401 refers to the dedicated interrupt vector table 441, and a corresponding interrupt handler is executed. By the operation, under control of the CPU 401 or the DMA controller 405, update information is transferred from the CAN interface 409 to the SRAM 406. An injection code included in the update information is disposed in the program update work region 442. It is assumed that each of the data received is preliminarily added with a signature, and the predetermined address in the program update work region 442 is stored as the head address.
(3) The above-described operations (1) and (2) are repeated since the interrupt controller 403 receives an interrupt indicating separation of transfer of update information from the CAN interface 409 until the CPU 401 receives an interrupt.
(4) An interrupt indicating the separation of the transfer of the update information from the CAN interface 409 is received by the interrupt controller 403 and the interrupt is received by the CPU 401.
(5) The CPU 401 refers to the dedicated interrupt vector table 441 and a corresponding interrupt handler is executed. By the operation, the injection code disposed in the program update work region 442 is executed. The injection code executes, according to its kind, disposition of an update data table for the program ROM 407 and the data ROM 408 which is not accessed by the CPU 401 (that is, a local variable and a global variable with an initial value included in the update differential code), disposition of an update differential binary to the program ROM 407 which is not accessed by the CPU 401, and disposition of the address translation table to the data ROM 408 which is not in execution at present.
(6) The above-described operations (1) to (5) are repeated since the interrupt controller 403 receives an interrupt indicating completion of transfer of update information from the CAN interface 409 until the CPU 401 receives the interrupt.
(7) The interrupt controller 403 receives the interrupt indicating completion of transfer of update information from the CAN interface 409 and the CPU 401 receives the interrupt.
(8) The CPU 401 refers to the dedicated interrupt vector table 441 and a corresponding interrupt handler is executed. By the operation, verification of the signature of a data table and a differential code disposed in the program ROM 407 and the data ROM 408, and verification of the signature of an address translation table disposed in the address translator 402 and the data ROM 408 are executed. When a signature passes the signature verification, the embedded device 40 stores the signature (hash value) of a differential code into the data ROM 408 and outputs a completion notification from the CAN interface 409 to the outside. The embedded device 40 sets a flag indicating that a differential code disposition plane is switched after restart. When a mismatch occurs in the signature verification, the embedded device 40 erases the data table and the differential code disposed in the program ROM 407 and the data ROM 408 and erases the address translation table disposed in the address translator and the data ROM and outputs a notification of the signature verification mismatch from the CAN interface 409 to the outside.

Figure 39:
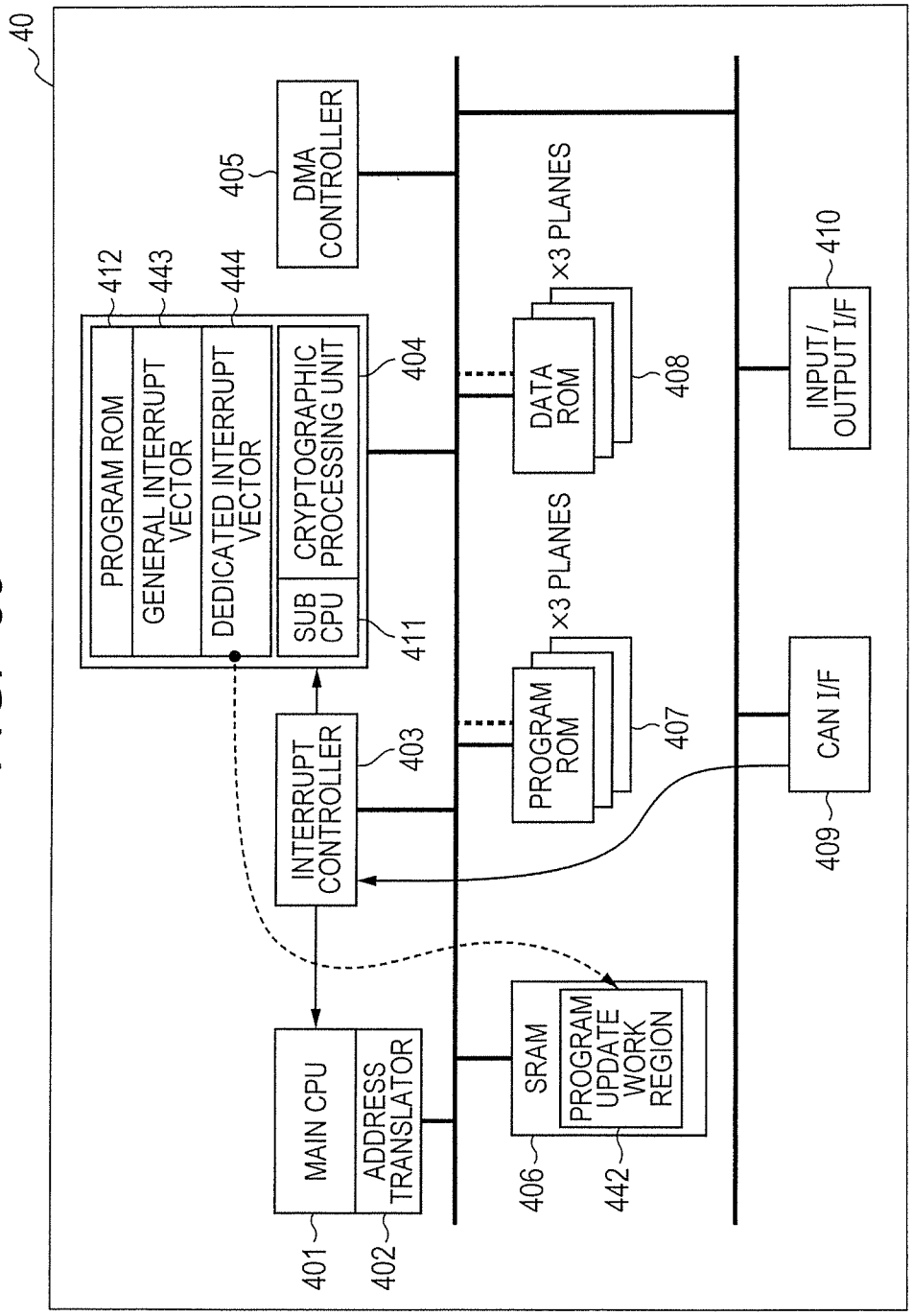
FIG. 39 is a schematic diagram explaining another example of dynamic disposition operation of a program in an embedded device.

FIG. 39 is a schematic diagram explaining another example of program dynamic disposition operation in the embedded device 40. The example illustrated in FIG. 39 is an example of dynamic disposition operation in the embedded device 40 having the sub CPU 411. In a manner similar to the above, the SRAM 406 has the program update work region 442 fixedly allocated at the time of startup. It is assumed that the sub CPU 411 has a general interrupt vector table 443 and a dedicated interrupt vector table 444. The program ROM 412 is a program ROM region storing the BIOS codes in FIGS. 32A and 32B and may be physically mounted any of the program ROM 407 or a part of the whole. An example of the dynamic disposition operation of a program in the embedded device 40 having such a configuration is as follows.
(1) An interrupt requiring transfer of update information is received from the CAN interface 409 by the interrupt controller 403, and the interrupt controller 403 interrupts the sub CPU 411. Alternatively, the interrupt from the interrupt controller 403 may be temporarily received by the main CPU 401, and the main CPU 401 may interrupt the sub CPU 411.
(2) The sub CPU 411 refers to the dedicated interrupt vector table 444, and a corresponding interrupt handler is executed. By the operation, under control of the sub CPU 411 or the DMA controller 405, update information is transferred from the CAN interface 409 to the SRAM 406. An injection code included in the update information is disposed in the program update work region 442. It is assumed that each of the data received is preliminarily added with a signature, and the predetermined address in the program update work region 442 is stored as the head address.
(3) The above-described operations (1) and (2) are repeated since the interrupt controller 403 receives an interrupt indicating separation of transfer of update information from the CAN interface 409 until the sub CPU 411 receives an interrupt.
(4) An interrupt indicating the separation of the transfer of the update information from the CAN interface 409 is received by the interrupt controller 403 and the interrupt is received by the sub CPU 411.
(5) The sub CPU 411 refers to the dedicated interrupt vector table 444 and a corresponding interrupt handler is executed. By the operation, the injection code disposed in the program update work region 442 is executed. The injection code executes, according to its kind, disposition of an update data table to a plane in the program ROM 407 and the data ROM 408 which is not accessed by the sub CPU 411, disposition of an update differential binary to the program ROM 407 which is not accessed by the sub CPU 411, and disposition of the address translation table to the data ROM 408 which is not in execution at present.
(6) The above-described operations (1) to (5) are repeated since the interrupt controller 403 receives an interrupt indicating completion of transfer of update information from the CAN interface 409 until the sub CPU 411 receives the interrupt.
(7) The interrupt controller 403 receives the interrupt indicating completion of transfer of update information from the CAN interface 409 and the sub CPU 411 receives the interrupt.

(8) The sub CPU 411 refers to the dedicated interrupt vector table 444 and a corresponding interrupt handler is executed. By the operation, verification of the signature of a data table and a differential code disposed in the program ROM 407 and the data ROM 408, and verification of the signature of an address translation table disposed in the address translator 402 and the data ROM 408 are executed. The operation in the case where a signature passes the signature verification and the operation in the case where a mismatch occurs in the signature verification are similar to those in the description of the above-described operation (8) in FIG. 38.

Figure 40:
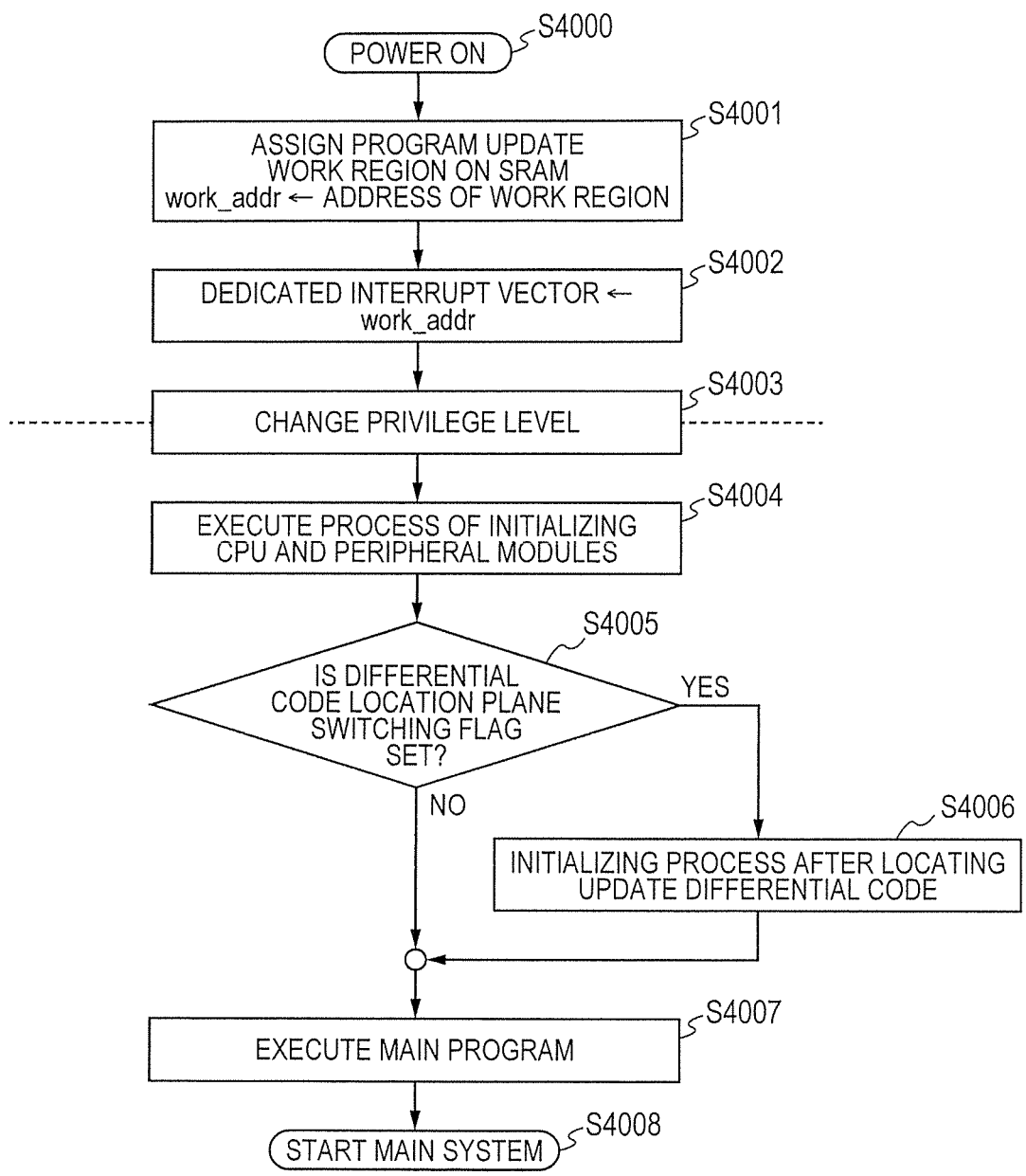
FIG. 40 is a flowchart illustrating an example of starting operation of an embedded device.

Next, starting operation in the embedded device 40 will be described. FIG. 40 is a flowchart illustrating an example of starting operation of the embedded device 40. The starting flow is an example of the operation flow at the time of restart after completion of setting update information. The starting flow is realized by, for example, executing firmware including a BIOS by the CPU 401 of the embedded device 40.

In step 4000 (S4000), the power supply is turned on from the off state, and the embedded device 40 starts processing in a privilege mode.

In step 4001 (S4001), the program update work region 442 is assigned on the SRAM 406. The head address of the work region is set as work_addr.

In step 4002 (S4002), work_addr is set in the dedicated interrupt vector table 441 or the dedicated interrupt vector table 444.

In step 4003 (S4003), the embedded device 40 changes the privilege level and shifts to the normal mode.

In step 4004 (S4004), the embedded device 40 executes a process of initializing the CPU 401 and peripheral modules.

In step 4005 (S4005), the embedded device 40 determines whether a differential code disposition plane switching flag is set or not. When the flag is set, the process shifts to step 4006. When the flag is not set, the process shifts to step 4007.

In step 4006 (S4006), "initializing process after locating an update differential code" is performed. An example of the "initializing process after locating an update differential code" will be described later.

In step 4007 (S4007), the embedded device 40 executes a main program.

In step 4008 (S4008), the main system starts.

Figure 41:
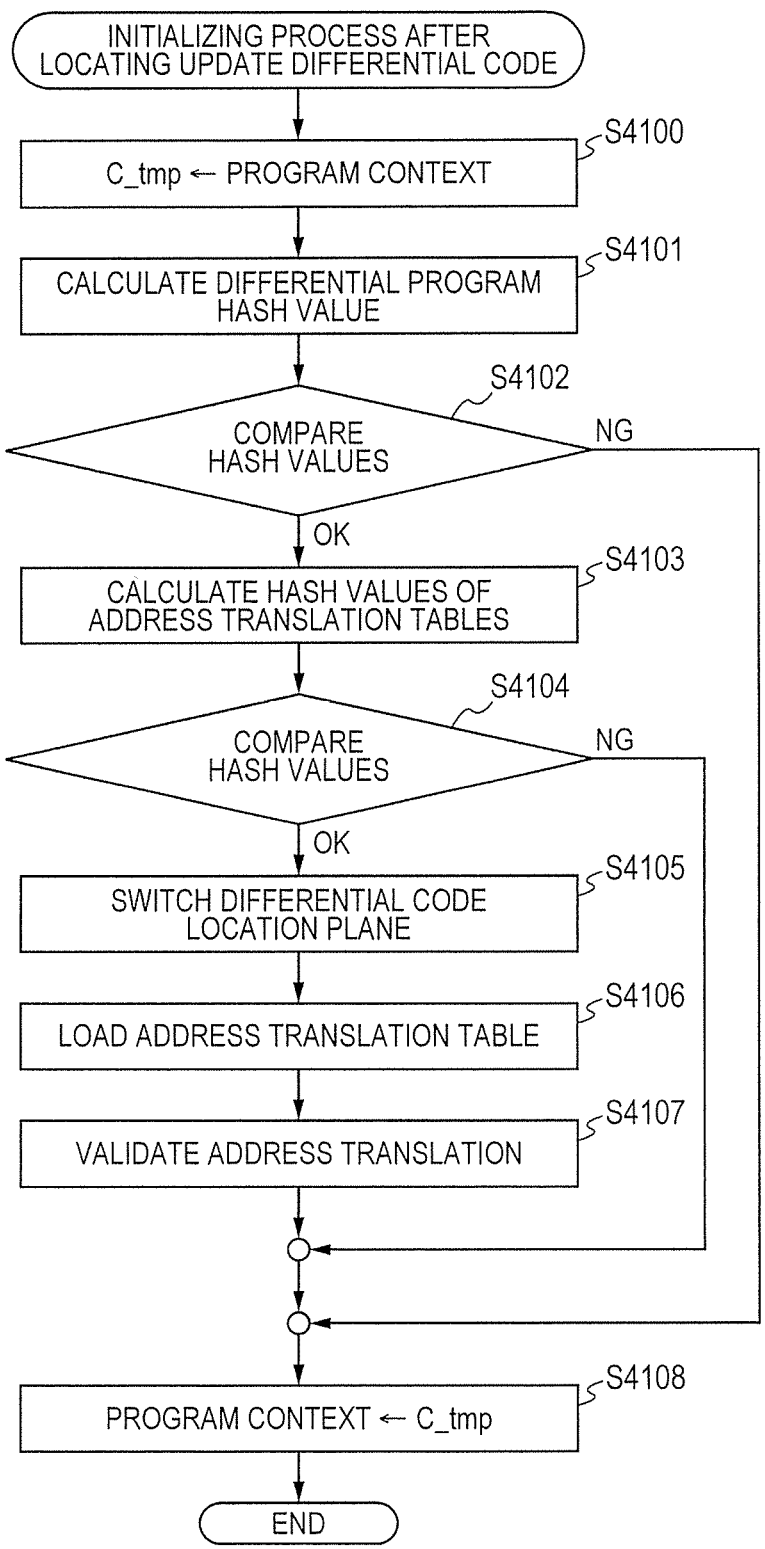
FIG. 41 is a flowchart illustrating an example of "initializing process after disposition of update differential code".

FIG. 41 is a flowchart illustrating an example of the "initializing process after update differential code disposition" in the step 4006 in FIG. 40. In the "initializing process after update differential code disposition", for example, the following operations are performed.

In step 4100 (S4100), the embedded device 40 saves a program context to C_tmp. The program context denotes the state of the program and refers to, concretely, the state of a CPU register and a memory. C_tmp is a save region on the memory. Signature verification and the like is a process which is not included in an original program and a process which changes the original program context. Consequently, a program context before execution of a process such as signature verification is temporarily stored and, after completion of the process, returned, thereby realizing the original program execution state.

In step 4101 (S4101), the embedded device 40 reads a data table and a differential code from the program ROM 407 and the data ROM 408 and calculates a hash value.

In step 4102 (S4102), the embedded device 40 compares a hash value used for the signature verification at the time of disposing the data table and the differential code with the hash value calculated in the step 4101. When the values match, the process shifts to step 4103. When the values mismatch, the process shifts to step 4108.

In the step 4103 (S4103), the embedded device 40 calculates the hash value of the address translation table disposed in the data ROM 408.

In step 4104 (S4104), the embedded device 40 compares the hash value used in the signature verification at the time of disposing the address translation table with the hash value calculated in the step 4103. When the values match, the process shifts to step 4105. When the values mismatch, the process shifts to step 4108.

In the step 4105 (S4105), the embedded device 40 switches a differential code disposition plane.

In step 4106 (S4106), the embedded device 40 loads the address translation table from the data ROM 408 and sets it in the address translator 402.

In step 4107 (S4107), the embedded device 40 validates the address translation.

In step 4108 (S4108), the embedded device 40 sets the program context saved (stored) in C_tmp as a new program context. That is, the embedded device 40 recovers the program context saved in C_tmp.

As described above, the update information is subject to the signature verification when it is stored in the ROM in the embedded device 40 and is also subject to the signal verification when it is applied to the embedded device 40 (steps 4101 to 4104). Consequently, falsification can be detected at the time of receipt of update information and can be also detected after the reception. Since the CPU 401 executes the differential program in the case where validness of the update information is confirmed, execution based on a program having a risk of falsification or the like can be avoided, so that security improves.

Figure 42:
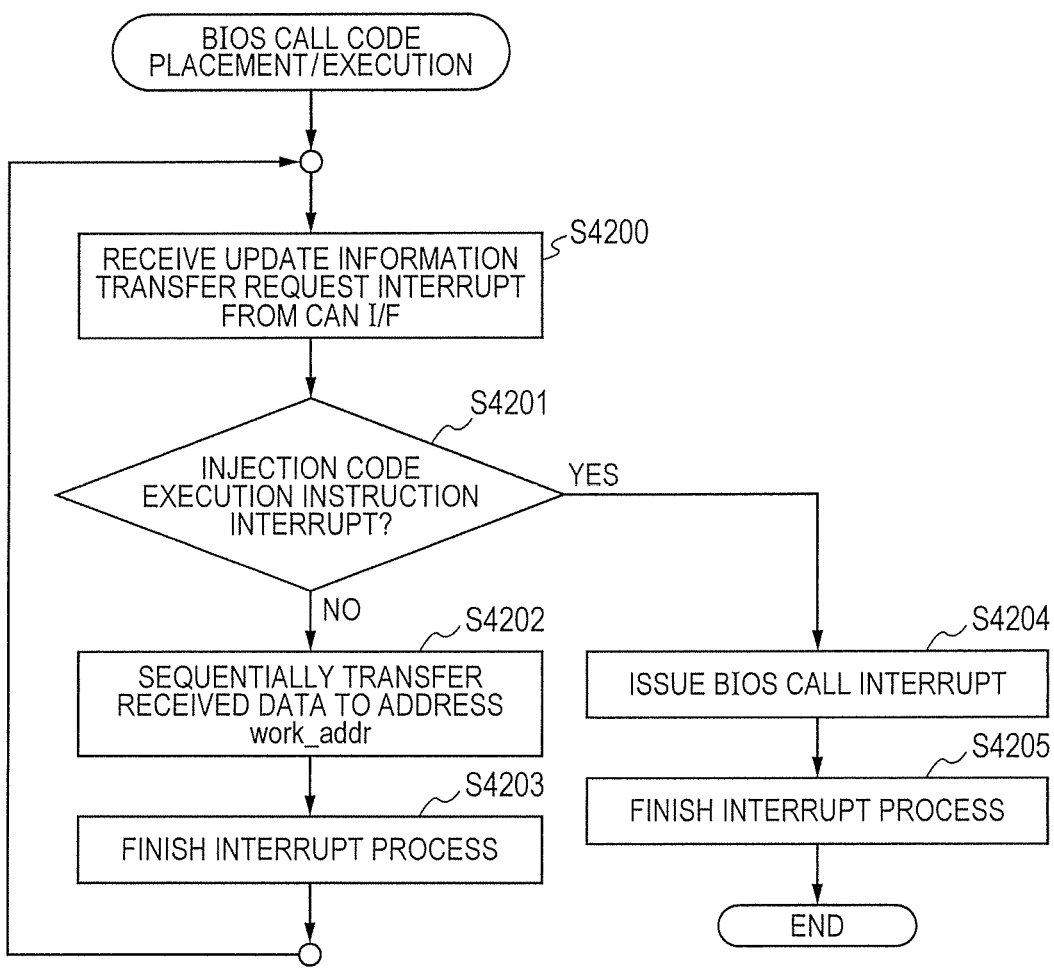
FIG. 42 is a flowchart illustrating an example of procedure of disposition of a code calling a BIOS in an SRAM and execution of the BIOS.

Next, the procedure of disposition of a code calling a BIOS to the SRAM 406 and execution of the BIOS will be described. FIG. 42 is a flowchart illustrating an example of procedure of disposition of a code calling a BIOS into the SRAM 406 and execution of the BIOS. A procedure of disposition via the CAN interface will be described as an example.

In step 4200 (S4200), an interrupt requiring transfer of update information is received by the CPU 401 from the CAN interface 409.

In step 4201 (S4201), whether the interrupt is an interrupt instructing execution of an injection code or not is determined. If yes, the process shifts to step 4204. If no, the process shifts to step 4202.

In step 4202 (S4202), the CPU 401 transfers the received data to a program work region whose head address is work_addr.

In step 4203 (S4203), the interrupt process is finished, and the process shifts to the step 4200.

In step 4204 (S4204), the CPU 401 executes the injection code disposed in the program update work region by the interrupt handler. The CPU 401 reads the BIOS from the injection code, passes an argument to the BIOS, and executes the BIOS.

In step 4205 (S4205), after execution of the BIOS function, the CPU 401 performs an interrupt finishing process in the BIOS function.

Figure 43:
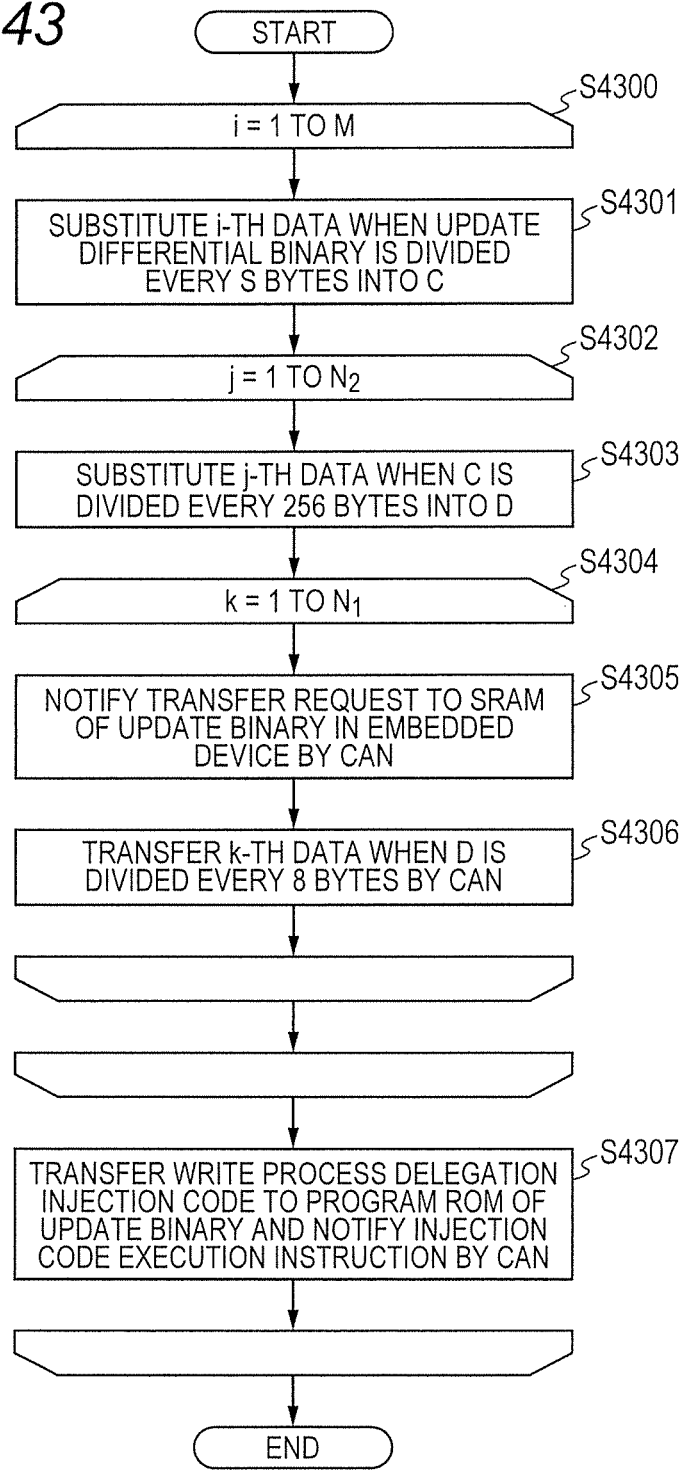
FIG. 43 is a flowchart illustrating an example of procedure of transferring an update differential binary included in an update information file from a management server to an embedded device.

Next, transfer of the update information file 50 will be described. FIG. 43 is a flowchart illustrating an example of procedure of transferring an update differential binary included in the update information file 50 from the management server 30 to the embedded device 40. The flow is executed by the data processing unit 33 of the management server 30. Concretely, for example, the flow is realized by executing a program stored in the memory in the data processing unit 33 by a processing device of the data processing unit 33.

As described above, the update information file 50 is generated by the development environment 20, transferred to the management server 30, and transferred from the management server 30 to the embedded device 40. As described above, the update information file 50 includes various information of the address translation table 52 and the like in addition to the update differential binary. As an example of transfer of the information from the management server 30 to the embedded device 40, an example of transferring an update differential binary is illustrated in FIG. 43. Transfer of the information other than the update differential binary included in the update information file 50 is also similar. For description, S, M, and $N_1$ are defined as follows. In the following definition, $N_2$ is a natural number and is set in accordance with the write unit of the flash memory. "ceil ( )" is a function of returning a round-up integer value of a numerical value in the parenthesis. It is assumed that data payload size of CAN is eight.

$S = 256 \times N_2$ bytes

M=ceil (byte size of update differential binary/S)

$N_1 = 256/8$, where 8 denotes data payload size of CAN

Those constant values can be properly changed according to system requirements.

In the example, the process of performing data transfer on the eight byte unit basis from the management server 30 to the embedded device 40 and writing data to the flash memory on the S byte unit basis is illustrated. Hereinafter, the process will be concretely described.

In step 4300 (S4300), the data processing unit 33 repeats the processes of steps 4301 to 4307 M times. During the repetition, the data processing unit 33 increments the variable i (initial value is 1).

In step 4301 (S4301), the data processing unit 33 substitutes the i-th data when the update differential binary is divided every S bytes into the variable C.

In step 4302 (S4302), the data processing unit 33 repeats the processes of steps 4303 to 4306 $N_2$ times. During the repetition, the data processing unit 33 increments the variable i (initial value is 1).

In step 4303 (S4303), the data processing unit 33 substitutes the j-th data when the data substituted in C is separated on the 256 byte unit basis into the variable D.

In step 4304 (S4304), the data processing unit 33 repeats the processes of steps 4305 and 4306 $N_1$ times. During the repetition, the data processing unit 33 increments the variable k (initial value is 1).

In step 4305 (S4305), the data processing unit 33 issues a request of transferring an update binary fragment received by the CAN interface 409 in the embedded device 40 to the SRAM 406 to the embedded device 40 via the CAN bus.

In step 4306 (S4306), the data processing unit 33 transmits the k-th data when the data substituted in D is divided every 8 bytes to the CAN bus so as to be transferred to the embedded device 40.

In step 4307 (S4307), the data processing unit 33 transmits an instruction of executing the injection code 701 of delegation of the write process to the program ROM 407 of an update binary to the CAN bus and transmits the injection code to the CAN bus.

The first embodiment has been described above. According to the first embodiment, the embedded device 40 executes an update program in accordance with an address translated by the address translator 402. Consequently, also in the case where the embedded device 40 does not have a dynamic address solution function, program update using a differential code can be performed. Since update only by a differential code, no update on the module unit basis, is performed, the amount of data stored in a memory in an embedded device at the time of the update can be suppressed. Therefore, it contributes to reduction of the memory. Since update of the module unit or less is possible, write and erasure of a flash memory can be performed on the finer unit basis. Consequently, the life of the flash memory longer than that in an updating method on the module unit basis can be achieved. Since information constructing a program restoration point is included in the update information file 50, rollback to a pre-update program at the time of detection of abnormality in updating or on the basis of an instruction from the outside becomes possible. Further, at the time of checking validity of an update program, that is, signature verification, for example, there is a method of checking validity by performing communication between an embedded device and another device. In the embodiment, such a method is not employed. Since a digest value (hash value) is calculated and confirmed by the embedded device 40, the influence of communication delay or the like at the time of verification can be avoided. Therefore, as compared with the case of checking the validity by performing communication between an embedded device and another device, time required for actual start from power-on can be made shorter. When abnormality is detected in a check using a digest value (hash value) of an update differential program, by recovering a program context which is preliminarily saved in a stack, the operation can be returned to execution of a pre-update program without turning off and on the power supply. Consequently, recovery time when abnormality is detected can be shortened. In the embodiment, since the ROM has three planes, even an updated program is being executed, one plane is free. Therefore, in the case of further performing updating, as described above, by using the one plane which is free, the execution of the program is not disturbed. The number of planes of the ROM is not limited to three. Obviously, even when the number of planes is four or more, similarly, the planes which are free can be used.

Second Embodiment

Figure 44:
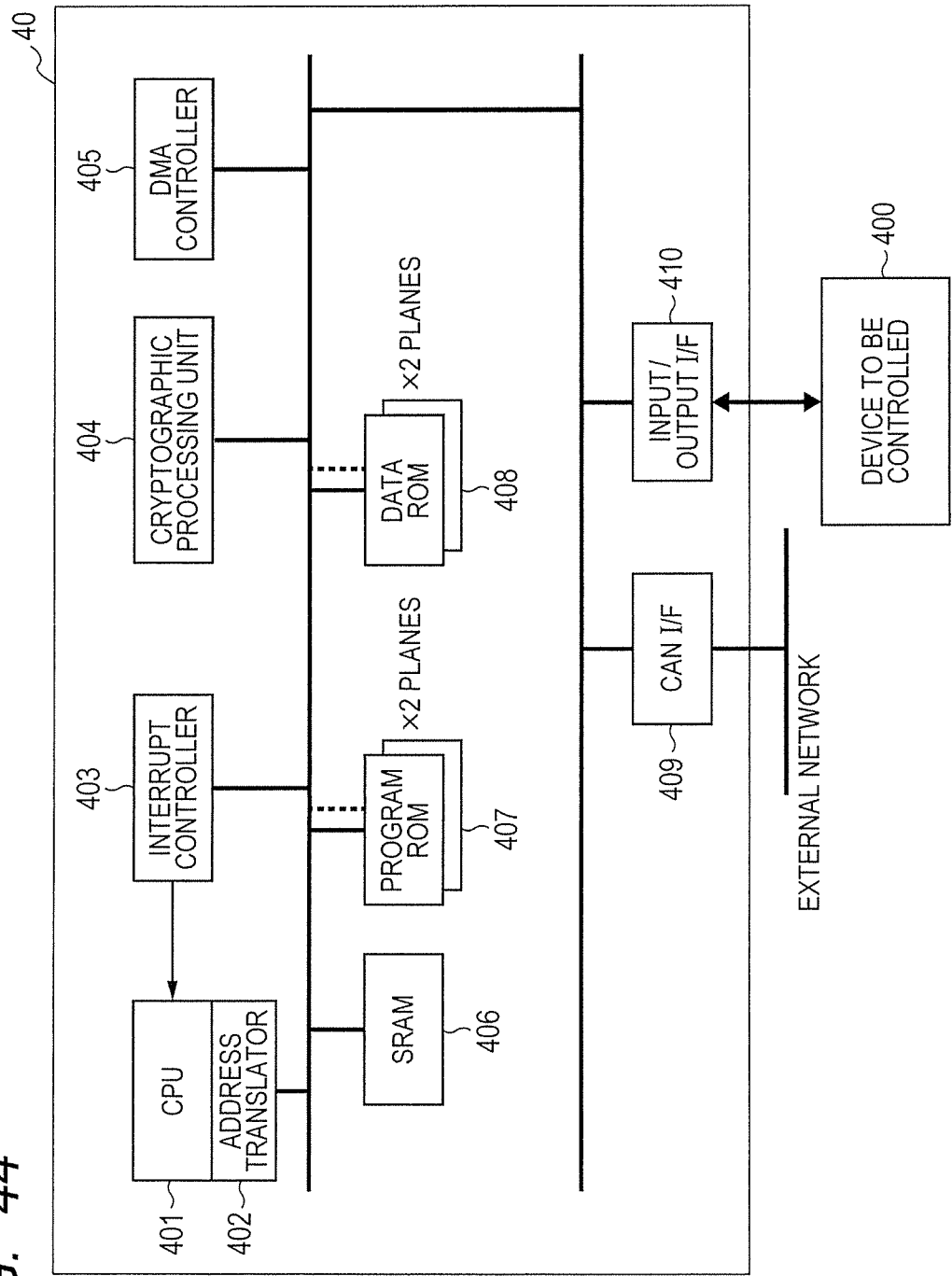
FIG. 44 is a block diagram illustrating a configuration example of an embedded device according to a second embodiment.

Next, a second embodiment will be described. The second embodiment is different from the first embodiment with respect to the point that the embedded device 40 is changed, concretely, that the configuration of the program ROM 407 and the configuration of the data ROM 408 in the embedded device 40 of the second embodiment are changed. In the following, description of the points similar to the first embodiment will be properly omitted for easier understanding. FIG. 44 is a block diagram illustrating a configuration example of the embedded device 40 according to the second embodiment.

The program ROM 407 according to the embodiment is a ROM having a configuration of two planes to/from which data can be independently written, read, and erased. That is, although the program ROM 407 in the first embodiment has the three-plane configuration, the program ROM 407 in the second embodiment has the two-plane configuration. The data ROM 408 in the second embodiment is a ROM having a configuration of two planes to/from which data can be independently written, read, and erased. That is, although the data ROM 408 in the first embodiment has the three-plane configuration, the data ROM 408 in the second embodiment has the two-plane configuration. Hereinafter, in the description of the second embodiment, unless otherwise described, the program ROM 407 is the ROM having the two-plane configuration according to the second embodiment. Similarly, the data ROM 408 is the ROM having the two-plane configuration according to the second embodiment. When a ROM has three or more planes, as described above, by using a free plane, execution of a program is not disturbed. However, in the case of two planes, when an updated program is being executed, there is no free plane in the ROM. Consequently, the method described in the first embodiment cannot be applied as it is. In the second embodiment, a method of realizing updating also in the case where a ROM has two planes will be described.

Figure 45:
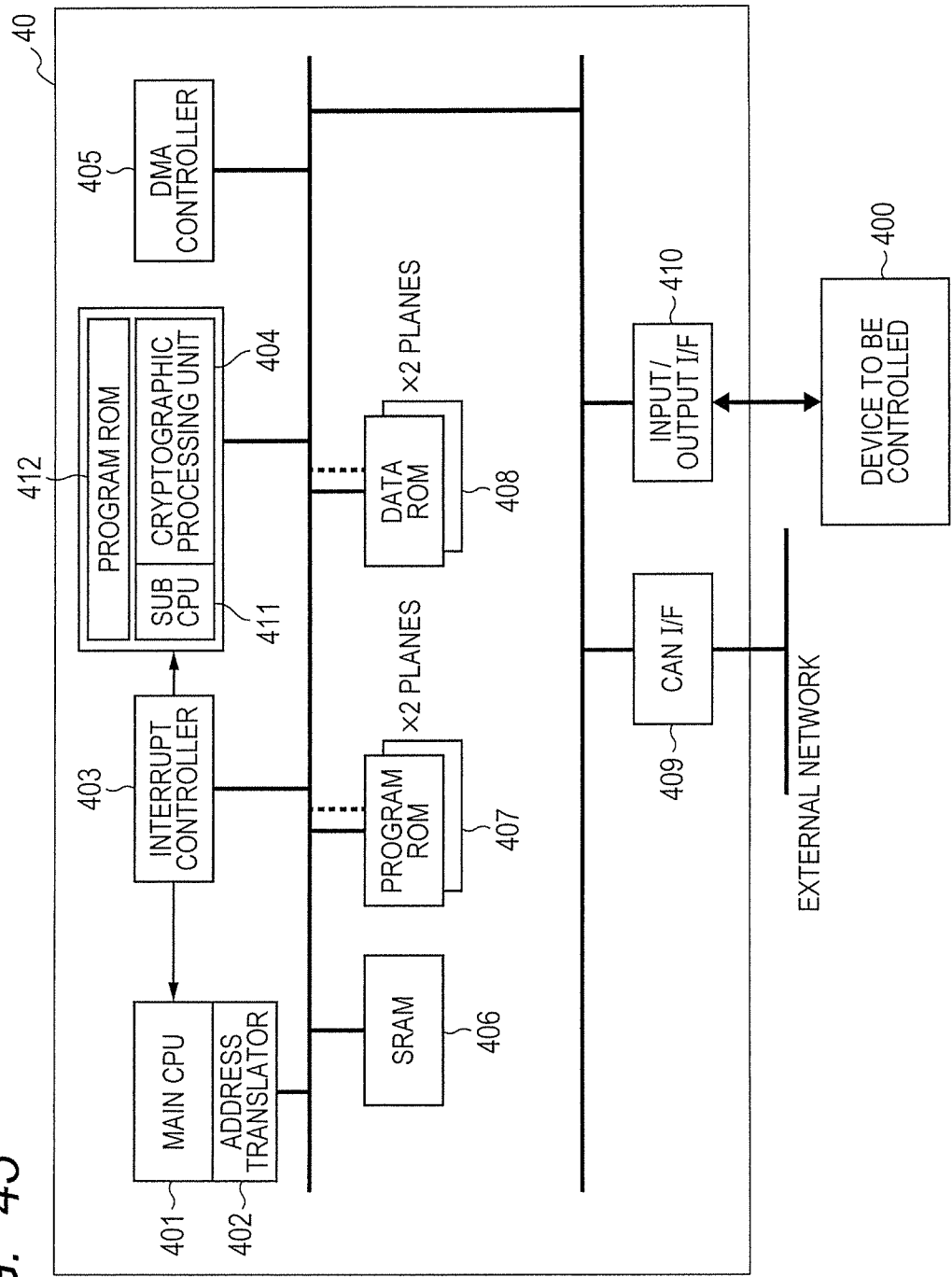
FIG. 45 is a block diagram illustrating another configuration example of the embedded device according to the second embodiment.

FIG. 45 illustrates another configuration example of the embedded device 40 according to the second embodiment. As illustrated in the diagram, in a manner similar to the first embodiment, the embedded device 40 of the second embodiment may have the sub CPU 411.

Figure 46:
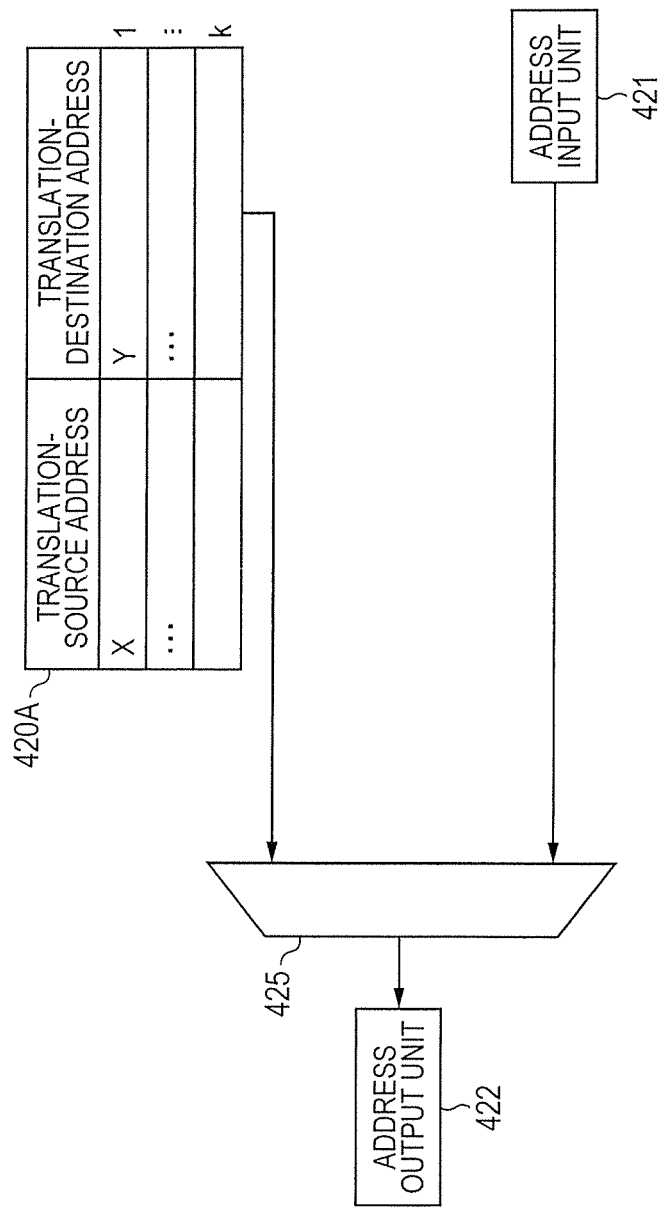
FIG. 46 is a schematic diagram illustrating outline of an address translator according to the second embodiment.

FIG. 46 is a schematic diagram illustrating outline of the address translator 402 according to the second embodiment. In the first embodiment, a default program is disposed in one of the three planes of the program ROM 407, and an update differential program is disposed in the remaining two planes. Consequently, any of the two address translation tables 420A and 420B is used. On the other hand, in the second embodiment, the number of planes is two. Therefore, as illustrated in FIG. 46, the address translator 402 according to the second embodiment performs address translation by using one address translation table 420A. For the purpose of enabling setting during program execution in the address translation table, two address translators may be provided.

The coupling relation of the address translator 402 according to the second embodiment is expressed as in FIG. 8 in a manner similar to the first embodiment. The embedded device 40 has, as the address translator 402, concretely, the address translator 402A for the program ROM 407 and the address translator 402B for the data ROM 408. In the embodiment, in correspondence with the configuration that the program ROM has two planes, the embedded device 40 has one address translator 402A for the program ROM 407. Similarly, the embedded device 40 has one address translator 402B for the data ROM 408.

Figure 47:
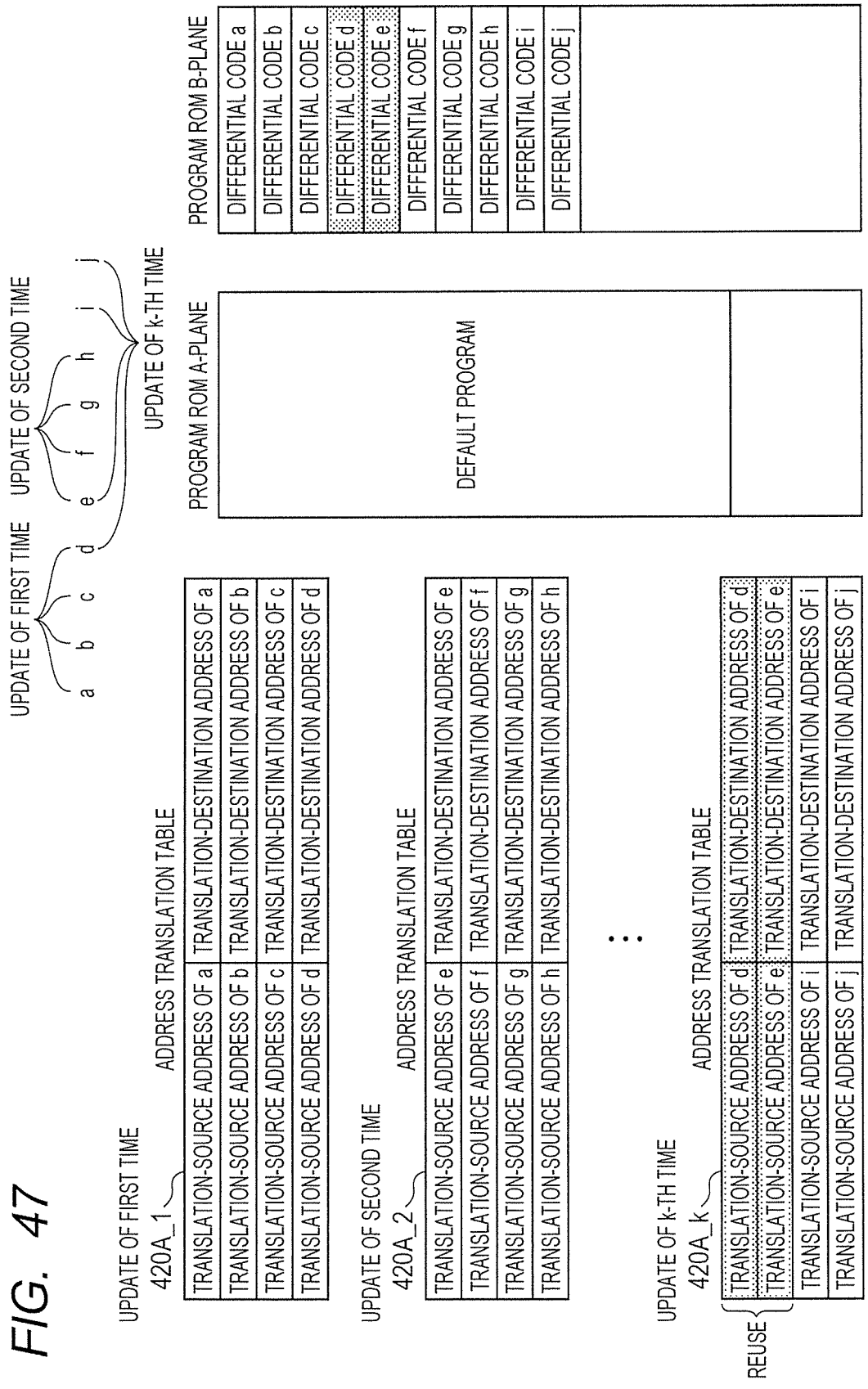
FIG. 47 is a schematic diagram explaining a method of reusing a differential code which was disposed in the past at the time of configuring a new differential code.

The update information file may be similar to that of the first embodiment or may be configured as follows. FIG. 47 is a schematic diagram explaining a method of reusing a differential code which was disposed in the past at the time of configuring a new differential code. In the case where the number of planes of the program ROM 407 is two, a region in which an update differential code can be disposed is smaller than that in the case where the number of planes is three. Consequently, by reusing a differential code itself, the amount of data disposed in the program ROM 407 can be reduced. That is, the memory capacity required for the program ROM 407 can be suppressed. The reuse is not limited to the case where the ROM has two planes but can be also easily applied to the case where the number of planes is three or more. Hereinafter, description will be given with reference to the drawings.

In the example illustrated in FIG. 47, in addition to the disposition example of a plurality of differential codes, a disposition example of address translation tables corresponding to the differential codes is also illustrated. In updating of the first time, differential codes a, b, c, and d are disposed in a memory space B, and an address translation table 420A_1 is disposed in the data ROM 408. In updating of the second time, differential codes e, f, g, and h are disposed in the memory space B, and an address translation table 420A_2 is disposed in the data ROM 408. The case of disposing the differential codes d and e and differential codes i and j in the memory space B and disposing an address translation table 420A_k in the data ROM 408 in updating of the k-th time will be examined.

Since the differential codes d and e are already disposed in the address space B, by using the head addresses of the differential codes d and e already disposed in the address translation table 420A_k as addresses after translation, it is unnecessary to newly dispose the differential codes d and e in the address space B. That is, the differential codes already disposed are reused in such a manner. With respect to entries corresponding to the differential codes d and e in the address translation table 420A_k, entries already disposed may be reused or newly disposed in the data ROM 408. FIG. 47 illustrates a configuration example of newly disposing all of entries in the address translation table 420A_k in the data ROM 408 without reusing the entries.

With the configuration, in the embedded device 40, update information excluding the part overlapping the update information already disposed in the program ROM 407 or the data ROM 408 is received by the CAN interface 409. In the program ROM 407 or the data ROM 408, in addition to the overlapped part already disposed, the update information excluding the overlapped part is newly disposed. In such a manner, the memory capacity required to the program ROM 407 or the data ROM 408 can be suppressed.

Figure 48A:
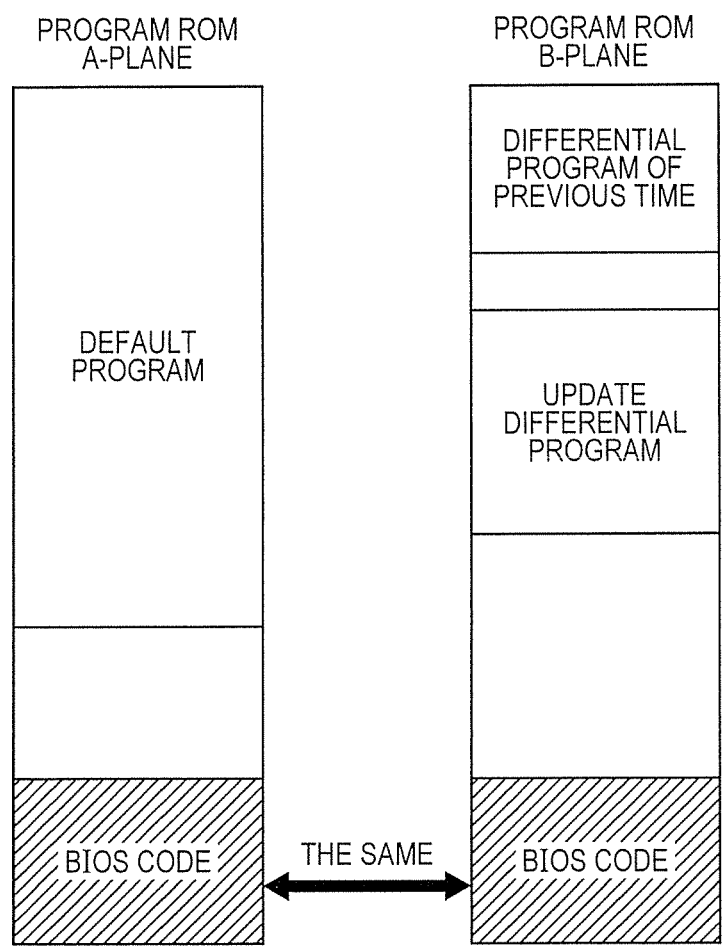
FIG. 48A is a schematic diagram illustrating a disposition example of a BIOS code into a program ROM having two planes in the case of updating a program which does not accompany updating of a BIOS code.
Figure 48B:
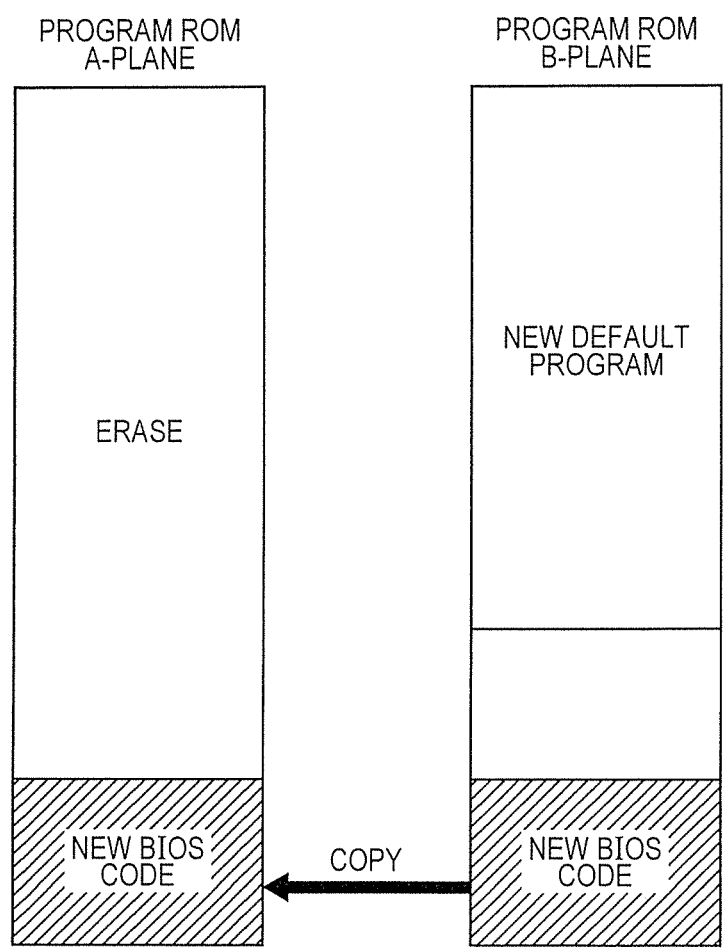
FIG. 48B is a schematic diagram illustrating a disposition example of a BIOS code into a program ROM having two planes in the case of updating an entire default program including updating of a BIOS code.

Next, the disposition example of BIOS codes in the embodiment will be described. FIGS. 48A and 48B are schematic diagrams illustrating a disposition example of a BIOS code into the program ROM 407 of two planes. FIG. 48A illustrates an example corresponding to the case of updating a program which does not accompany updating of a BIOS code. FIG. 48B illustrates an example corresponding to the case of updating an entire default program including updating of a BIOS code.

First, referring to FIG. 48A, the case of updating a program which does not accompany updating of a BIOS code will be described. In FIG. 48A, the same BIOS code is disposed in the two planes. A default program is disposed in the plane A, and a differential program corresponding to updating of last time and an update differential program which is being written are disposed in the plane B. In disposition of the update differential program to the plane B, an execution state of the default program and the update program of last time made by the differential program of last time in the planes A and B is changed to an execution state of the default program on the plane A by restart. After that, in disposition of the update differential program to the plane B, the BIOS code disposed in the plane B is used and writing is executed by a program ROM write driver expanded in the SRAM 406 or program ROM write dedicated hardware. By the operation, without disturbing an access from the CPU 401 to the plane A, the update differential program can be disposed in the plane B. That is, the update differential program can be disposed in the plane B during execution of the program in the plane A. The update differential program disposed in the plane B is an update differential program with respect to the default program disposed in the plane A. The update differential program disposed in the plane B may be also configured by reusing the update differential program already disposed in the plane B.

Referring to FIG. 48B, the case of updating an entire default program including updating of a BIOS code will be described. FIG. 48A illustrates a state that the plane A is erased, a new default program and a new BIOS code are disposed in the plane B, and the new BIOS code disposed in the plane B is copied to the plane A. With the configuration, the following processes are performed. First, erasure of the plane B is performed by calling an erase process BIOS of the program ROM 407 from the injection code of delegation of the erase process of the program ROM 407 and executing it. Next, a new default program and a new BIOS code are disposed to the plane B by calling a program ROM write process from the injection code of delegation of the program ROM write process and executing it. By calling a default plane switching process BIOS from the injection codes 712 and 713 of delegation of the default plane switching process and executing it, the start address at the time of restart is set to the head of the plane B. An injection code of delegation of the program ROM erasure for executing erasure during restart of the plane A of the program ROM 407 and an injection code of delegation of the program ROM write process for executing copying during restart of the new BIOS code to the plane A are disposed from the SRAM 406 to the data ROM 408 before restart, and the two injection codes are expanded from the data ROM 408 to the SRAM 406 and executed during restart. After the restart, the program disposition structure illustrated in FIG. 48B is realized, the program start address is set at the head of the plane B, and the new default program in the plane B is executed. The new BIOS code may be temporarily disposed in the data ROM 408 and, after that, expanded to the program ROM 407 at a proper timing.

Figure 49:
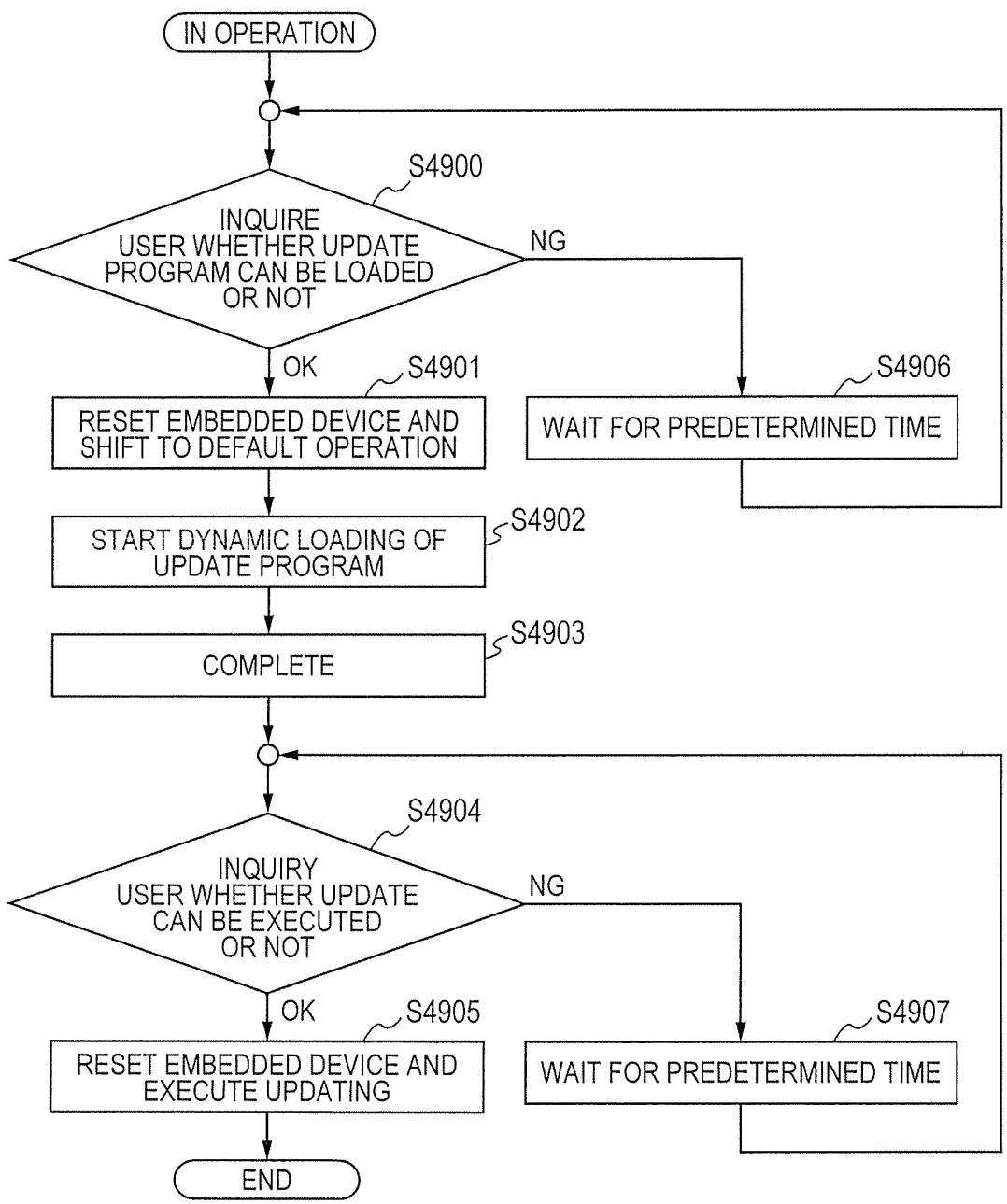
FIG. 49 is a flowchart illustrating an example of program updating procedure according to the second embodiment.

An updating procedure in the case where the number of planes of the program ROM 407 and the data ROM 408 is two will be, for example, as follows. FIG. 49 is a flowchart illustrating an example of program updating procedure.

In step 4900 (S4900), the management server 30 inquires the user of whether an update program can be loaded or not via the user interface 37. When loading is permitted, the process shifts to step 4901. When loading is not permitted, the process shifts to step 4906.

In step 4901 (S4901), setting necessary to set a default program execution state such as setting of inhibition of an address translation table is completed and, after that, the embedded device 40 is reset and restarted. After the restart, the embedded device 40 shifts to the default program execution state.

In step 4902 (S4902), the management server 30 starts dynamic loading of an update program, that is, dynamic disposition of the update program to the program ROM 407 and the data ROM 408.

In step 4903 (S4903), the management server 30 recognizes completion of the dynamic disposition of the update program.

In step 4904 (S4904), the management server 30 inquires the user of whether updating is permitted or not via the user interface 37. When updating is permitted, the process shifts to step 4905. When updating is not permitted, the process shifts to step 4907.

In step 4905 (S4905), after setting necessary for updating such as setting of permission of the address translation table is completed, the embedded device 40 is reset and restarted. At the time of the restart, the updating is completed.

In step 4906 (S4906), after lapse of predetermined wait time, the process shifts to step 4900. Similarly, in step 4907 (S4907), after lapse of predetermined wait time, the process shifts to step 4904.

Figure 50:
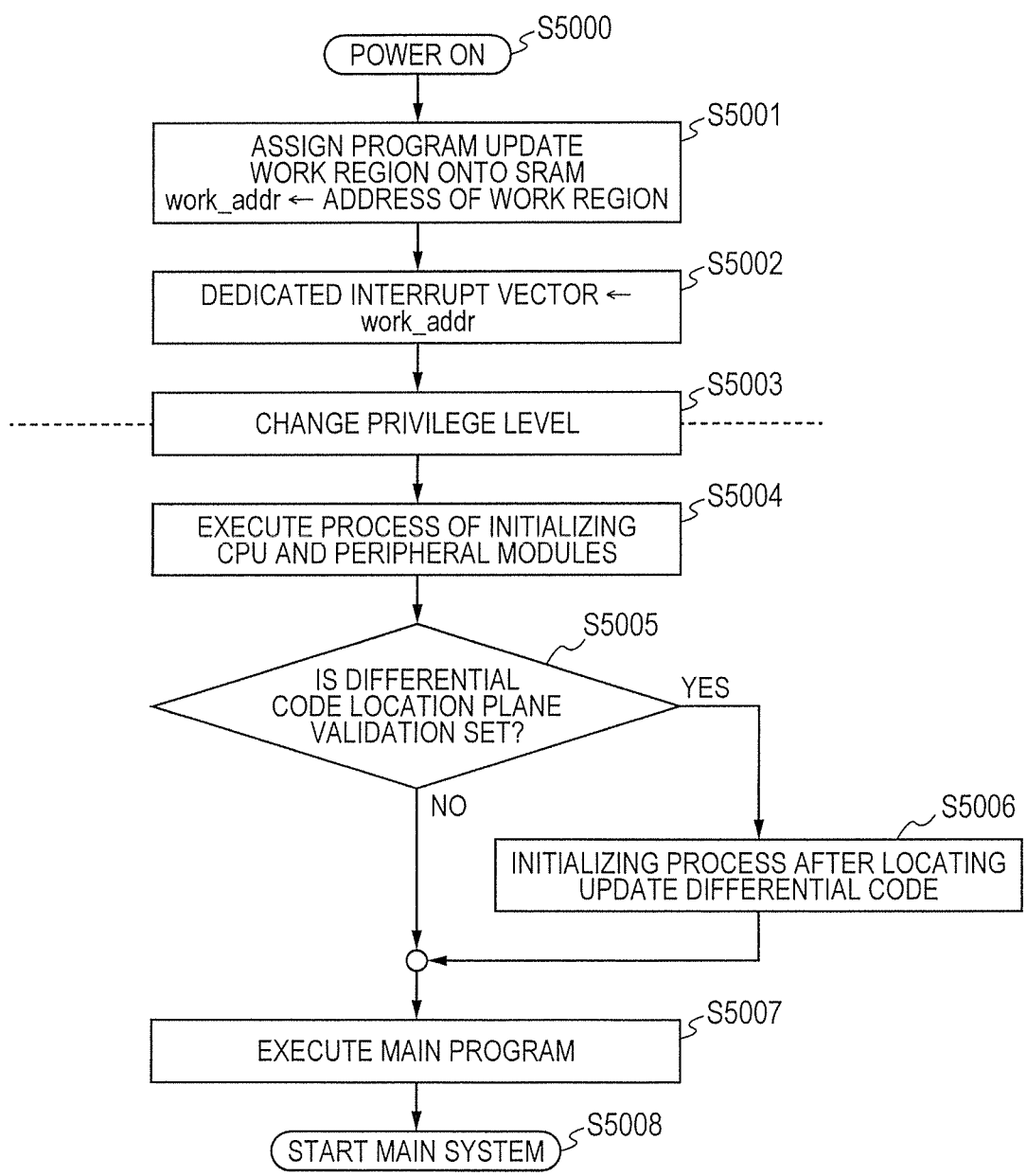
FIG. 50 is a flowchart illustrating an example of starting operation of an embedded device according to the second embodiment.

Next, starting operation in the embedded device 40 in the second embodiment will be described. FIG. 50 is a flowchart illustrating an example of starting operation of the embedded device 40 according to the second embodiment. Hereinafter, the point different from the starting operation in the embedded device 40 illustrated in FIG. 40 will be described.

The starting operation in the embedded device 40 illustrated in FIG. 50 is the same except for the point that step 4005 in the starting operation in the embedded device 40 illustrated in FIG. 40 is replaced to step 5005. In the step 5005, the embedded device 40 determines whether a differential code disposition plane valid flag is set or not. When the flag is set, the process shifts to step 5006. When the flag is not set, the process shifts to step 5007.

Figure 51:
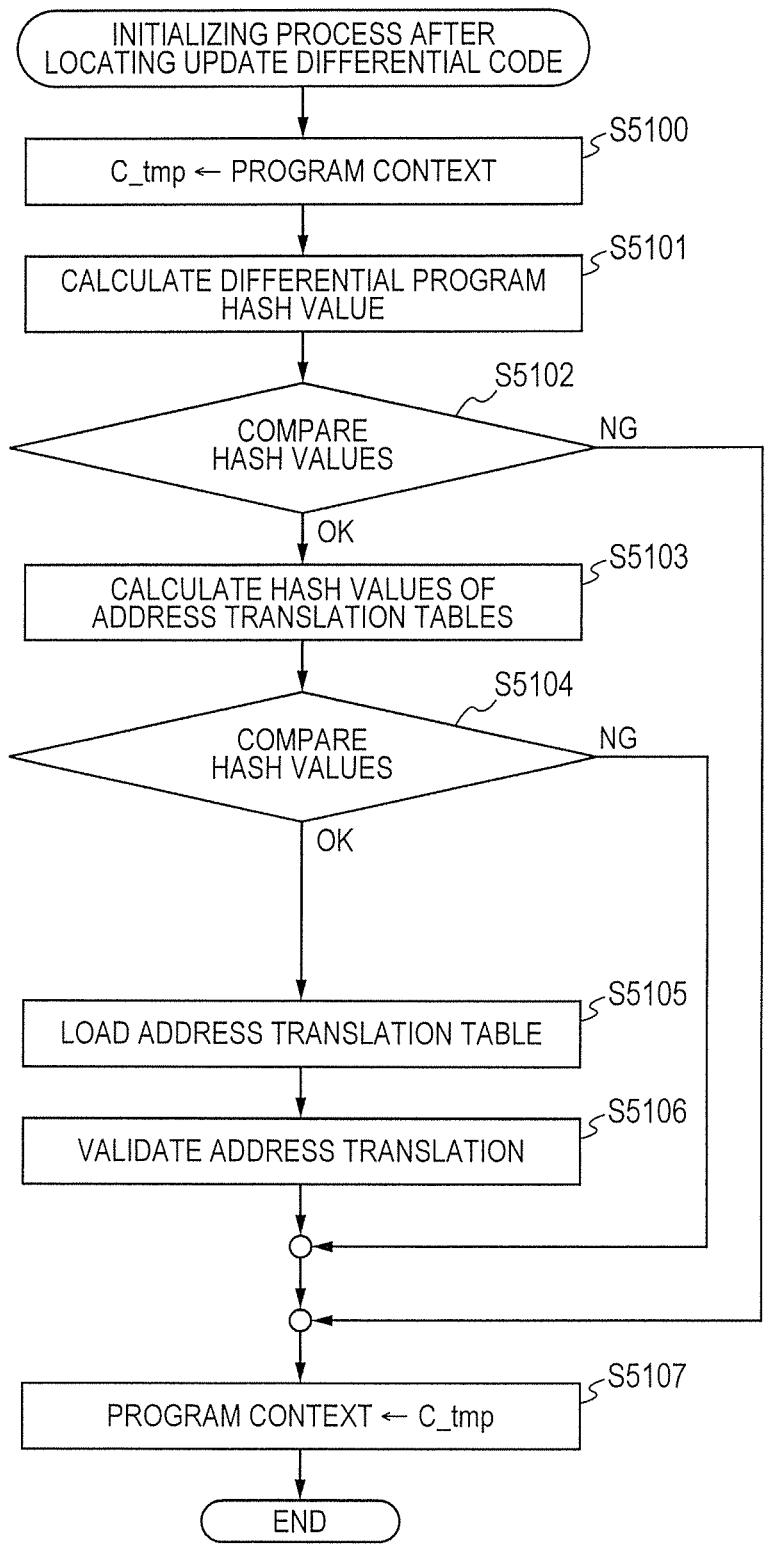
FIG. 51 is a flowchart illustrating an example of "initializing process after disposition of update differential code" according to the second embodiment.

Next, "initializing process after disposing update differential code" in step 5006 in FIG. 50 will be described. FIG. 51 is a flowchart illustrating an example of the "initializing process after disposing update differential code" in step 5006 in FIG. 50. In the "initializing process after disposing update differential code", for example, the following operation is performed. Hereinafter, the point different from the processes illustrated in FIG. 41 will be described, and description of the points similar to the processes illustrated in FIG. 41 will be properly omitted.

Steps 5100 (S5100) to 5104 (S5104) are similar to the steps 4100 to 4104 illustrated in FIG. 41. When hash values match in step 5102, the process shifts to step 5103. In the case of a mismatch, the process shifts to step 5107. When the hash values match in step 5104, the process shifts to step 5105. When the values do not match, the process shifts to step 5107.

In step 5105 (S5105), the embedded device 40 loads an address translation table from the data ROM 408 and sets it in the address translator 402.

In step 5106 (S5106), the embedded device 40 validates address translation.

In step 5107 (S5107), the embedded device 40 sets a program context saved (stored) in C_tmp as a new program context. That is, the embedded device 40 recovers the program context saved in C_tmp.

The second embodiment has been described above. According to the second embodiment, also in the case where the ROM has two planes, effects similar to those of the first embodiment can be produced. Since a global variable is stored in the data ROM 408, when a global variable is not used, the number of planes of the data ROM 408 can be set to one.

Third Embodiment

Next, a third embodiment will be described. The embodiment relates to an improved example to realize secure dynamic disposition of an update differential program and secure updating operation in an embedded device. Concretely, in the embodiment, a counter measure against destruction of a program or data and a counter measure against malicious writing and erasure to a ROM are realized. The third embodiment can be also combined with any of the first and second embodiments. Only one of the countermeasure against destruction of a program or data and the counter measure against malicious writing and erasure to a ROM may be applied.

First, the countermeasure against destruction of a program or data will be described. In the examples described in the first and second embodiments, among the injection codes constructing the update information file, injection codes including the erasing process of the program ROM 407 or the data ROM 408 are the injection code 709 of delegation of the rollback process to the designated restoration point, the injection code 705 of delegation of the program ROM erase/write process for updating the initial value of a local variable, and the injection code 706 of delegation of the data ROM erase/write process for updating the initial value of a global variable. When security is not considered, the injection code 702 of delegation of the write process of an address translation table to the data ROM 408 continues storing the address translation table until the data ROM 408 overflows. When security is considered, it is preferable to perform the erase process so as to hold only predetermined number of past address translation tables. In the erasure process by those injection codes, when erasure block number is falsified in some way and, further, falsification detection fails, a program and data stored is destroyed and it causes a problem. In the following, a method of realizing erasure without passing an argument to a BIOS routine with respect to erasure block number in the injection code will be described. For convenience, in the following, the embodiment will be described by using the injection codes like in a manner similar to the first and second embodiments. However, it is reasonable to interpret that, in place of the injection code, a data sequence made by call function name and argument sequence of the function is used. It is realized as a faun of constructing a function corresponding to the injection code from the data sequence in the embedded device. By employing such a realizing method, at the time of constructing a function corresponding to the injection code, validity verification of the injection code such as signature verification of a data sequence can be realized more securely.

Figure 52:
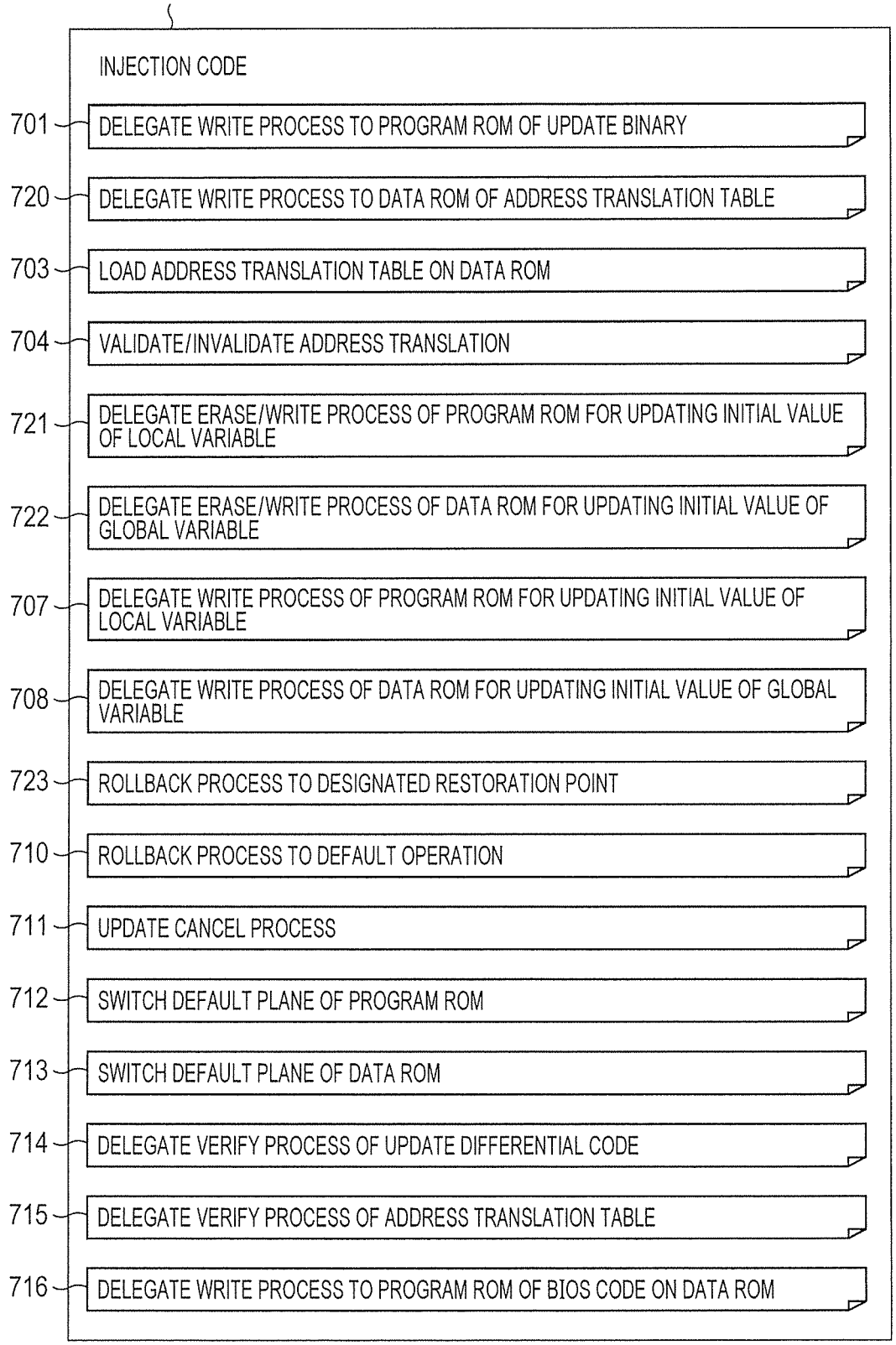
FIG. 52 is a schematic diagram illustrating a configuration example of an injection code according to a third embodiment.

FIG. 52 is a schematic diagram illustrating a configuration example of an injection code according to the third embodiment. In the third embodiment, the injection code 702 is replaced to the injection code 720 of delegation of the write process to the data ROM 408 of the address translation table, the injection code 705 is replaced to the injection code 721 of delegation of the erase/write process of the program ROM 407 for updating the initial value of a local variable, the injection code 706 is replaced to the injection code 722 of delegation of the erase/write process of the data ROM 408 for updating the initial value of a global variable, and the injection code 709 is replaced to the injection code 723 of the rollback process to the designated restoration point. The other injection codes are similar to those of the first and second embodiments.

Hereinafter, the injection codes different from those in the first and second embodiments will be described.

Figure 53:
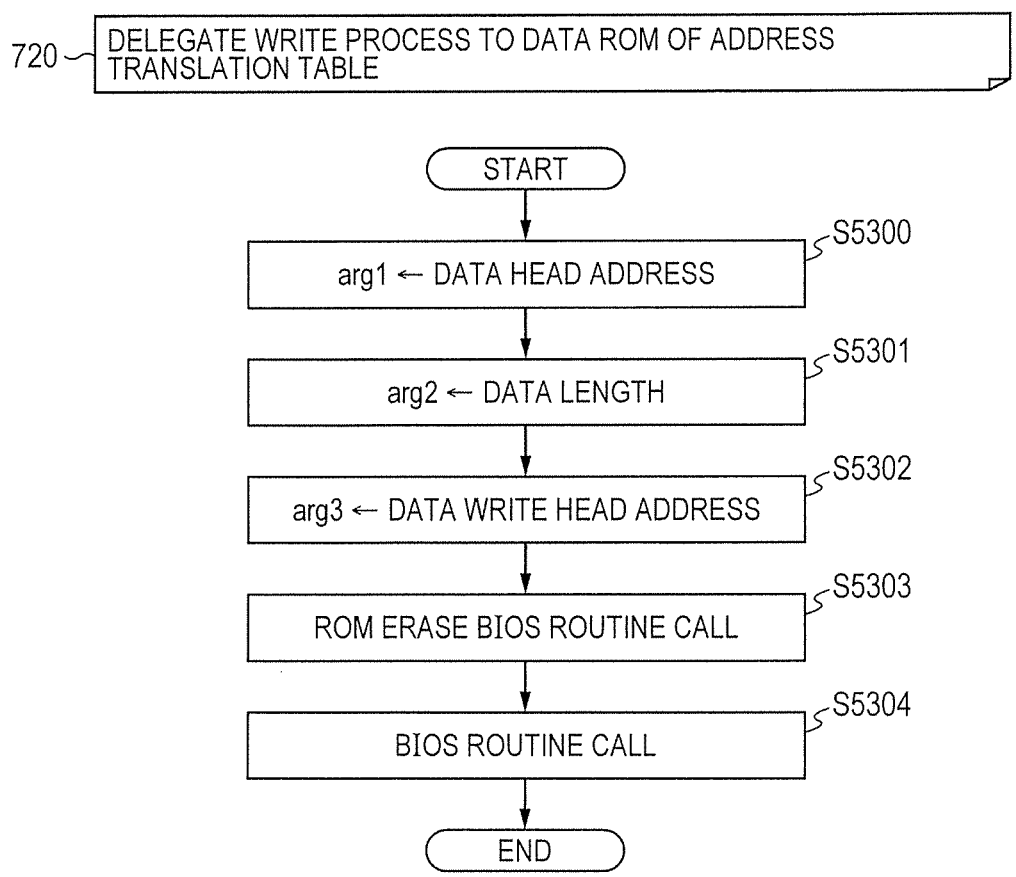
FIG. 53 is a flowchart illustrating an example of procedure of a process of calling a BIOS routine code corresponding to a process in the injection code according to the third embodiment.

FIG. 53 is a flowchart illustrating an example of procedure of a process of calling a BIOS routine code corresponding to a process in the injection code 720 performing delegation of the write process to the data ROM 408 of the address translation table, according to the third embodiment.

In step 5300 (S5300), the head address of read data is disposed in a first argument arg1. In step 5301 (S5301), data length is disposed in a second argument arg2. In step 5302 (S5302), the head address of data write destination is disposed in a third argument arg3. In step 5303 (S5303), a ROM erase BIOS routine is called. In step 5304 (S5304), a corresponding BIOS routine is called.

The details of the ROM erase BIOS routine called in step 5303 will be described later with reference to FIG. 58. The BIOS routine called in step 5304 executes the write process to the data ROM 408 of the address translation table. An execution example is as follows. In a state where the address translation table is disposed in the SRAM 406 by DMA transfer by an interrupt from the CAN interface 409, further, by an interrupt from the CAN interface 409, the injection code 720 of delegation of the write process to the data ROM 408 of the address translation table is disposed in the SRAM 406, the injection code is executed by the interrupt, and a BIOS routine is called. The BIOS routine called in step 5303 executes a process of erasing blocks in a region which is rewritten. By the process, address translation tables in the past are erased. The BIOS routine called in step 5304 executes a write process to the data ROM 408 of the address translation table disposed in the SRAM 406.

Figure 54:
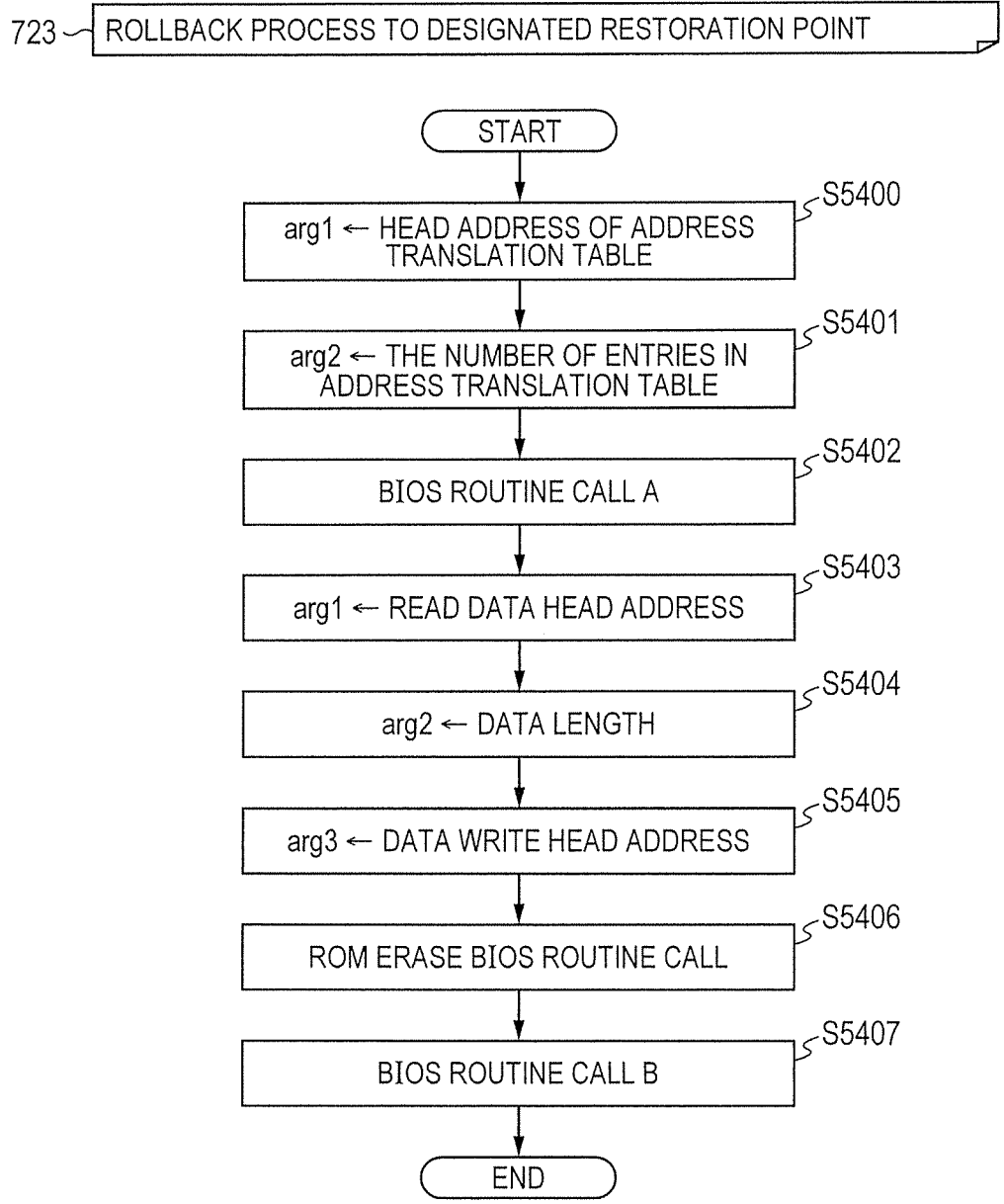
FIG. 54 is a flowchart illustrating an example of procedure of a process of calling a BIOS routine code corresponding to a process in the injection code according to the third embodiment.

FIG. 54 is a flowchart illustrating an example of procedure of a process of calling a BIOS routine code corresponding to a process in the injection code 723 performing delegation of the rollback process to a designated restoration point, in which security response is considered.

In step 5400 (S5400), the head address of an address translation table corresponding to the restoration point is disposed in the first argument arg1. In step 5401 (S5401), the number of entries of the address translation table corresponding to the restoration point is disposed in the second argument arg2. In step 5402 (S5402), a BIOS routine A setting an address translation table corresponding to the restoration point is called. After that, the following steps 5403 to 5407 are executed only by the necessary number of times. In step 5403 (S5403), the head address of a region on the data ROM 408 in which a local variable or a global variable with an initial value is disposed at the designated restoration point in a differential program to be rolled back is disposed in the first argument arg1. That is, the head address is the head address of read data. In step 5404 (S5404), data length of read data is disposed in the second argument arg2. In step 5405 (S5405), the head address of data write destination is disposed in the third argument arg3. In step 5406 (S5406), a ROM erase BIOS routine is called. In step 5407 (S5407), a BIOS routine B performing writing to the program ROM 407 and the data ROM 408 for realizing recovery to the disposition state of the local variable or the global variable with the initial value at the designated restoration point is called.

The details of the ROM erase BIOS routine called in step 5406 will be described with reference to FIG. 58. The two BIOS routines called in steps 5402 and 5407 execute the rollback process to the designated restoration point. An execution example is as follows. By an interrupt from the CAN interface 409, the injection code 723 of delegation of the rollback process to the designated restoration point is disposed in the SRAM 406. The injection code is executed by the interrupt, and two BIOS routine calls are made. In each of the BIOS routines, the rollback process to the designated restoration point is executed. In the rollback process to the designated restoration point, first, an address translation table corresponding to the designated restoration point is set in the address translator 402 (BIOS routine A). Subsequently, the write process to the program ROM 407 and the data ROM 408 for realizing recovering to the disposition state of the local variable or the global variable with the initial value at the designated restoration point (BIOS routine B) is performed. When the injection code 723 is executed, the ROM erase BIOS routine is also called. The ROM erase BIOS routine executes a process of erasing a region which is rewritten.

Figure 55:
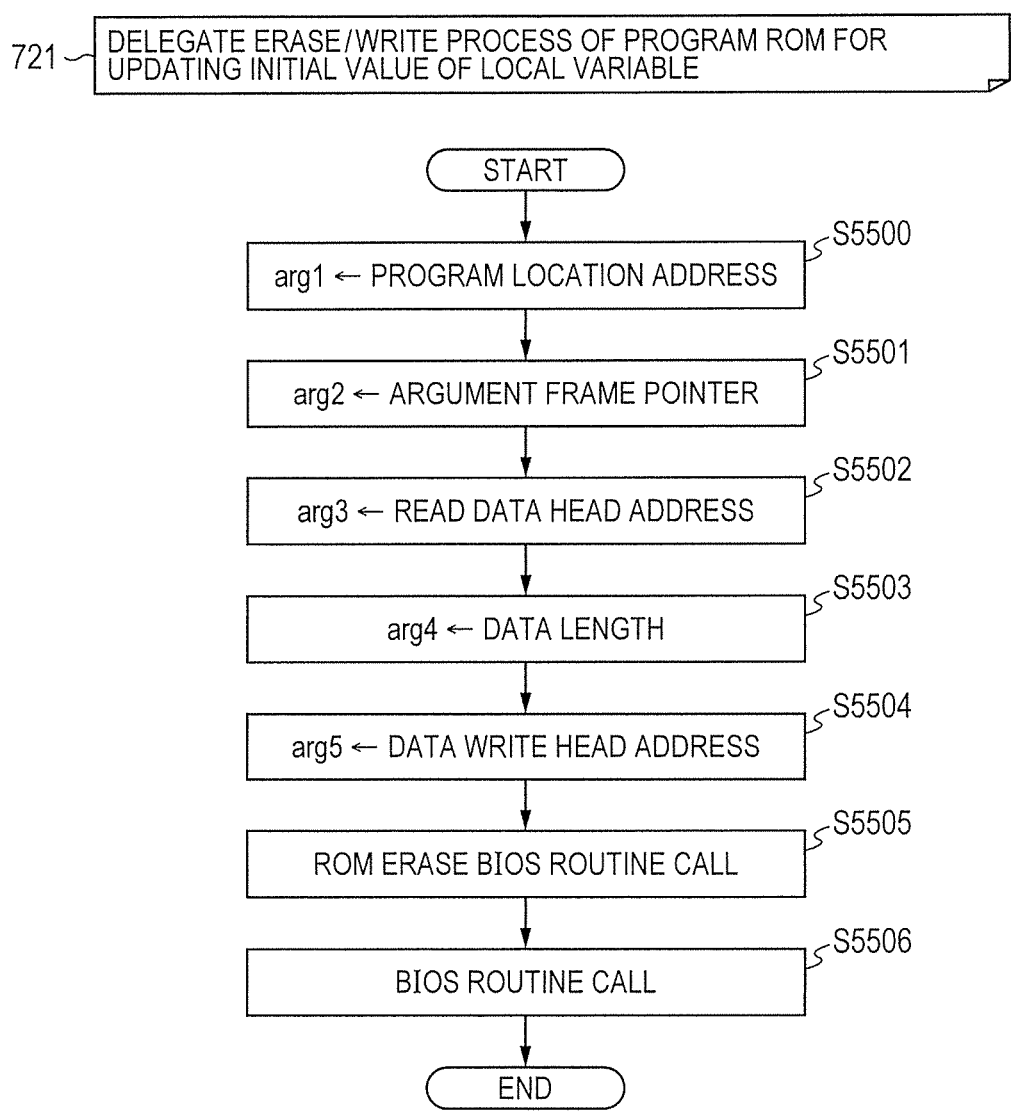
FIG. 55 is a flowchart illustrating an example of procedure of calling a BIOS routine code corresponding to a process in the injection code according to the third embodiment.

FIG. 55 is a flowchart illustrating an example of procedure of calling a BIOS routine code corresponding to a process in the injection code 721 performing delegation of the erase and write process of the program ROM 407 for realizing updating of a local variable, according to the third embodiment.

First, in step 5500 (S5500), the address on the SRAM 406, in which an erase and write process program for the program ROM 407 is disposed is disposed in the first argument arg1. The erase and write process program is preliminarily disposed in a specific address in the program ROM 407. In step 5501 (S5501), the frame pointer of an argument passed to the erase and write process program is disposed in the second argument arg2. In step 5502 (S5502), the head address of a region on the data ROM 408 or the SRAM 406 in which a code corresponding to a local variable update part in a differential program as a rollback target is disposed is disposed in the third argument arg3. That is, the head address is the head address of read data. In step 5503 (S5503), data length of read data is disposed in the fourth argument arg4. In step 5504 (S5504), the head address of data write destination is disposed in the fifth argument arg5. In step 5505 (S5505), the ROM erase BIOS routine is called. In step 5506 (S5506), a corresponding BIOS routine is called.

The details of the ROM erase BIOS routine called in step 5505 will be described later with reference to FIG. 58. The ROM erase BIOS routine executes a process of erasing a block in a region which is to be rewritten. The BIOS routine called in step 5506 executes the write process of the program ROM 409 for realizing a local variable change by disposing an erase and write program for the program ROM 407 in the address in the SRAM 406 designated in the first argument and executing the erase and write program. An execution example is as follows. By an interrupt from the CAN interface 409, the injection code 721 of delegation of the erase and write process of the program ROM 407 for realizing local variable updating is disposed in the SRAM 406. The injection code is executed by the interrupt, and a BIOS routine is called. In the BIOS routine, the erase and write process to the program ROM 407 for realizing local variable updating is performed. The erase and write program for the program ROM 407 disposed in the SRAM 406 may be realized as dedicated software using the SRAM 406 as a work memory.

Figure 56:
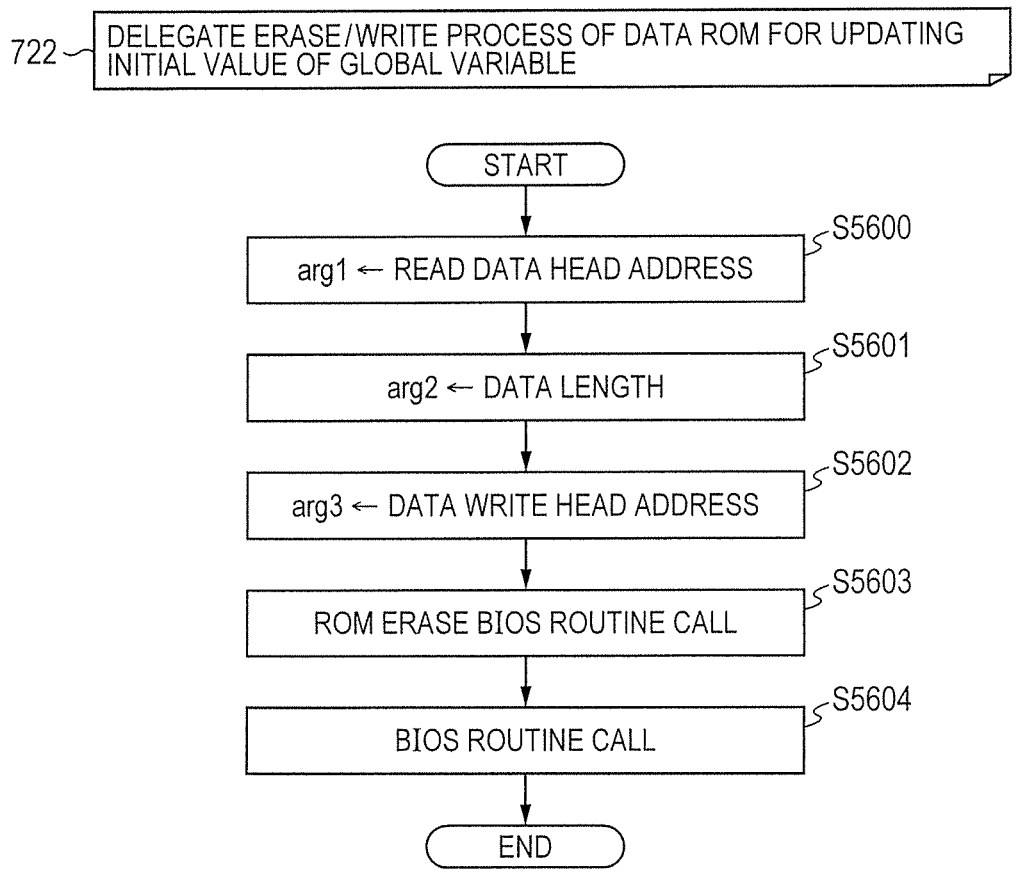
FIG. 56 is a flowchart illustrating an example of procedure of calling a BIOS routine code corresponding to a process in the injection code according to the third embodiment.

FIG. 56 is a flowchart illustrating an example of procedure of calling a BIOS routine code corresponding to a process in the injection code 722 performing delegation of the erase and write process to the data ROM 408 for realizing global variable updating, according to the third embodiment.

First, in step 5600 (S5600), the head address of a region on the data ROM 408 or the SRAM 406, in which a code corresponding to a global variable update part in a differential program as a rollback target is disposed is disposed in the first argument arg1. That is, the head address is the head address of read data. In step 5601 (S5601), data length of read data is disposed in the second argument arg2. In step 5602 (S5602), the head address of data write destination is disposed in the third argument arg3. In step 5603 (S5603), the ROM erase BIOS routine is called. In step 5604 (S5604), a corresponding BIOS routine is called.

The details of the ROM erase BIOS routine called in step 5603 will be described later with reference to FIG. 58. The ROM erase BIOS routine executes a process of erasing a block in a region which is to be rewritten. The BIOS routine called in step 5604 executes the write process of the data ROM 408 for realizing global variable updating. An execution example is as follows. By an interrupt from the CAN interface 409, the injection code 722 of delegation of the erase and write process of the data ROM 408 for realizing global variable updating is disposed in the SRAM 406. The injection code is executed by the interrupt, and a BIOS routine is called. In the BIOS routine, the erase and write process to the data ROM 408 for realizing global variable updating is performed.

Next, the ROM erase BIOS routine will be described. In the third embodiment, the erasing process of the program ROM 407 and the data ROM 408 necessary for dynamic disposition of an update differential binary program is not realized by a method of passing block erase number from the outside as described in the first and second embodiments. In the third embodiment, by managing address information of the program ROM 407 and the data ROM 408 in which update information is disposed on the inside of the embedded device 40, unintended erasure of the ROM is suppressed. Concretely, by using a correspondence table stored in the data ROM 408, the erase process is performed. FIG. 57 is a diagram illustrating an example of a correspondence table stored in the data ROM 408. The correspondence table is management information managing the head address of a write destination when update information is written in the program ROM 407 or the data ROM 408 and erase block number to which the head address belongs. The correspondence table is constructed and updated by the embedded device 40 when each of the update information is stored in the program ROM 407 or the data ROM 408.

Figure 58:
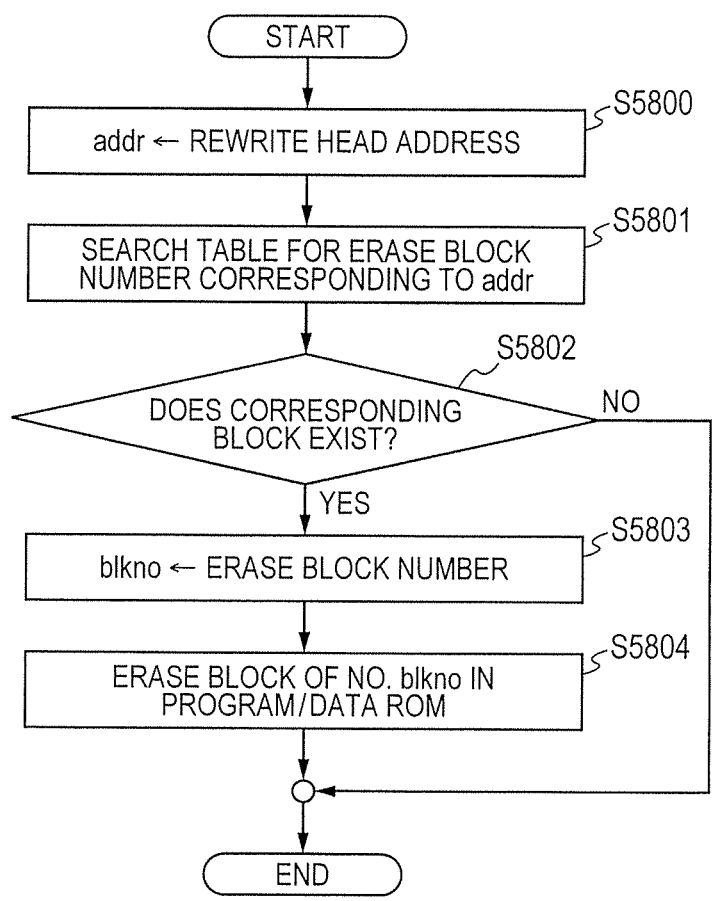
FIG. 58 is a flowchart illustrating an example of a ROM erase BIOS routine using the correspondence table.

FIG. 58 is a flowchart illustrating an example of a ROM erase BIOS routine using the correspondence table.

In step 5800 (S5800), the rewrite head address is substituted to the variable addr. The rewrite head address corresponds to the head address of the data write destination illustrated in FIGS. 53 to 56. Next, in step 5801 (S5801), erase block number corresponding to addr is searched from the correspondence table. In step 5802 (S5802), whether the corresponding erase block number is searched or not is determined. If yes, the process shifts to step 5803. If no, the process is finished. In step 5803 (S5803), the erase block number is substituted in variable blkno. In step 5804 (S5804), the block having the number blkno in the program ROM 407 or the data ROM 408 is erased.

Next, the procedure of generating the update information file 50 will be described. In the procedure of generating the update info nation file 50 according to the embodiment, the details of the process step 3305 in FIG. 33A are replaced from FIGS. 35A and 35B to FIGS. 59A and 59B.

Figure 59A:
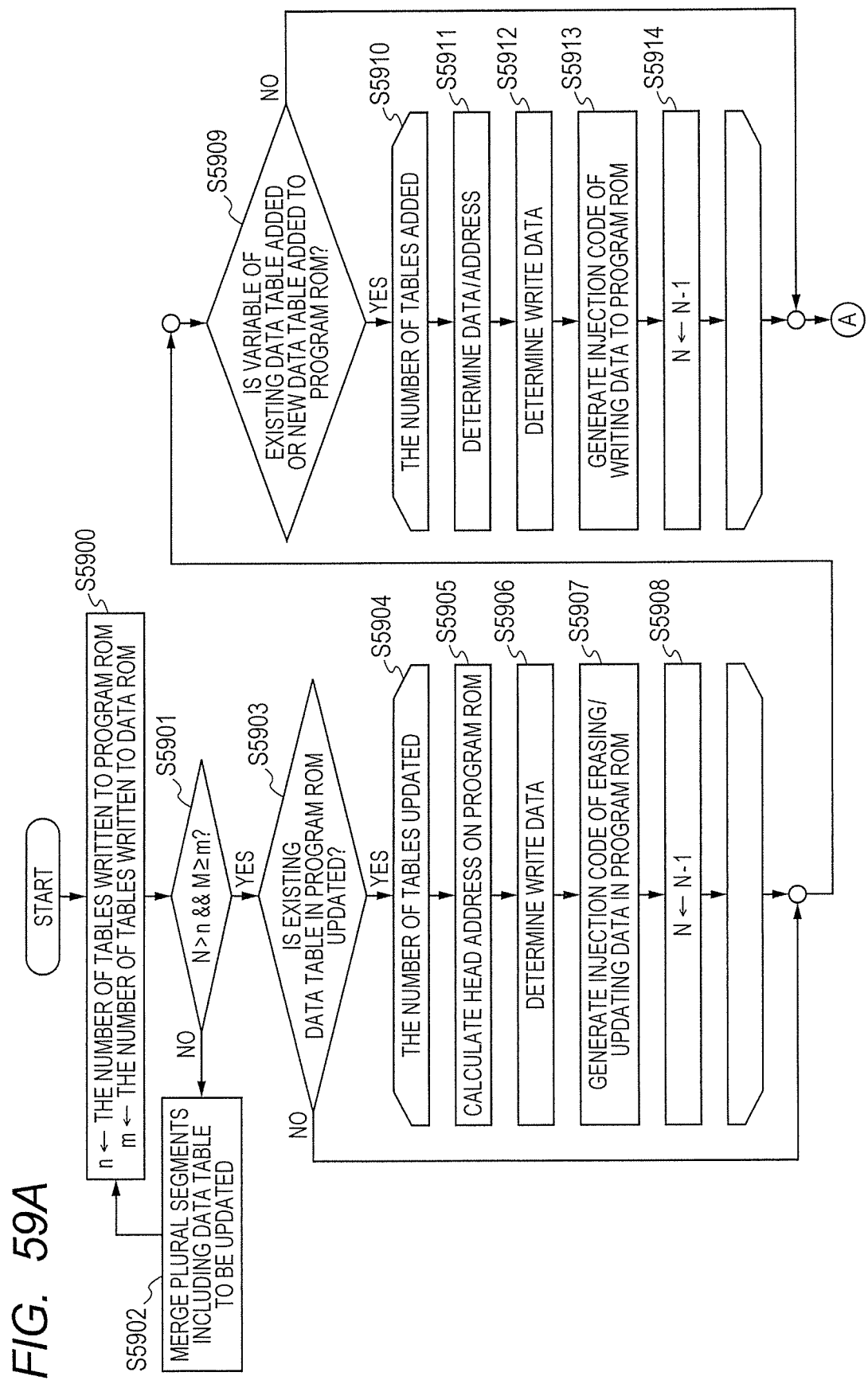
FIG. 59A is a flowchart illustrating an example of a differential program merging process in the third embodiment.
Figure 59B:
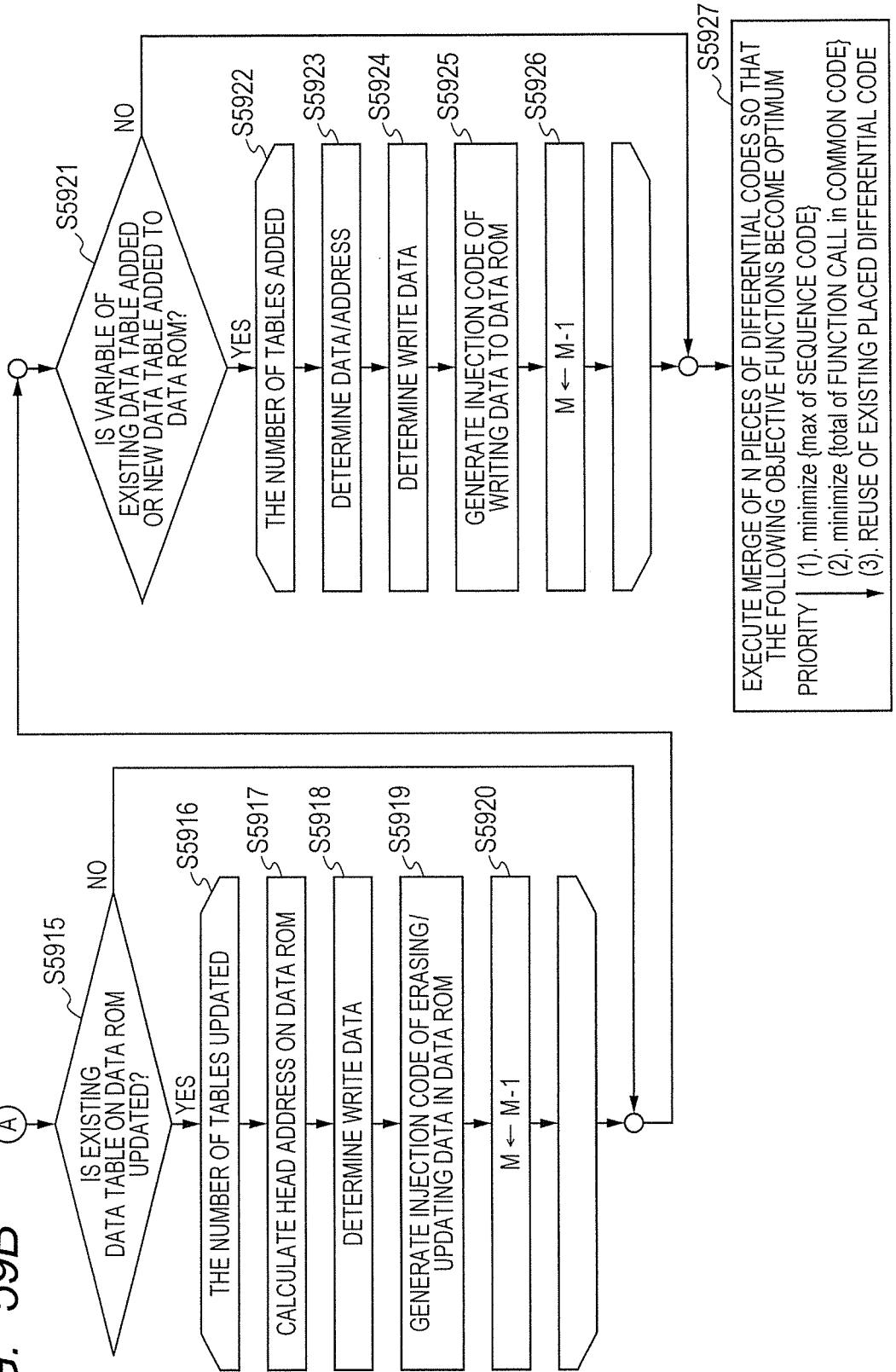
FIG. 59B is a flowchart illustrating an example of a differential program merging process in the third embodiment.

FIGS. 59A and 59B are flowcharts illustrating the details of the step 3305 in FIG. 33A. Hereinafter, the point different from the processes illustrated in FIGS. 35A and 35B will be described and description of similar processes will be properly omitted.

The processes from step 5900 (S5900) to step 5903 (S5903) are similar to the processes from step 3500 to step 3503 in FIG. 35A.

In step 5904 (S5904), the data processing unit 22 repeats the processes in steps 5905 to 5908 only by the number of data tables each having a change.

The process in step 5905 (S5905) is similar to that of step 3505 in FIG. 35A.

In step 5906 (S5906), when a data table is already included in the address calculated in step 5905, the data processing unit 22 determines that there is a block to be erased and sets the data table variable in the block and update information as write data. As described above, in the embodiment, the number of the block to be erased is determined by referring to the correspondence table. Consequently, determination of the number of the block to be erased as in step 3506 in FIG. 35A is not made. However, when a data table is already included in the address calculated in step 5905, the number of the block including the calculated address is calculated and used for managing the erase/rewrite number of times in development environment. When a data table is not included in the address calculated in step 5905, the data processing unit 22 sets the entire data table having a change as write data. The data processing unit 22 also calculates the data length of a data table written by updating.

In step 5907 (S5907), the data processing unit 22 generates the injection code 721 of delegation of the erase/write process of the program ROM 407 by using the following arguments for operating a ROM erase and write driver. Specifically, the disposition address of the driver program, a frame pointer passed to the driver, the head address of the disposition location in a built-in memory of data which is written by updating, data length of data which is written by updating, and the head address on the program ROM 407 calculated in step 5905 are used as arguments. Although the block number calculated in step 5906 is not passed as an argument but an injection code is generated here, as described above, when the injection code is executed, the block of the number determined by referring to the correspondence table is erased. When no data table is included in the address calculated in step 5905, the data processing unit 22 generates the injection code 707 of delegation of the program ROM write process.

Processes from step 5908 (S5908) to step 5915 (S5915) are similar to those from step 3509 to step 3516 in FIGS. 35A and 35B.

In step 5916 (S5916), the data processing unit 22 repeats processes in steps 5917 to 5920 only by the number of data tables each having a change.

Process in step 5917 (S5917) is similar to the process in step 3518 illustrated in FIG. 35B.

When a data table is already included in the address calculated in step 5917, in step 5918 (S5918), the data processing unit 22 determines that there is a block to be erased and sets the data table variable in the block and update information as write data. As described above, in the embodiment, the number of the block to be erased is determined by referring to the correspondence table. Consequently, determination of the number of the block to be erased as in step 3519 in FIG. 35B is not made. However, when a data table is already included in the address calculated in step 5917, the number of the block including the calculated address is calculated and used for managing the erase/rewrite number of times in development environment. When a data table is not included in the address calculated in step 5917, the data processing unit 22 sets the entire data table having a change as write data. The data processing unit 22 also calculates the data length of a data table written by updating.

In step 5919 (S5919), the data processing unit 22 generates the injection code 722 of delegation of the data ROM erase/write process by using, as arguments, the head address of the disposition location in a built-in memory of write data, data length of write data, and the head address calculated in step 5917. Although an injection code is generated without passing the block number calculated in step 5918 as an argument in this case, as described above, when the injection code is executed, the block of the number determined by referring to the correspondence table is erased. When no data table is included in the address calculated in step 5918, the data processing unit 22 generates the injection code 708 of delegation of the data ROM write process.

Thereafter, the processes from step 5920 (S5920) to step 5927 (S5927) are similar to those from step 3522 to step 3529 illustrated in FIG. 35B.

As described above, in the embodiment, the data ROM 408 stores management information managing a write destination address when information included in the update information is written in the program ROM 407 or the data ROM 408 and erasure block number corresponding to the address and, at the time of erasing information stored in the program ROM 407 or the data ROM 408, the embedded device 40 eliminates a region designated by the erasure block number indicated in the management information. Therefore, security improves as compared with the case of eliminating a region designated from the outside.

Next, the counter measure against malicious writing and erasure to the ROM will be described. In the first and second embodiments, after completion of writing to the program ROM 407 or the data ROM 408, signature verification is executed. In this case, write time to the program ROM 407 or the data ROM 408 is shortened. However, for example, there is the possibility that writing to a flash memory and erasure due to failure of signature verification are intentionally repeated by unnecessary data sent. From the viewpoint of property of a flash memory, when writing and erasing operations are frequently performed, it is feared that the product life is shortened. In the embodiment, an example of a program updating operation performing writing after signature verification for an object of suppressing such malicious writing and erasing is described.

Figure 60:
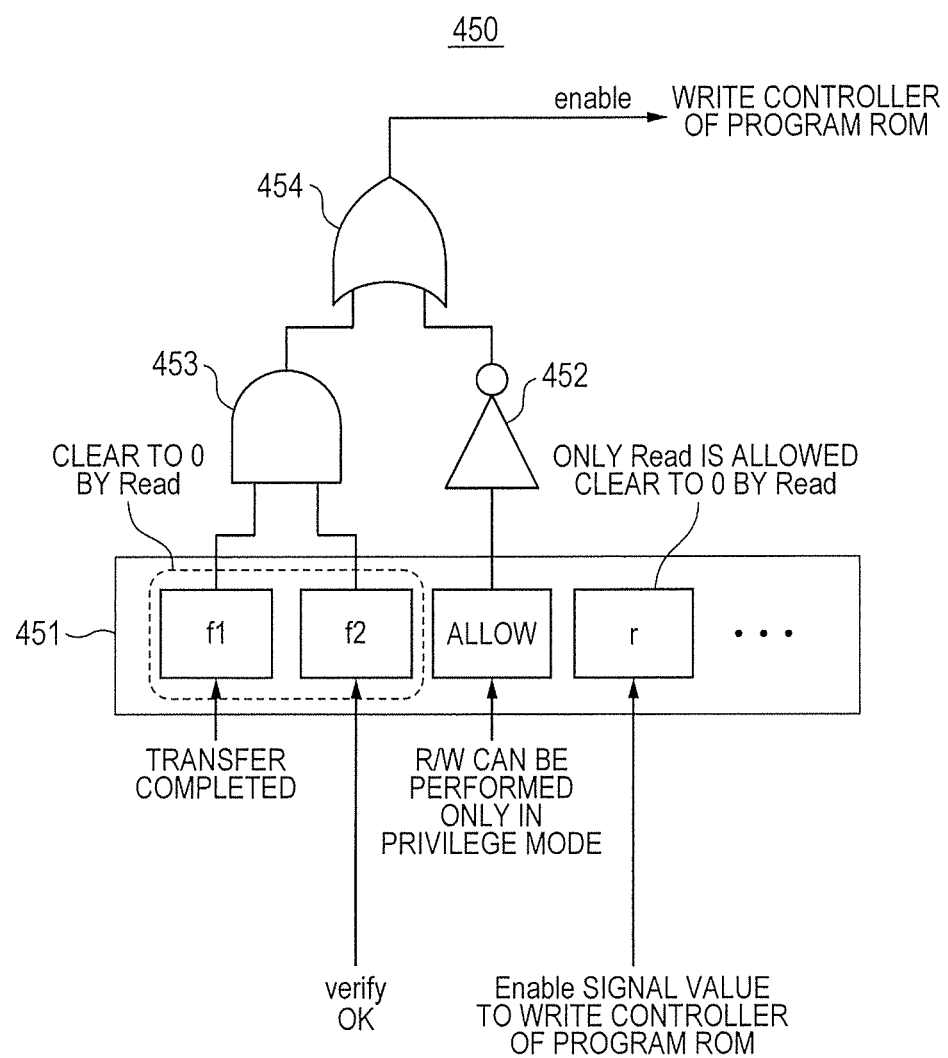
FIG. 60 is a schematic diagram illustrating an example of a control circuit controlling whether writing to a ROM is allowed or not.

In the embodiment, before writing of data to the program ROM 407 or the data ROM 408, signature verification is performed. By managing whether signature verification is performed or not before writing to the program ROM 407 or the data ROM 408 by hardware, update information can be dynamically disposed more securely. FIG. 60 is a schematic diagram illustrating an example of a control circuit 450 controlling whether writing to a ROM is allowed or not.

In the embodiment, the embedded device 40 has the control circuit 450. The control circuit 450 has an update control register 451, an inversion circuit 452, an AND circuit 453, and an OR circuit 454. To the AND circuit 453, "f1" bit and "f2" bit of the update control register 451 are supplied. To the OR circuit 454, an output of the AND circuit 453 and an output of the inversion circuit 452 are supplied. An output of the OR circuit 454 is supplied to a write controller as a control circuit of the program ROM 407 or the data ROM 408. A "permission" bit indicates readable/writable only when the CPU 401 is in a privilege mode. Only when "1" is set in the bit, control by the control circuit 450 becomes valid. The "f1" bit is a bit indicating completion of data transfer to the SRAM 406 executed before writing to the program ROM 407 or the data ROM 408. In the "f1" bit, "1" is set on completion of data transfer to the SRAM 406. The "f2" bit is a bit indicating whether signature verification is succeeded or not, and "1" is set on completion of the signature verification. When reading is performed, the "f1" bit and the "f2" bit are cleared to "0". In the control circuit 450, by setting the "permission" bit to "1", the control by the control circuit 450 becomes valid. After that, only when both of the "f1" bit and the "f2" bit are set to "1", the write controller in the program ROM 407 or the data ROM 408 is made valid. When the signature verification is skipped in a state where the control by the control circuit 450 is valid, the write controller in the program ROM 407 or the data ROM 408 is made invalid. Consequently, even when a write BIOS is executed by some means, writing to the program ROM 407 or the data ROM 408 is not executed. In the bit "r", an enable signal value is written in the write controller in the program ROM 407 or the data ROM 408. The bit "r" is readable only and, when it is read, cleared to "0". The control circuit 450 may be provided individually for each of the program ROM 407 and the data ROM 408.

Figure 61:
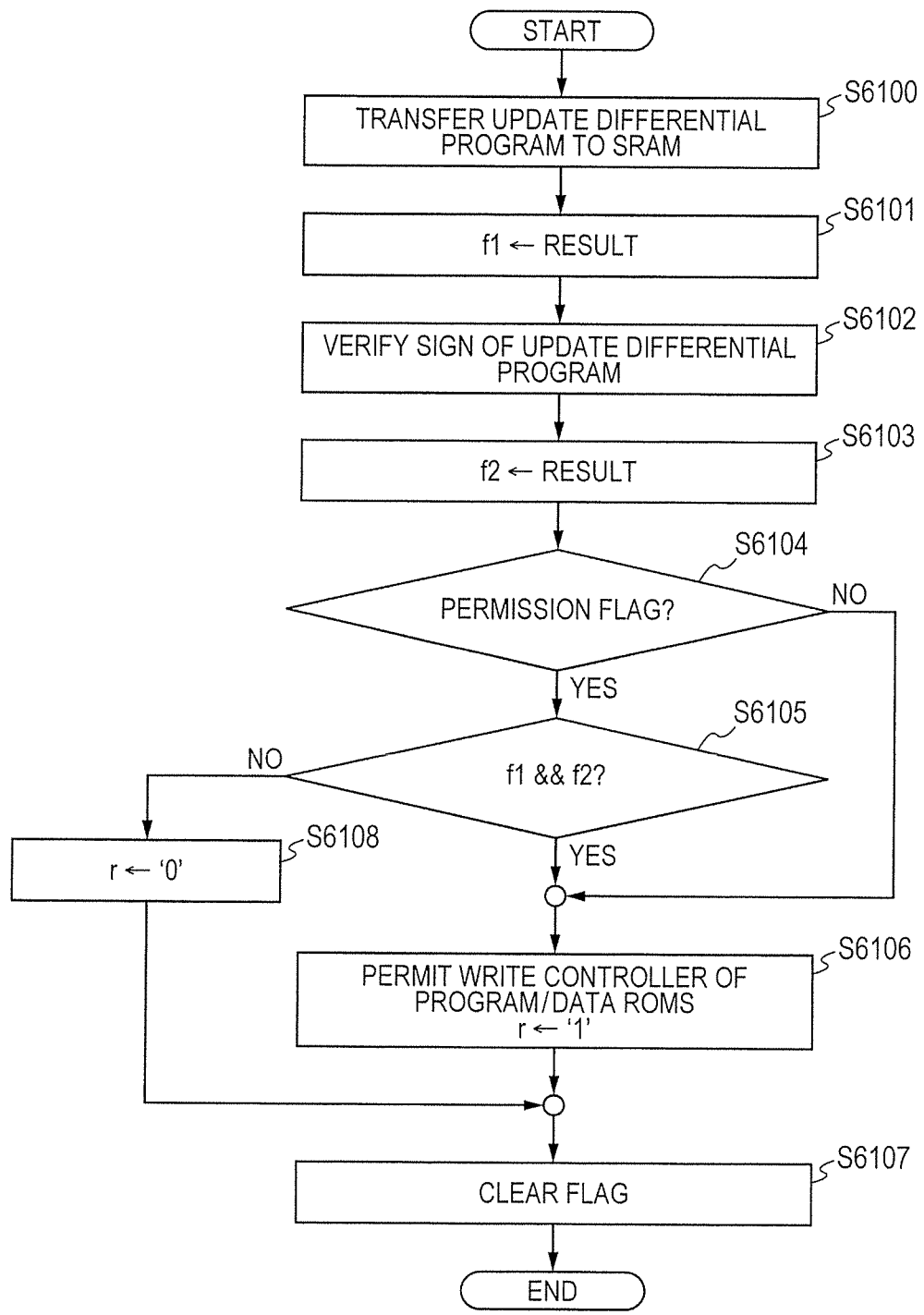
FIG. 61 is a flowchart illustrating an example of a writing control operation using the control circuit.

Next, an operation example using the control circuit 450 will be described. FIG. 61 is a flowchart illustrating an example of a writing control operation using the control circuit 450. In the flowchart, it is assumed that the process starts after step 6100 is executed.

In step 6100 (S6100), according to the updating operation described in the first and second embodiments, an update differential program is transferred to the SRAM 406.

In step 6101 (S6101), after completion of the transfer, the CPU 401 sets the "f1" bit. The CPU 401 sets "1" in the case where the transfer normally ends and sets "0" in the other case.

In step 6102 (S6102), the cryptographic processing unit 404 (signature verifying unit) verifies the signature of an update differential program.

In step 6103 (S6103), after completion of the signature verification, the CPU 401 sets the "f2" bit. The CPU 401 sets "1" in the case where the signature verification result is normal and sets "0" in the other case.

In step 6104 (S6104), whether the "permission" bit is "1" or not is checked. In the case of "1", the process shifts to step 6105. In the other case, the process shifts to step 6106.

In step 6105 (S6105), whether the "f1" bit is "1" and the "f2" bit is "1" or not is determined. In the case where both of the bits are "1", the process shifts to step 6106. In the other case, the process shifts to step 6108.

In step 6106 (S6106), write permission is set in the write controller in the program ROM 407 or the data ROM 408, and "1" is set in the bit "r".

In step 6107 (S6107), the CPU 401 always reads the update control register 451. By the reading operation, the data in the bits "f1", "f2", and "r" is checked. The three bits are cleared to "0" and the process is finished. When the writing process is completed in step 6107, by checking the bit "r", the CPU 401 can check whether an enable signal value to the write controller is actually 1 when the write process is performed. Since all of the bits except for the permission bit are cleared to "0", in writing to the program or data ROM of the next update differential program, it becomes necessary to check whether the signature verification and the transfer completion is normally performed or not. An attack made by skipping the checks can be eliminated.

In step 6108 (S6108), "0" is set in the bit "r", and the process shifts to the step 6107.

As described above, in the embodiment, the embedded device 40 has the control circuit 450 permitting writing of update information to the program ROM 407 or the data ROM 408 when it is confirmed that the signature verification result is valid. With the configuration, the update information whose signature verification result is invalid can be suppressed from being written in the program ROM 407 or the data ROM 408 and the process of erasing the program ROM 407 or the data ROM 408 due to invalid update information can be suppressed.

Finally, the updating operation in the embedded device in the embodiment will be described. The updating operation in the case of applying the embodiment to the embedded device 40 in which each of the program ROM 407 and the data ROM 408 has three planes is similar to that of FIG. 37 but different with respect to the following point. The updating operation in the case of applying the embodiment to the embedded device 40 in which each of the program ROM 407 and the data ROM 408 has two planes is similar to that of FIG. 49 but different with respect to the following point. In the case where the embodiment is applied, in step 3701 in FIG. 37 and step 4902 in FIG. 49, the management server 30 starts dynamic disposition of the update program to the program ROM 407 and the data ROM 408 in which secure dynamic loading of the update program, that is, secure response described in the embodiment is considered.

The third embodiment has been described above. According to the embodiment, erasure of a program and data by maliciously using an injection code can be suppressed and malicious writing and erasure to a ROM can be also suppressed.

Fourth Embodiment

Figure 62:
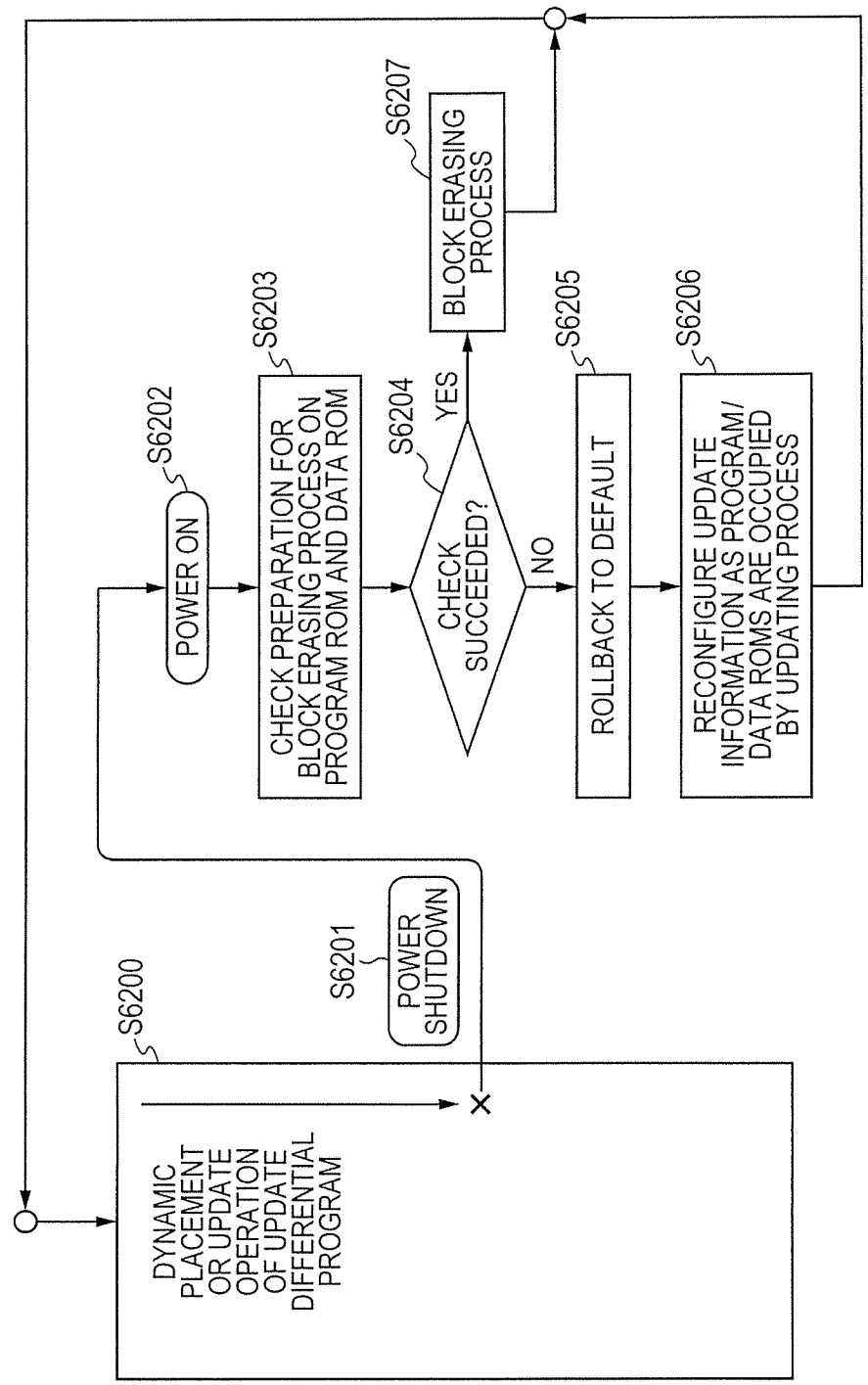
FIG. 62 is a flowchart illustrating an example of a recovering process in the case where power supply is stopped during dynamic disposition or updating operation of update information in an embedded device.

Next, a fourth embodiment will be described. In the fourth embodiment, a handling method at the time of recovering in the case where power supply stop occurs in the embedded device 40 during dynamic disposition of update information in the embedded device 40 or during updating operation in the embedded device 40 will be described. The embedded device 40 according to the embodiment stores, at the time of storing update information into the program ROM 407 or the data ROM 408, the above-described management information managing the head address of write destination of update information and erase block number to which the head address belongs. FIG. 62 is a flowchart illustrating an example of a recovering process in the case where power is stopped during dynamic disposition or updating operation of update information in the embedded device 40. Hereinafter, description will be given with reference to the flowchart. The operations of the embedded device 40 in the flow are realized by, for example, executing a program such as firmware stored in the program ROM 407 or the like by the CPU 401.

In step 6200 (S6200), the embedded device 40 starts dynamic disposition of update information or updating operation with respect to update information disposed.

In step 6201 (S6201), during dynamic disposition of update information or updating operation, power shutdown occurs in the embedded device 40. When power shutdown does not occur, the process in step 6200 continues until the process is completed.

In step 6202 (S6202), the power supply of the embedded device 40 recovers, and the embedded device 40 restarts.

In step 6203 (S6203), the embedded device 40 refers to the correspondence table and checks whether the erasure block number in the program ROM 407 or the data ROM 408 can be identified or not. Concretely, the embedded device 40 makes the check by referring to the correspondence table generated in disposition of update information just before the power shutdown in the correspondence tables generated every disposition of update information.

In the case where the identification succeeds in step 6204 (S6204), the process shifts to step 6207. In the other case, the process shifts to step 6205. Success in the identification in step 6203 means that a block as write destination of information written until occurrence of power shutdown in disposition of update information just before power shutdown can be confirmed. As described above, the update information file 50 is constructed that when data is already stored in a write destination at the time of writing update information, the block as the write destination is erased so that the update information can be written. Consequently, when update information is written in the program ROM 407 or the data ROM 408 before occurrence of power shutdown, the update cannot be re-performed in the update information file 50 for a reason of the possibility that data is written in a write destination in which data is not supposed to be stored. However, when a position in which data is written before occurrence of power shutdown can be specified, by erasing the block as the write destination, such a problem can be solved. That is, without modifying the update information file 50, the update information can be disposed again.

In step 6205 (S6205), the embedded device 40 executes a process of rolling back to the operation by the default program.

In step 6206 (S6206), in the development environment 20, update information generated before power shutoff is reconstructed. In this case, on assumption that all of update information is written, reconstruction is performed. That is, on assumption that data is already stored in a write destination in the program ROM 407 or the data ROM 408, reconstruction is performed. In the reconstruction, concretely, the update information file 50 in which the erasing process is added to the block of the write destination is generated. After that, the process shifts to step 6200, and dynamic disposition of update information and updating operation based on the reconstructed update information is performed. In step 6206, notification to the management server 30 via a network and notification from the management server 30 to the development environment 20 are performed and the update information is reconstructed or the above-described reconstruction may be performed on the management server 30 without sending the notification to the development environment 20.

In step 6207 (S6207), the embedded device 40 erases the block in the program ROM 407 or the data ROM 408 by using the block erase number identified in step 6203. After that, the process shifts to step 6200, and dynamic disposition of update information and updating operation based on update information generated before power shutdown is performed.

As described above, in the embedded device 40 according to the embodiment, the management information is stored. In the case where the power supply stops at the time of writing update information to the program ROM 407 or the data ROM 408 or at the time of operation of applying update information, after recovery of the power supply, when management information can be referred to, the update information written before the stop of the power supply is eliminated in accordance with the management information. In the embodiment, even when the power shutoff occurs, proper update after restart can be realized. Particularly, since the write destination is specified by using the correspondence table, a block to be erased is specified. Consequently, without reconstructing the update information, proper update after restart can be realized. The fourth embodiment can be combined with any of the first, second, and third embodiments.

Although the invention achieved by the inventors of the present invention has been concretely described on the basis of the embodiments, obviously, the present invention is not limited to the embodiments but can be variously changed without departing from the gist. For example, although the case where the number of planes of the ROM is three has been described in the first embodiment, the number of planes may be four or more.

What is claimed is:

1. An embedded device comprising:
a network input unit receiving update information via a network;
a first nonvolatile memory having a plurality of planes each of which can be accessed independently;
a second nonvolatile memory having a plurality of planes each of which is accessible independently;
a CPU executing a program disposed in the first nonvolatile memory;
a bus disposed between the CPU and the first nonvolatile memory;
a first address translator performing address translation for a program by using an address translation table included in update information received by the network input unit; and
a second address translator performing address translation for data to be used by a program by using an address translation table included in update information received by the network input unit,
wherein the CPU executes a program disposed in the first nonvolatile memory by using data disposed in the second nonvolatile memory,
wherein the first address translator is disposed between the CPU and the bus,
wherein in the first nonvolatile memory, a default program is disposed in a first plane and a differential program with respect to the default program, included in update information received by the network input is disposed in a second plane,
wherein in the second nonvolatile memory, default data is disposed in a first plane and differential data with respect to the default data, included in update information received by the network input unit is disposed in a second plane,
wherein when an address to be obtained by the CPU is an address corresponding to a change part in the default program, the first address translator translates the address to an address in which the differential program is disposed and outputs the translated address to the bus,
wherein when an address obtained by decoding an instruction by the CPU is an address corresponding to a change part in the default data, the second address translator translates the address to an address in which the differential data is disposed,
wherein the CPU executes the differential program in accordance with the address translated by the first address translator, and
wherein the CPU executes a process using the differential data in accordance with the address translated by the second address translator.

2. The embedded device according to claim 1, wherein the number of planes of the first nonvolatile memory is three.

3. The embedded device according to claim 1, wherein the first address translator changes an upper bit sequence of predetermined number of bits in an address obtained by decoding an instruction by the CPU and couples the changed upper bit sequence and a lower bit sequence of the address, thereby translating the address to an address in which the differential program is disposed.

4. The embedded device according to claim 3, wherein when size of a differential code which replaces a code of a part to be substituted in the default program is larger than that of a code of the part to be substituted, or when the size of the code to be substituted or the size of the differential code is larger than segment size as size of a memory region corresponding to the predetermined number of bits, the first address translator translates a start address of the code of the part to be substituted to a predetermined address, and
wherein the predetermined address is an address in which an instruction related to a jump instruction to a start address of an instruction sequence which replaces the code of the part to be substituted is stored.

5. The embedded device according to claim 1,
wherein the network input unit receives the update information including information constructing a program restoration point in addition to the differential program.

6. The embedded device according to claim 1, further comprising a signature verifying unit verifying signature of the update information,
wherein when validity is confirmed by the signature verifying unit, the CPU executes the differential program.

7. The embedded device according to claim 1,
wherein the second nonvolatile memory stores management information managing a write destination address when information included in the update information is written in the first nonvolatile memory or the second nonvolatile memory and erasure block number corresponding to the address, and
wherein at the time of erasing information stored in the first nonvolatile memory or the second nonvolatile memory, a region designated by the erasure block number indicated in the management information is erased.

8. The embedded device according to claim 6, further comprising a control circuit which allows writing to the first nonvolatile memory of the update information when the update information is confirmed to be valid by the signature verifying unit.

9. The embedded device according to claim 1,
wherein the network input unit receives update information excluding a part overlapped with update information already disposed in the first nonvolatile memory, and
wherein the differential program obtained by eliminating the overlapped part is newly disposed in addition to the overlapped part already disposed in the first nonvolatile memory.

10. The embedded device according to claim 1,
wherein the second nonvolatile memory stores management information managing a write destination address when information included in the update information is written in the first nonvolatile memory or the second nonvolatile memory and erasure block number corresponding to the address, and
wherein when power supply stops at the time of writing the update information to the first nonvolatile memory or the second nonvolatile memory or at the time of operation of applying the update information, after the power supply recovers, when the management information can be referred to, the update information written before the stop of the power supply is erased according to the management information.

11. The embedded device according to claim 1,
wherein the first address translator translates an address of an instruction, and
wherein the second address translator translates an address of an operand.

* * * * *